Feb. 6, 1934. W. WILKINS ET AL 1,945,928
MACHINE FOR PRODUCING OR REPRODUCING DESIGNS AND OTHER FORMS
Filed March 12, 1929 35 Sheets-Sheet 1
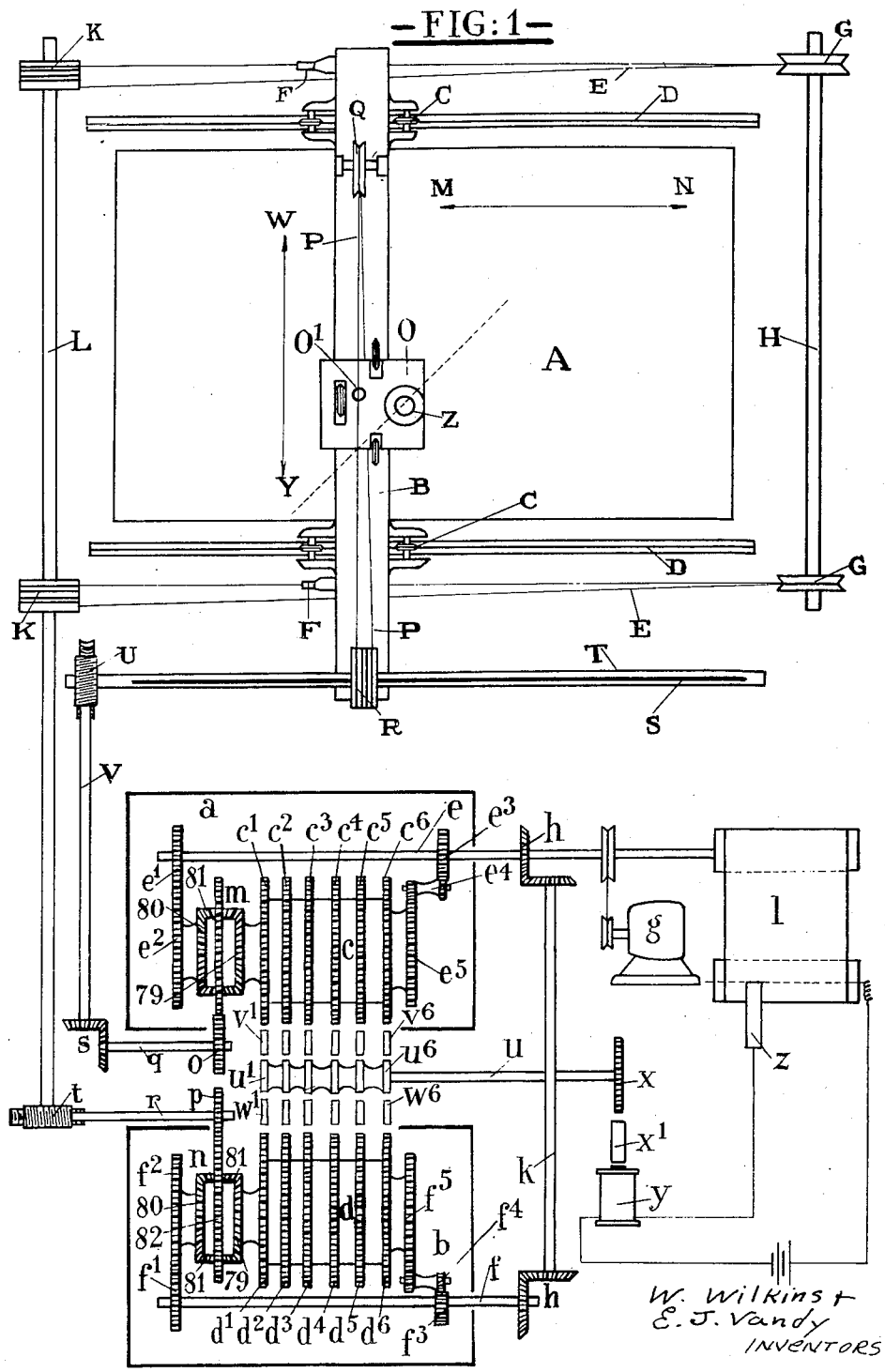
W. Wilkins +
E. J. Vandy
INVENTORS
By Marks & Clerk
ATYS Feb. 6, 1934.  W. WILKINS ET AL  1,945,928
MACHINE FOR PRODUCING OR REPRODUCING DESIGNS AND OTHER FORMS
Filed March 12, 1929   35 Sheets-Sheet 2

FIG: 2

W. Wilkins &
E. J. Vandy
INVENTORS

By: Marks & Clerk
Attys

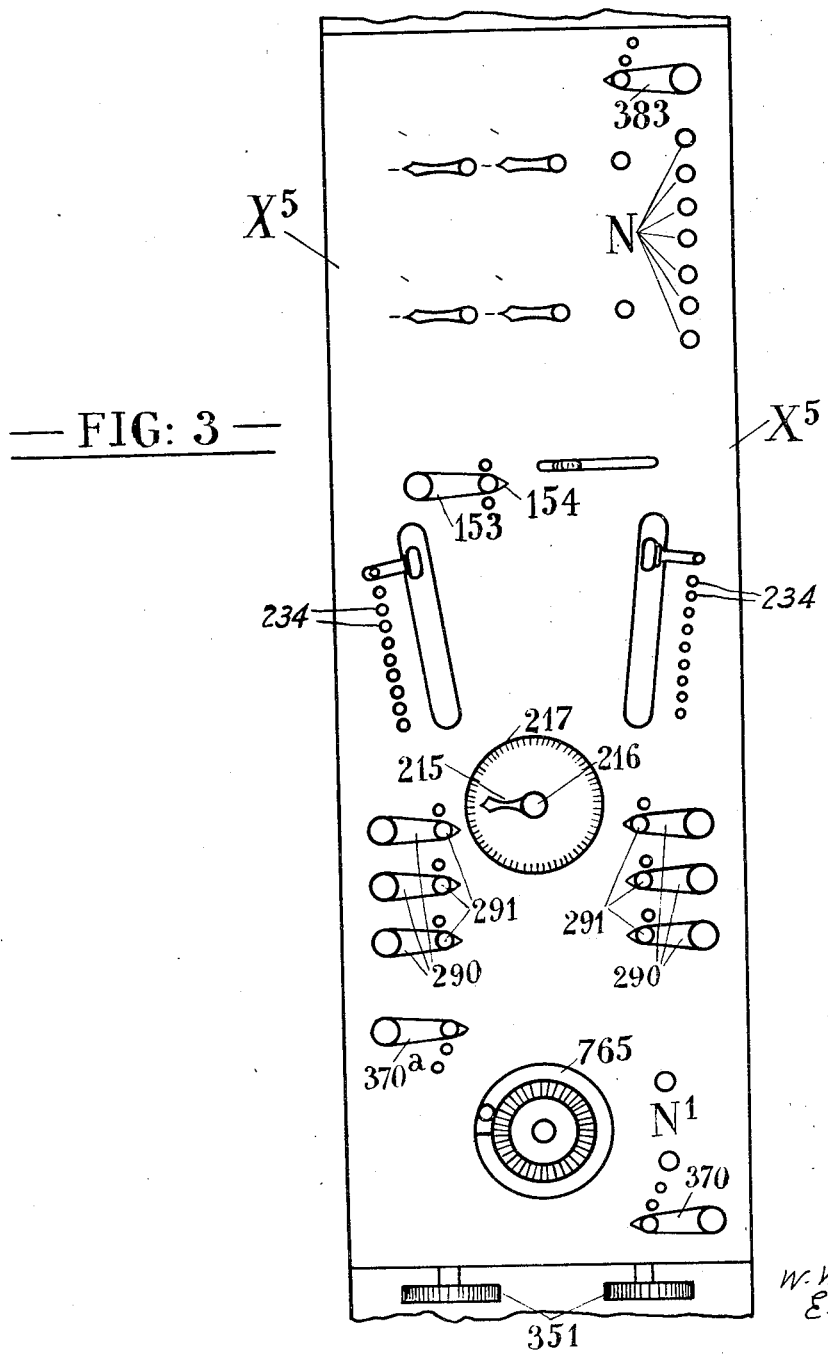

Feb. 6, 1934. W. WILKINS ET AL 1,945,928
MACHINE FOR PRODUCING OR REPRODUCING DESIGNS AND OTHER FORMS
Filed March 12, 1929 35 Sheets-Sheet 4
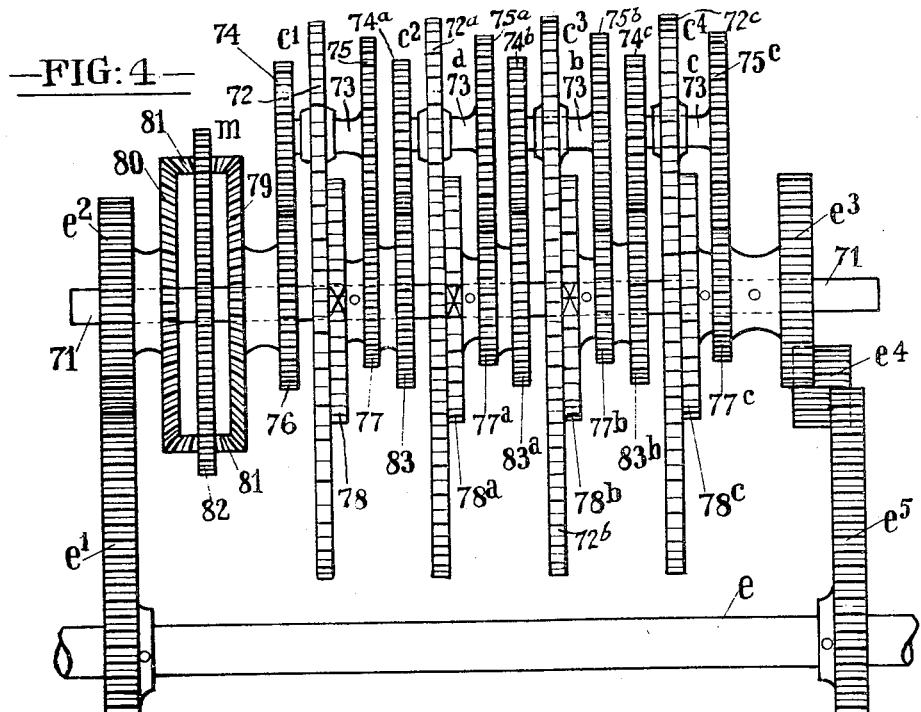
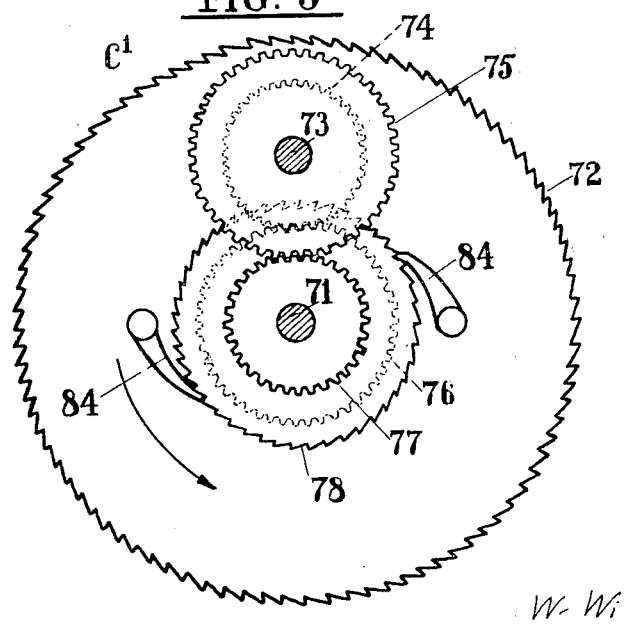

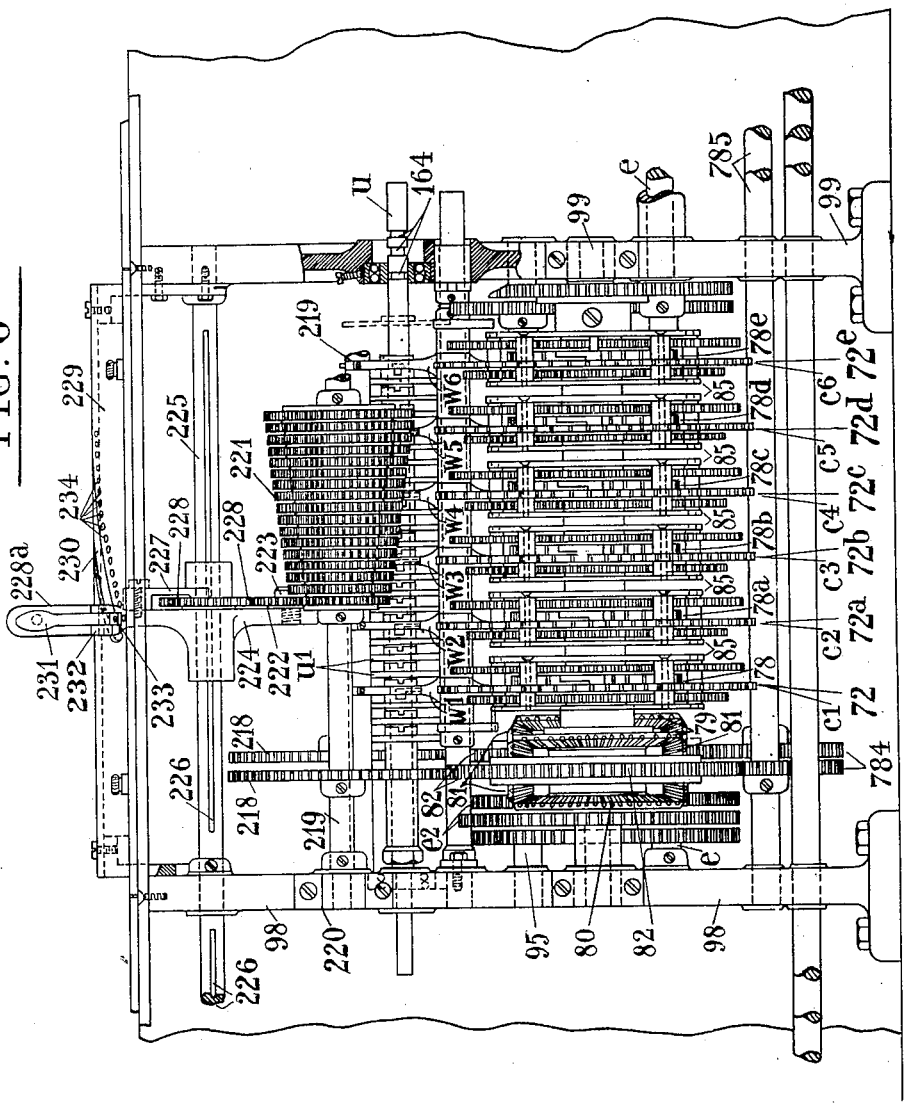

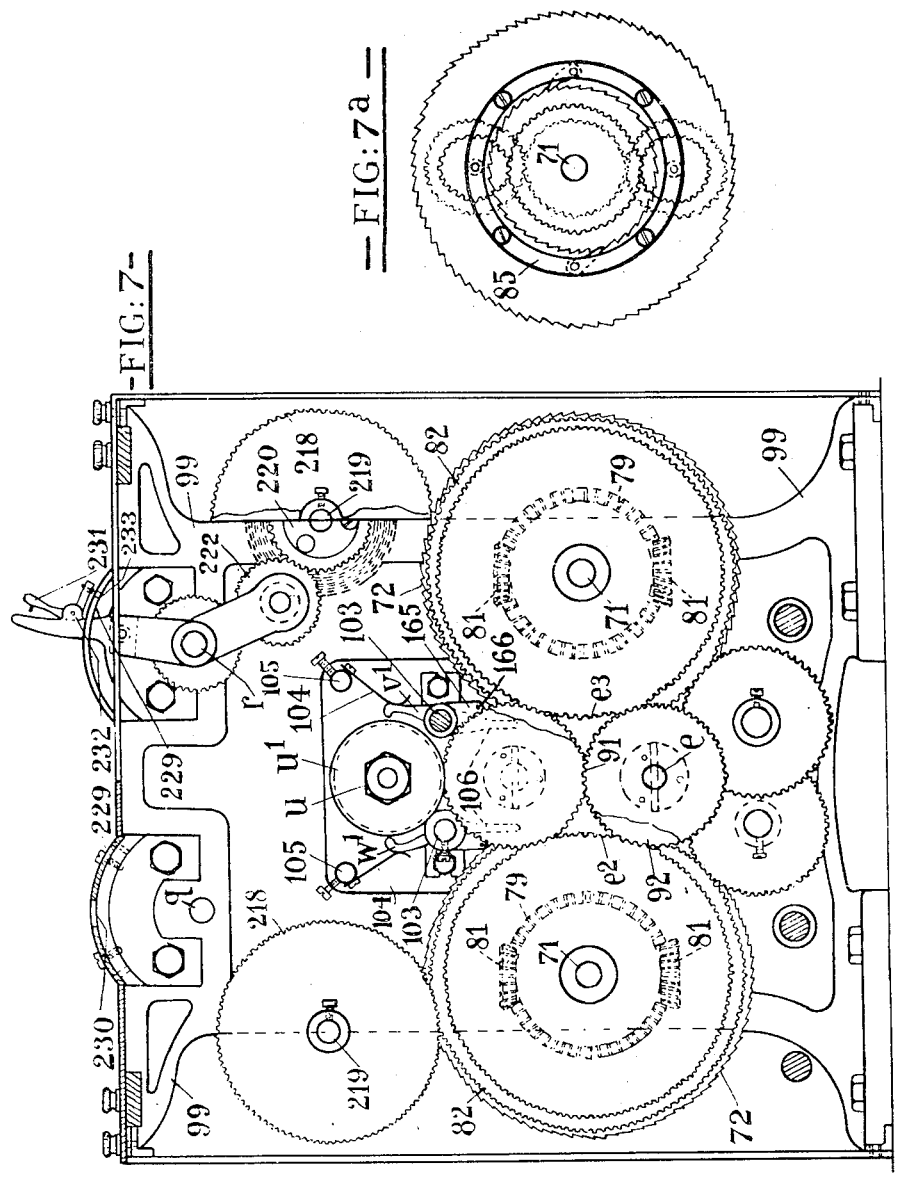

FIG: 7b
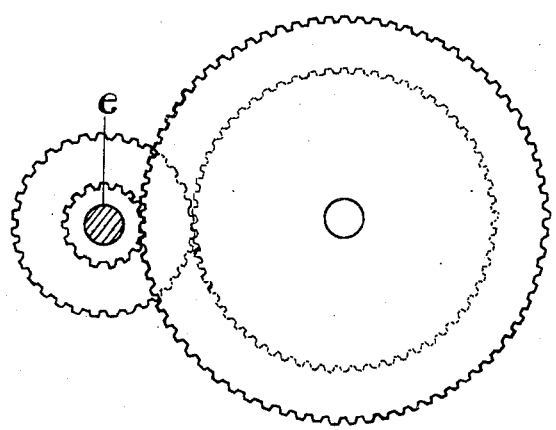
FIG: 7c
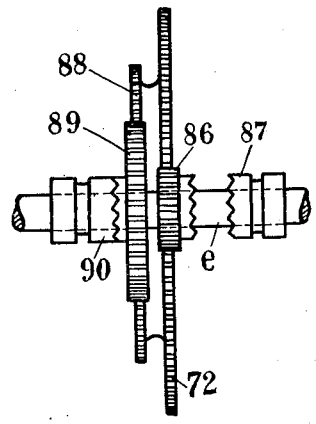
FIG: 11
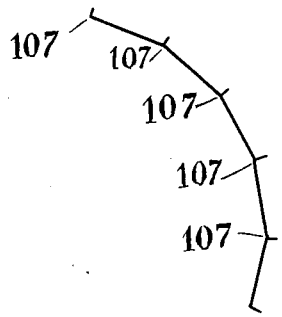
FIG: 11a
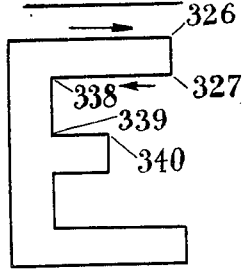
W. Wilkins &
E. J. Vandy
INVENTORS
By: Marks & Clerk
Attys.

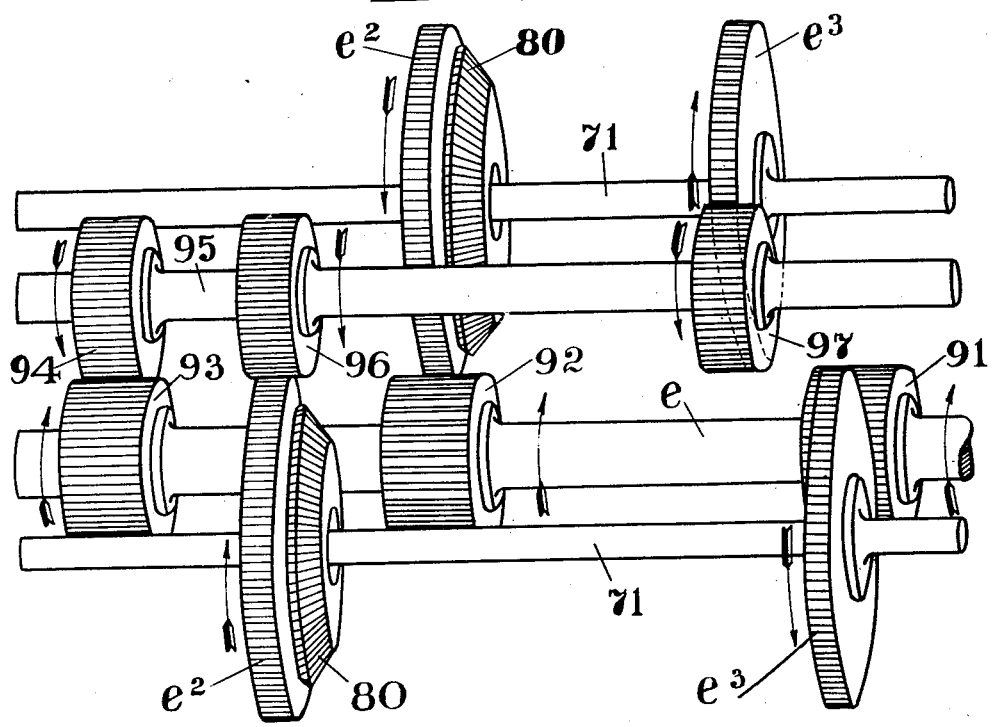

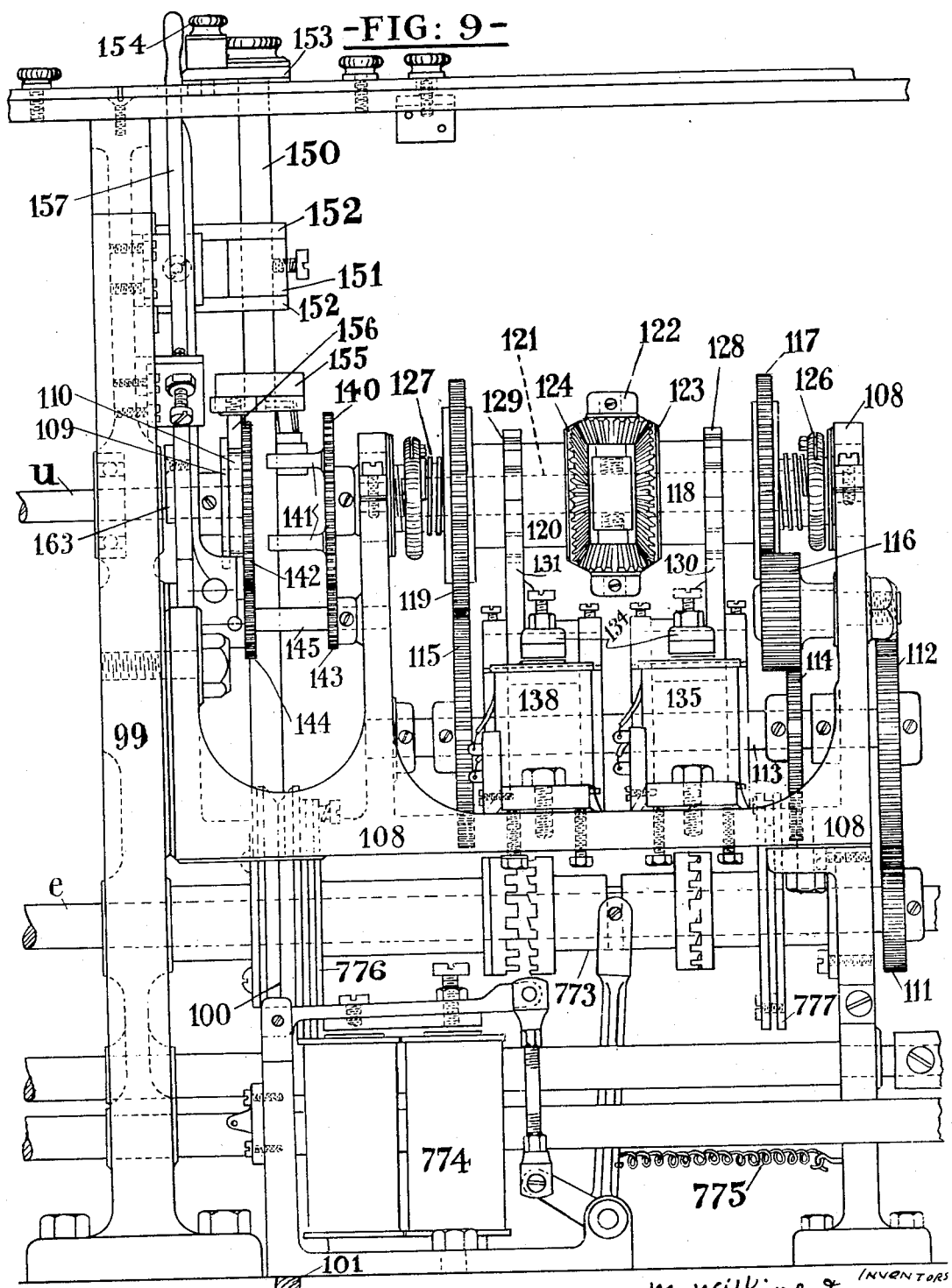

Feb. 6, 1934.　　　W. WILKINS ET AL　　　1,945,928
MACHINE FOR PRODUCING OR REPRODUCING DESIGNS AND OTHER FORMS
Filed March 12, 1929　　　35 Sheets-Sheet 10
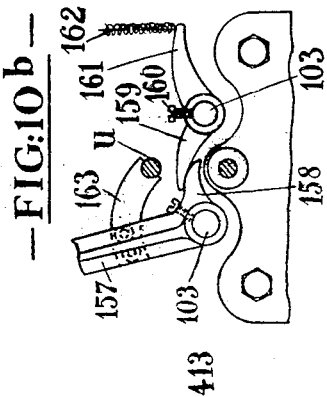
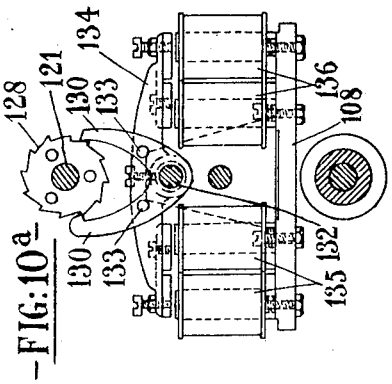
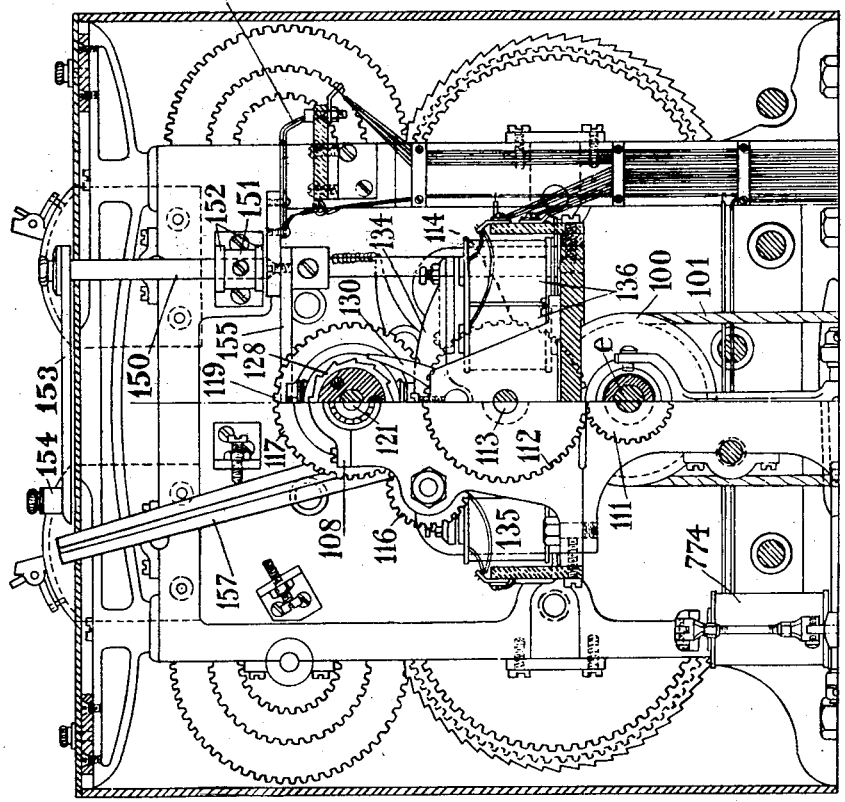
W. Wilkins &
E. J. Vandy, Inventors
By: Marks & Clerk
Attys Feb. 6, 1934. W. WILKINS ET AL 1,945,928
MACHINE FOR PRODUCING OR REPRODUCING DESIGNS AND OTHER FORMS
Filed March 12, 1929 35 Sheets-Sheet 11
— FIG. 12 —
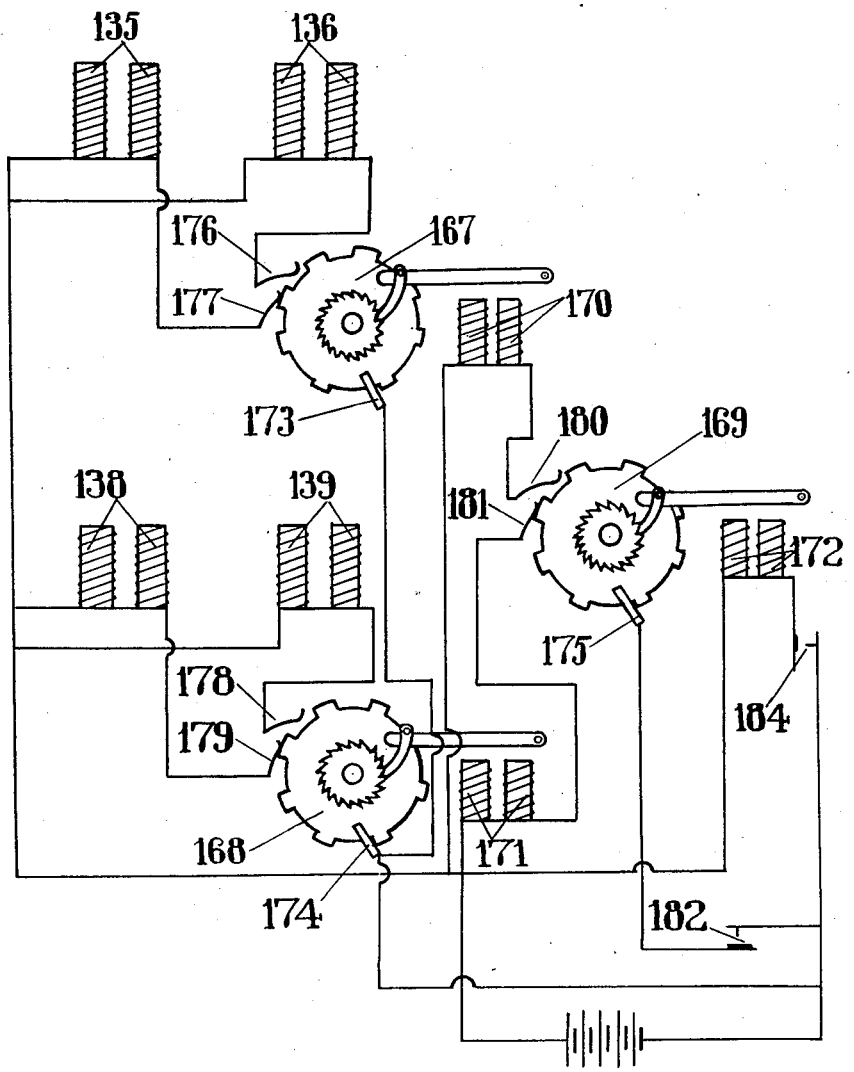
W. Wilkins &
E. J. Vandy
INVENTORS
By: Marks & Clerk
Attys.

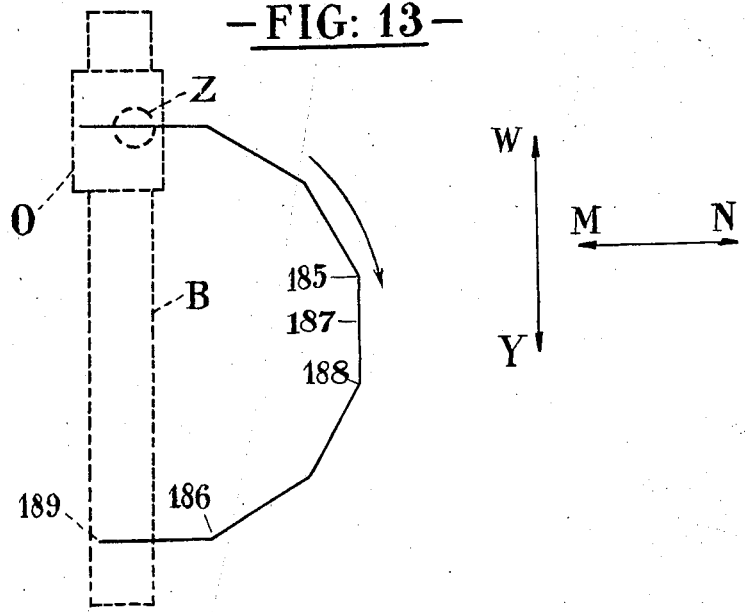
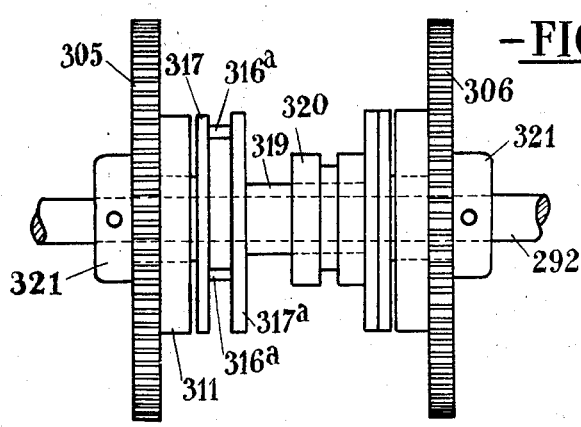
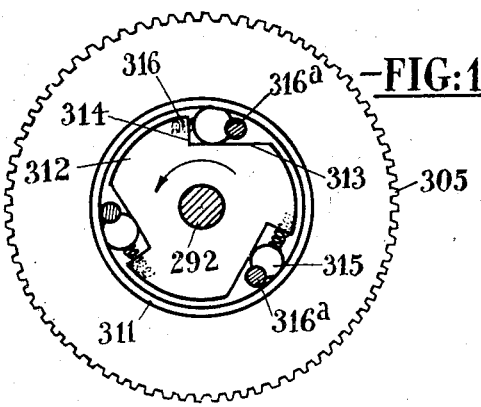
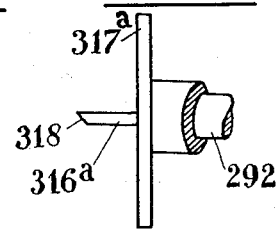

Feb. 6, 1934.    W. WILKINS ET AL    1,945,928
MACHINE FOR PRODUCING OR REPRODUCING DESIGNS AND OTHER FORMS
Filed March 12, 1929    35 Sheets-Sheet 13
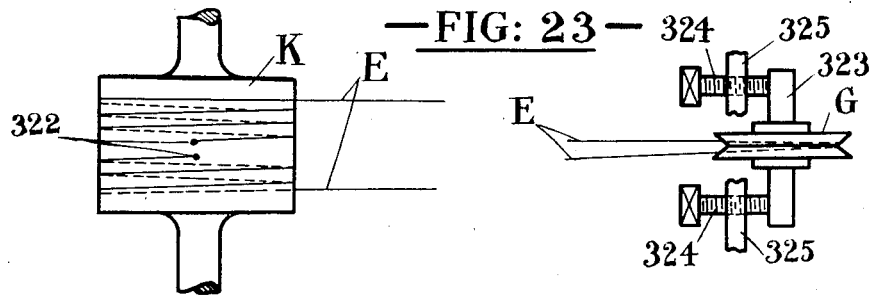
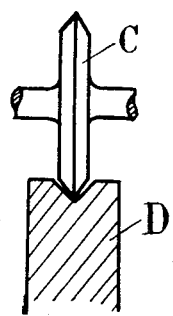
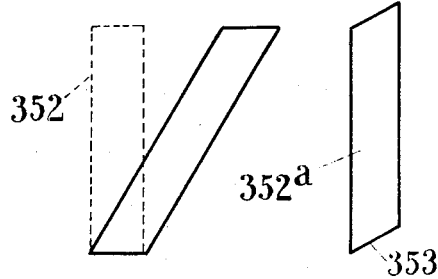
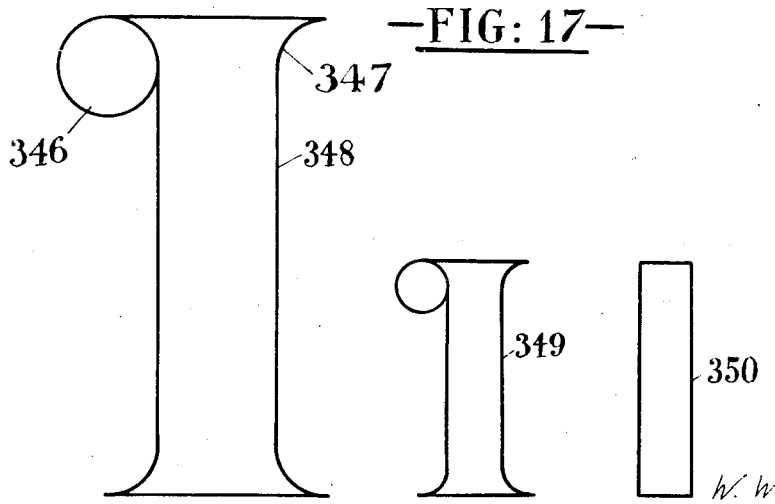
INVENTORS
W. Wilkins &
E. J. Vandy
By: Marks & Clerk
Attys.

Feb. 6, 1934. W. WILKINS ET AL 1,945,928
MACHINE FOR PRODUCING OR REPRODUCING DESIGNS AND OTHER FORMS
Filed March 12, 1929 35 Sheets-Sheet 14
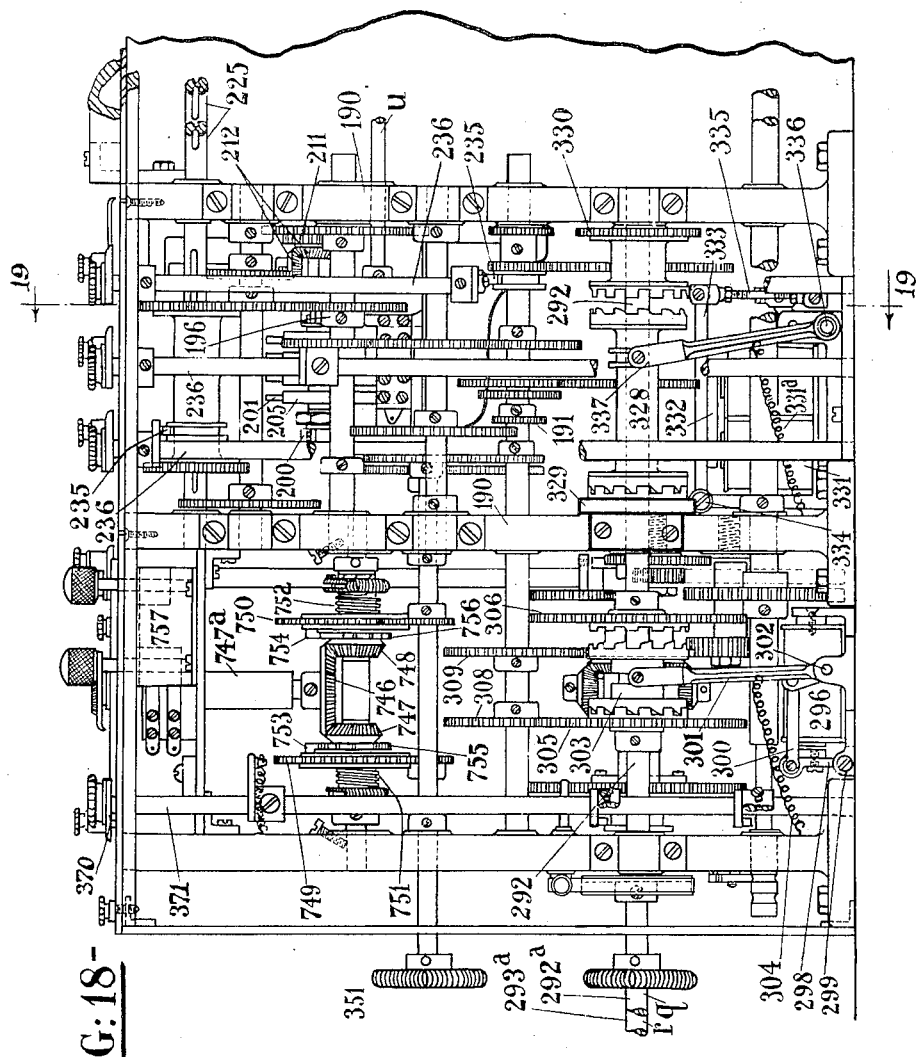
W. Wilkins &
E. J. Vandy
INVENTORS
By: Marks & Clerk
Attys.

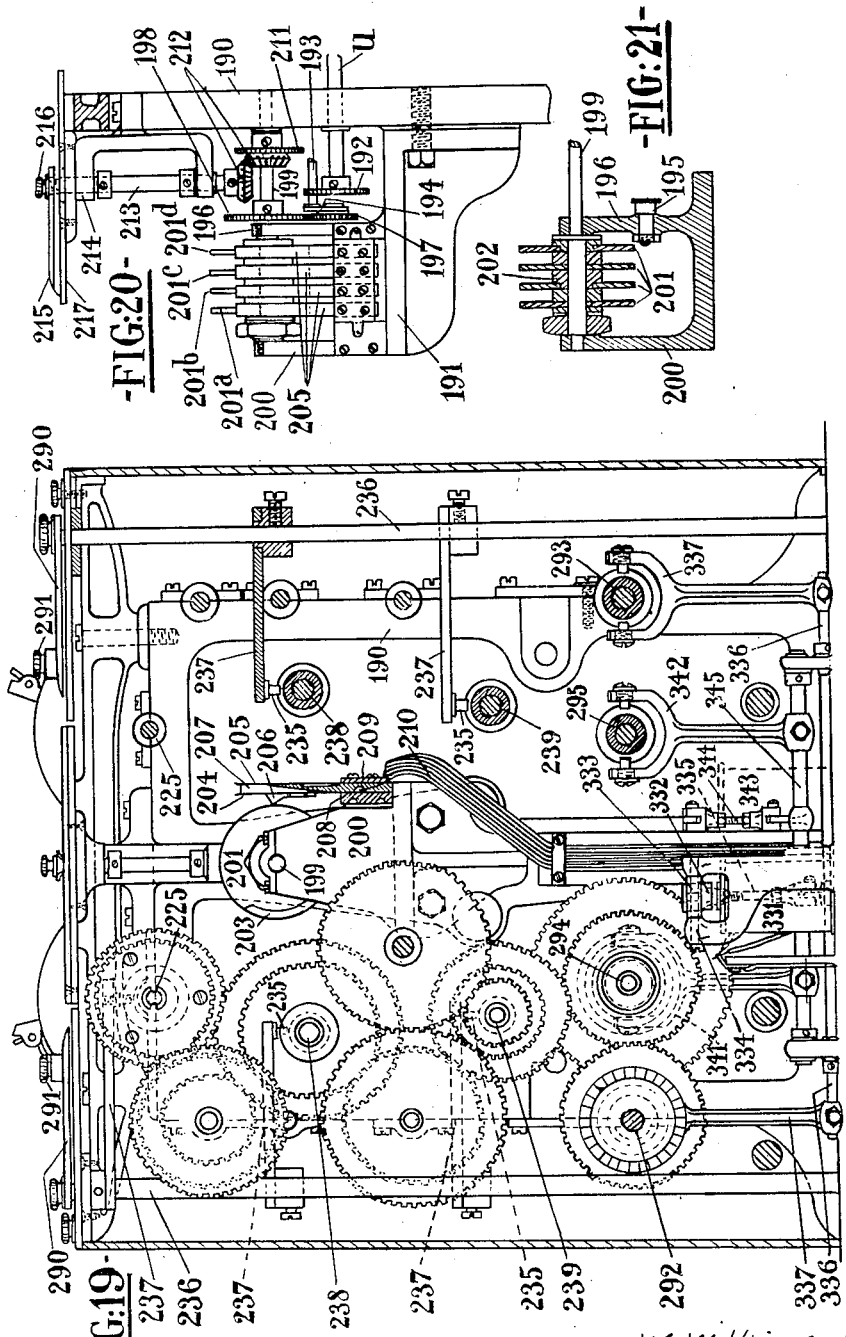

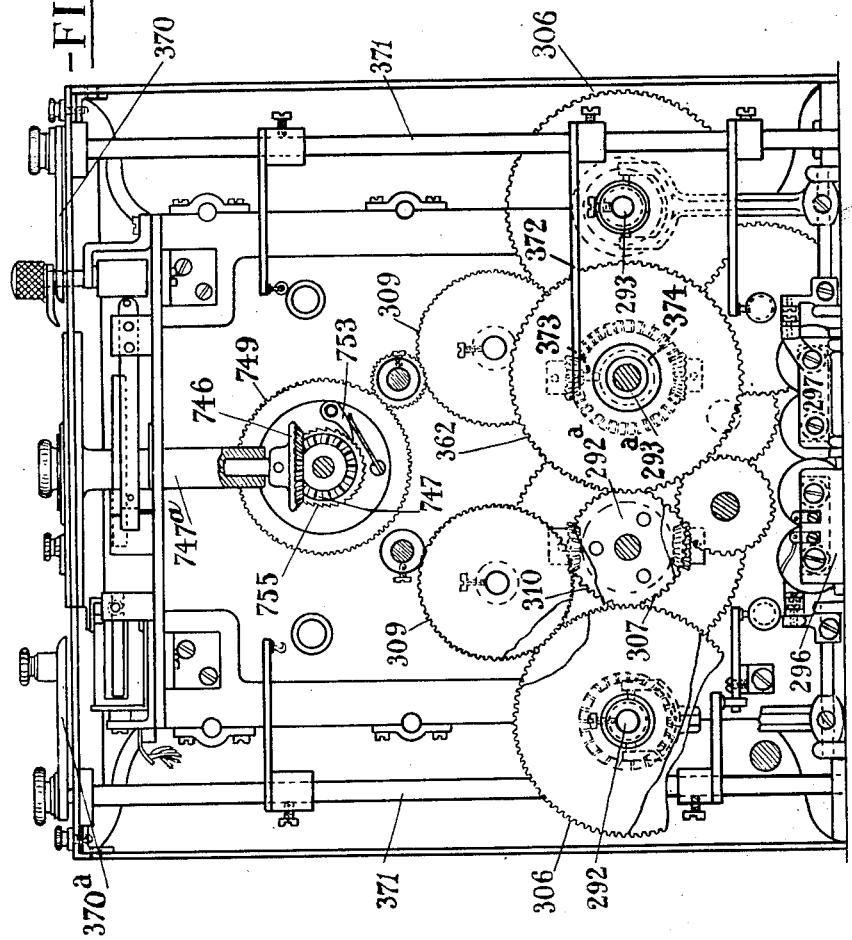

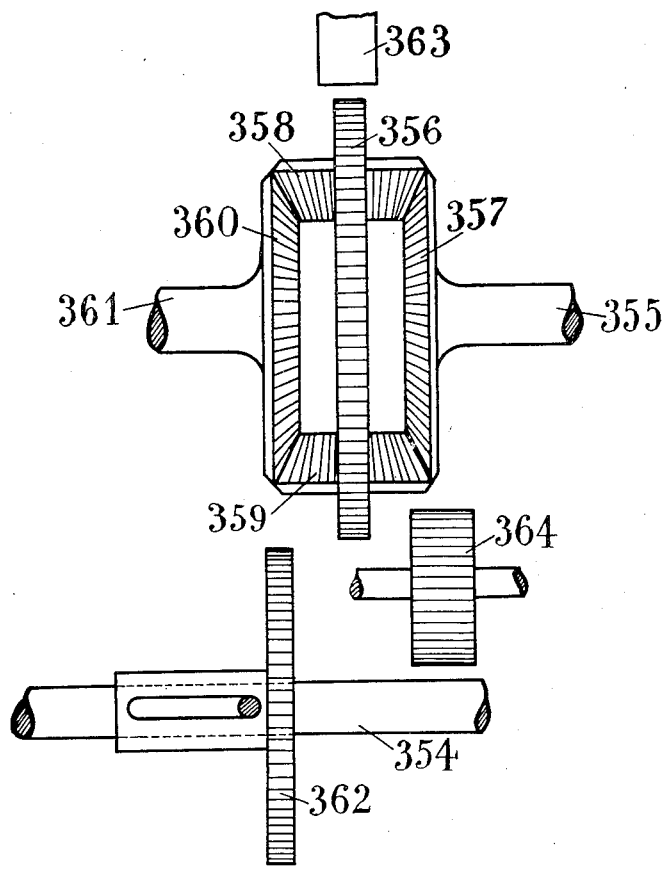
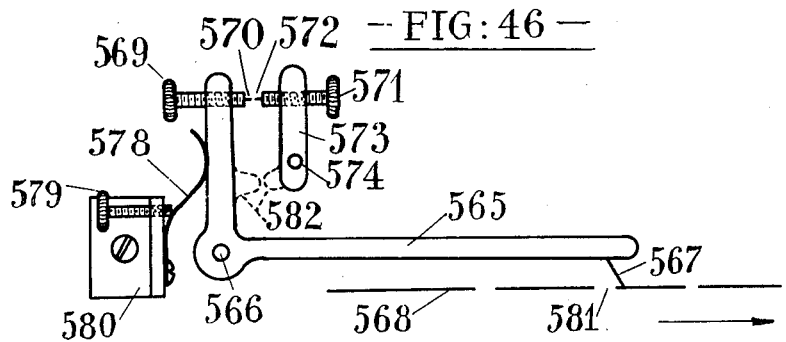

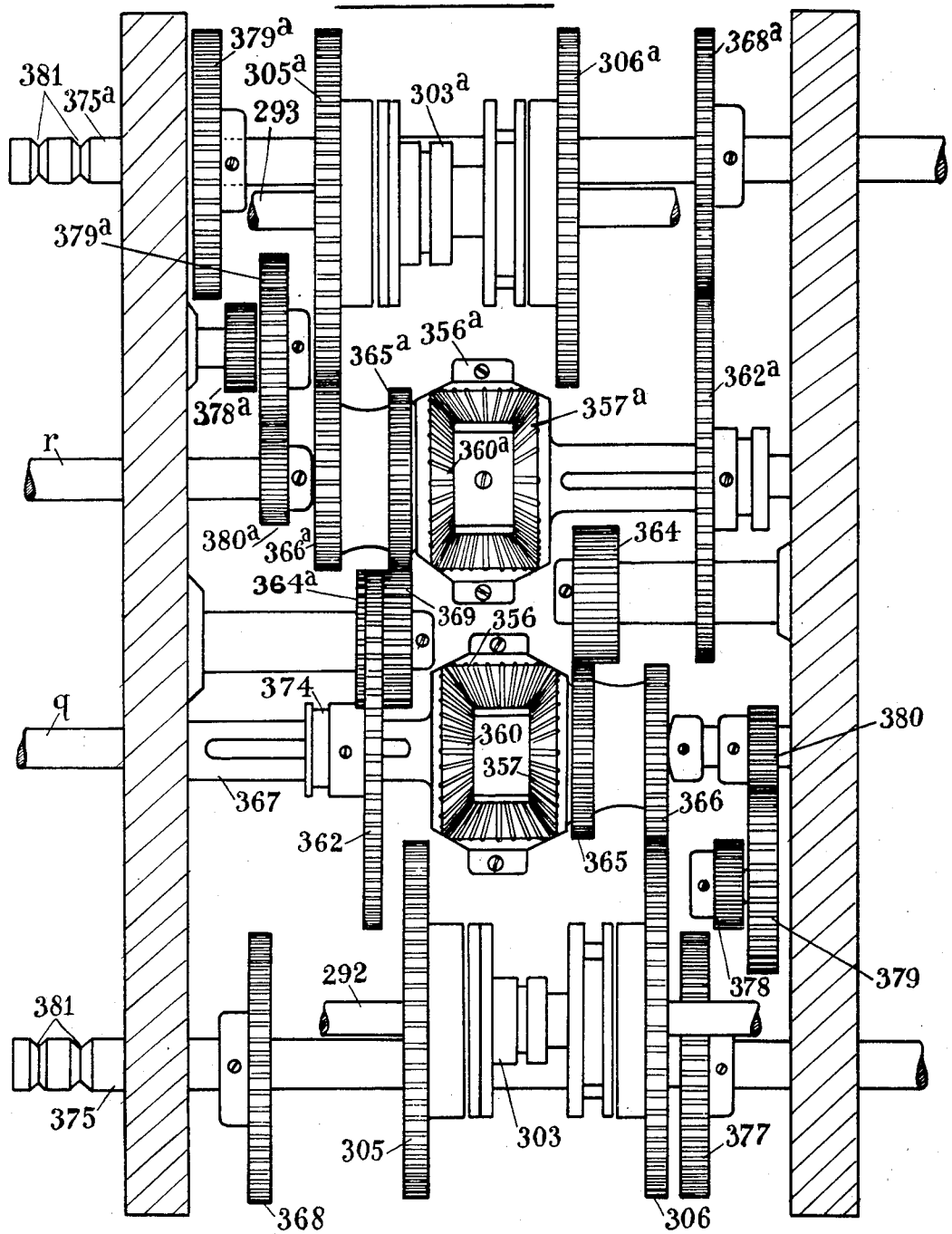

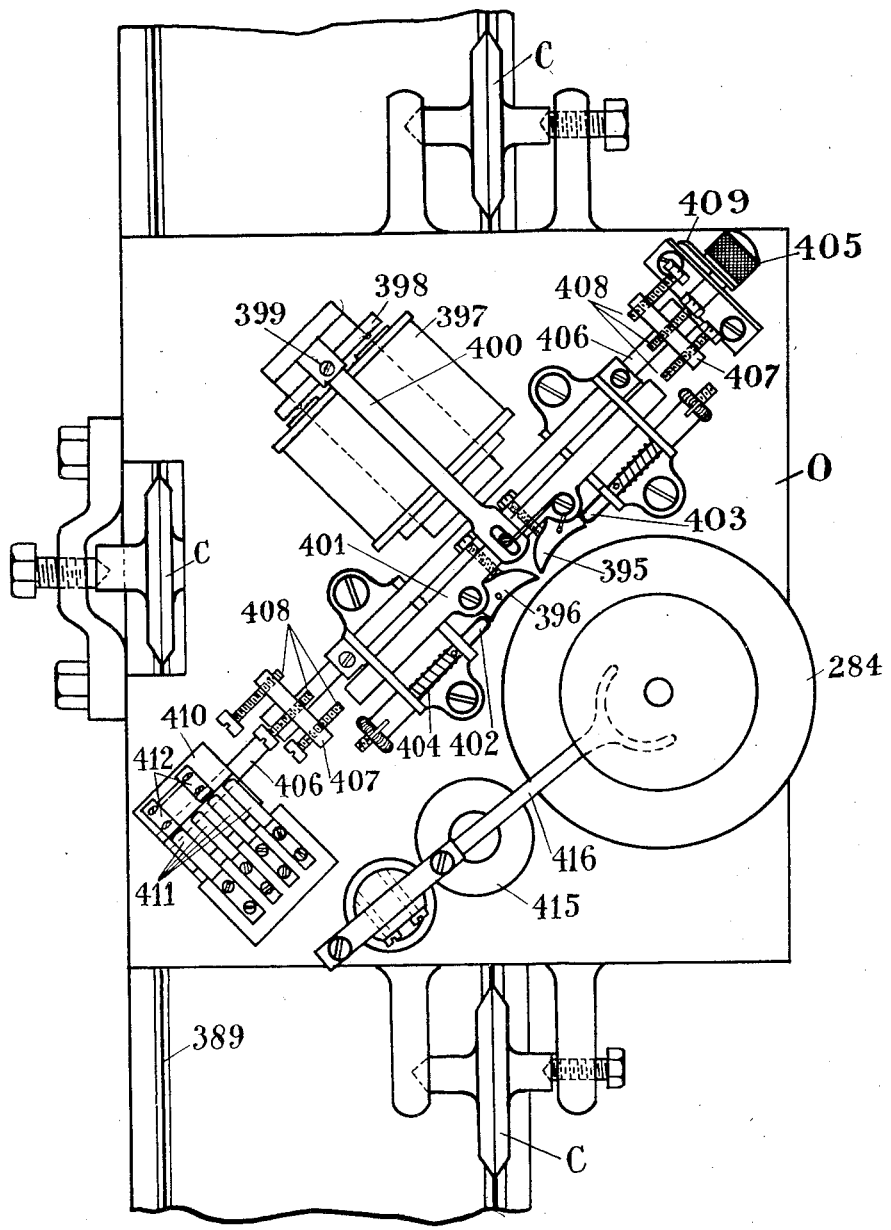

Feb. 6, 1934. W. WILKINS ET AL 1,945,928
MACHINE FOR PRODUCING OR REPRODUCING DESIGNS AND OTHER FORMS
Filed March 12, 1929 35 Sheets-Sheet 20

W. Wilkins &
E. J. Vandy
  INVENTORS

By: Marks & Clerk
      Attys.

Feb. 6, 1934. W. WILKINS ET AL 1,945,928
MACHINE FOR PRODUCING OR REPRODUCING DESIGNS AND OTHER FORMS
Filed March 12, 1929     35 Sheets-Sheet 21
—FIG: 29—
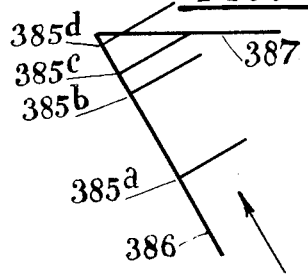
—FIG: 30—
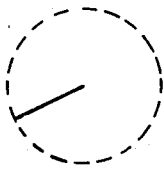
—FIG: 31—
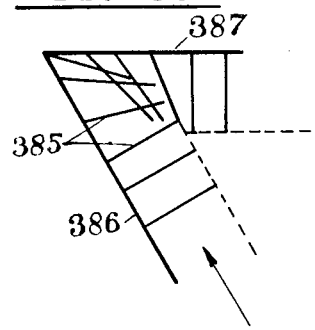
—FIG: 32—
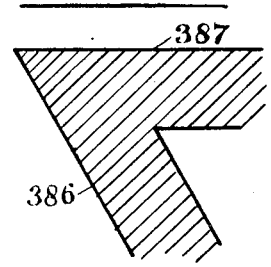
—FIG: 33—
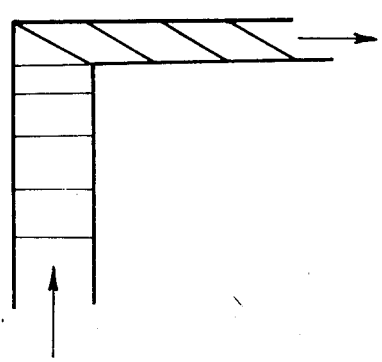
—FIG: 34—
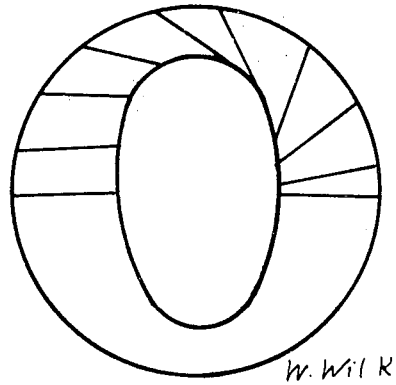
W. Wilkins &
E. J. Vandy
INVENTORS
by Marks & Clerk
Attys

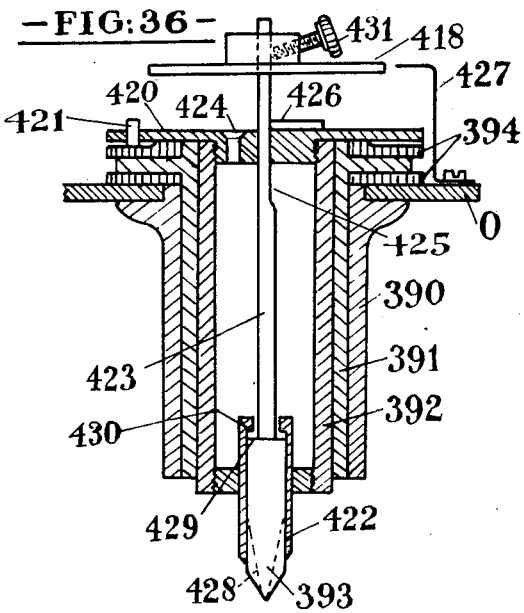
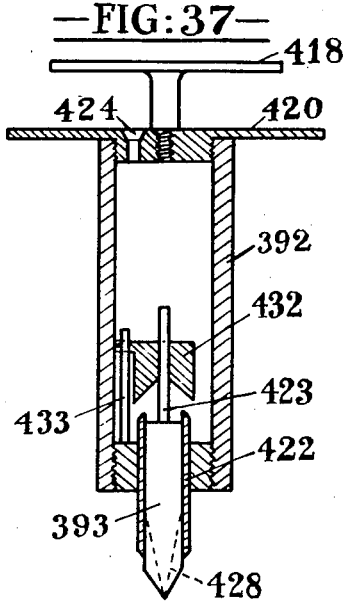
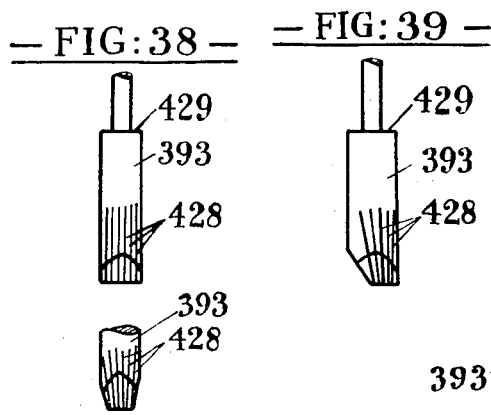
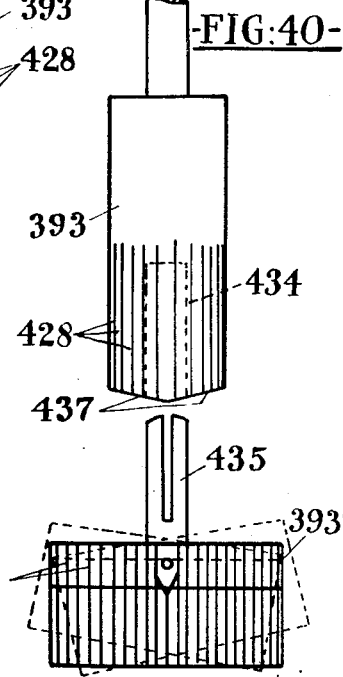
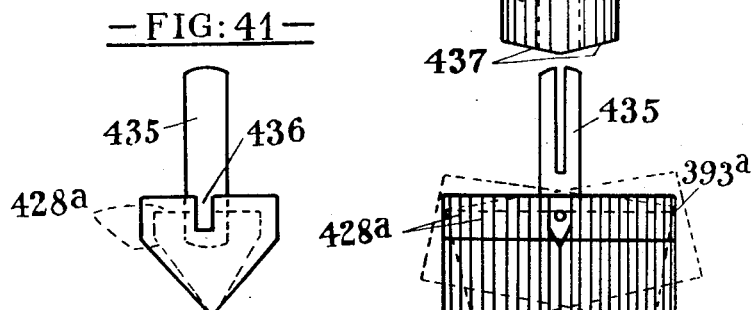

Feb. 6, 1934.  W. WILKINS ET AL  1,945,928
MACHINE FOR PRODUCING OR REPRODUCING DESIGNS AND OTHER FORMS
Filed March 12, 1929    35 Sheets-Sheet 23
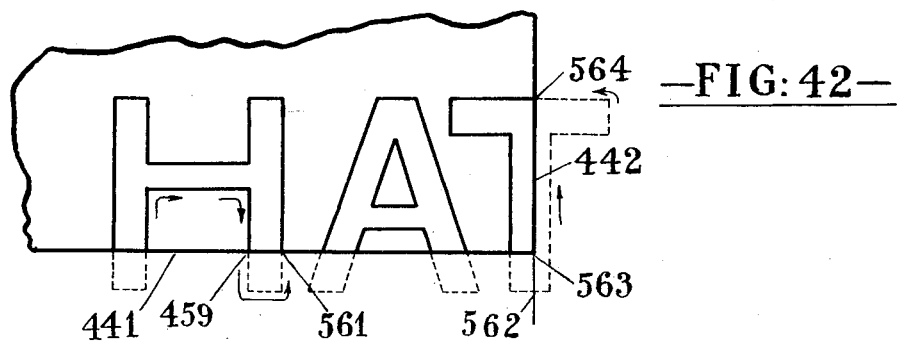
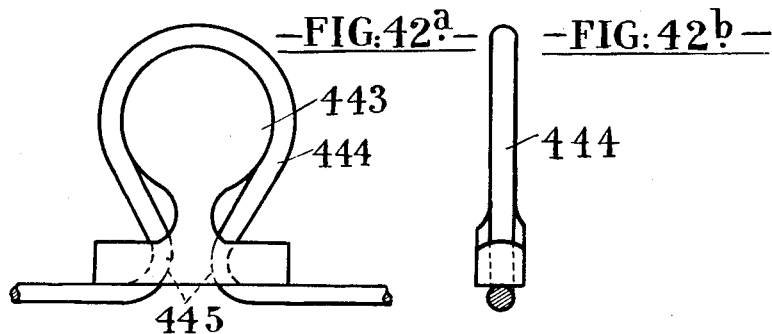
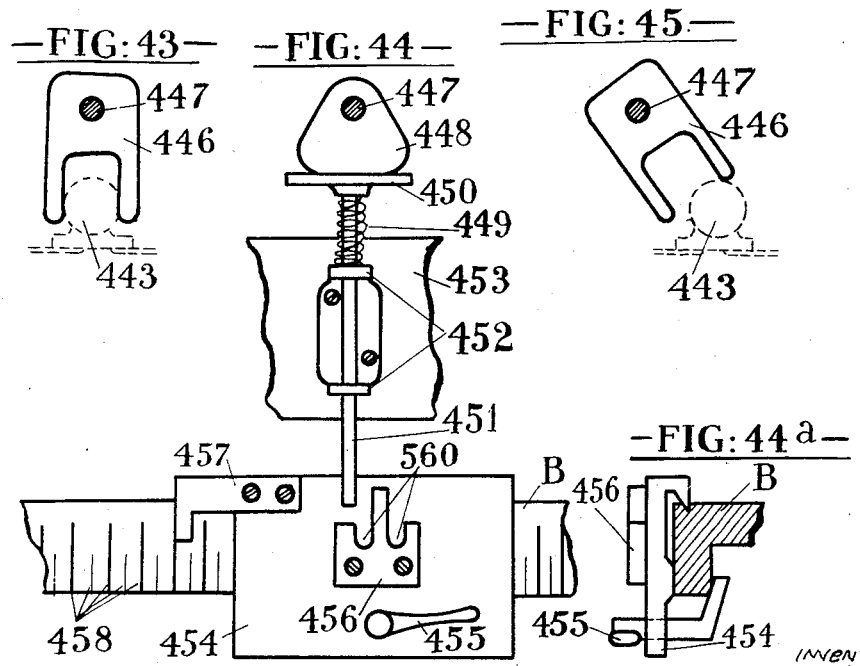
INVENTORS
W. Wilkins &
E. J. Vandy
By Marks & Clark
Attys.

Feb. 6, 1934.   W. WILKINS ET AL   1,945,928
MACHINE FOR PRODUCING OR REPRODUCING DESIGNS AND OTHER FORMS
Filed March 12, 1929   35 Sheets-Sheet 24
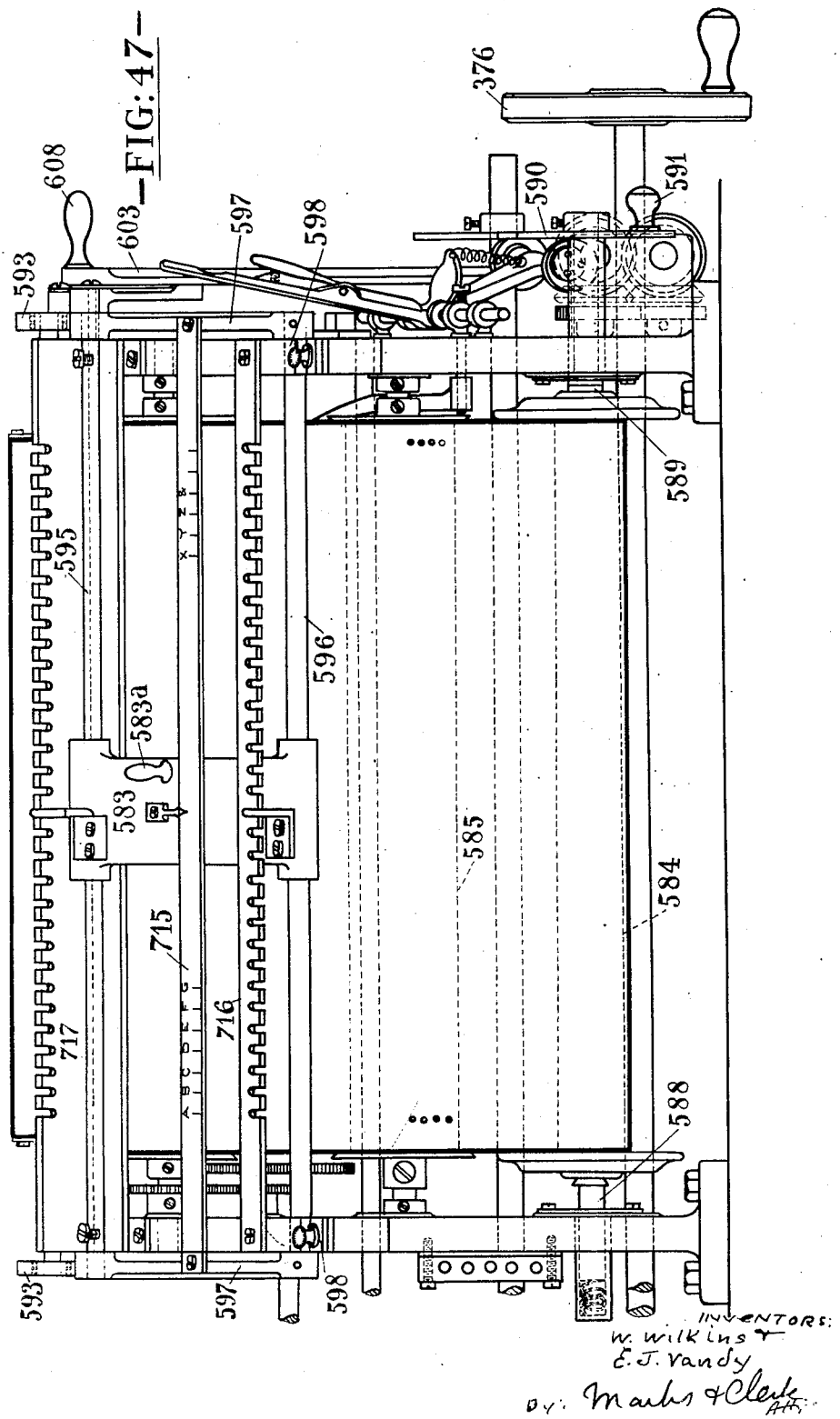

Feb. 6, 1934. W. WILKINS ET AL 1,945,928
MACHINE FOR PRODUCING OR REPRODUCING DESIGNS AND OTHER FORMS
Filed March 12, 1929 35 Sheets-Sheet 25
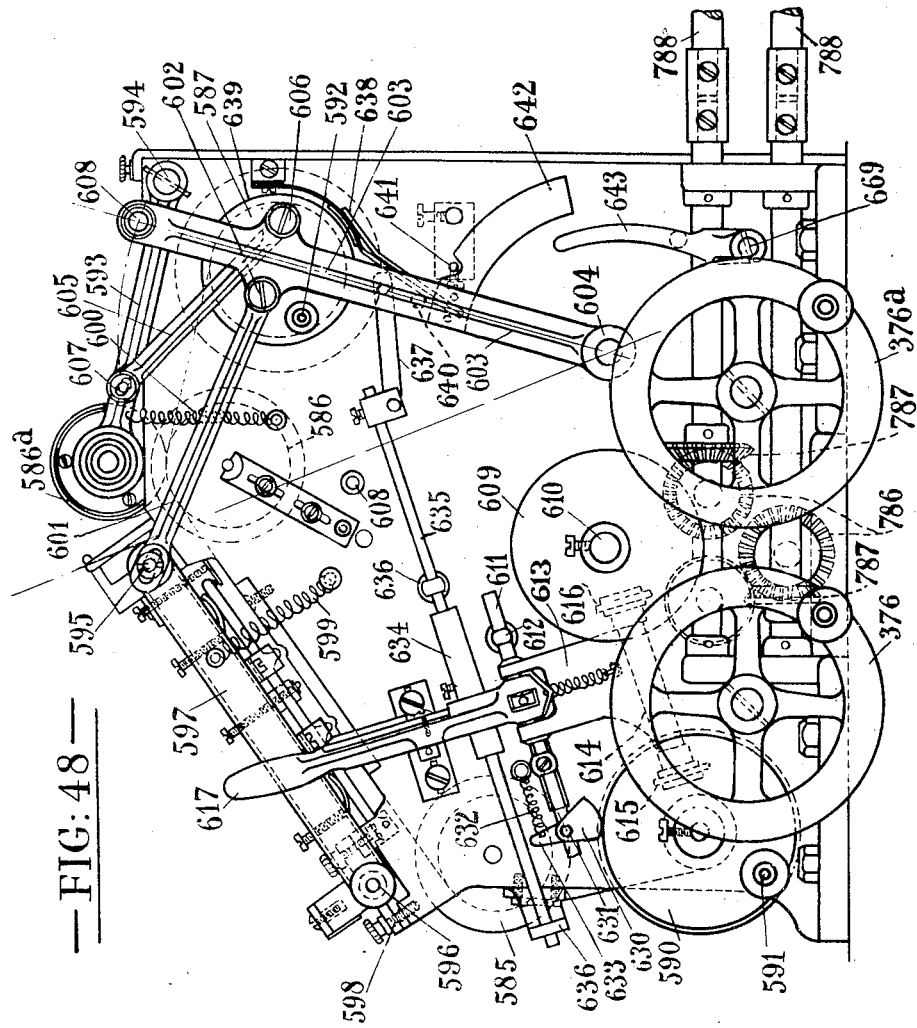
INVENTORS:
W. Wilkins &
E. J. Vandy
By: Marks & Clerk
Attys.

Feb. 6, 1934.   W. WILKINS ET AL   1,945,928
MACHINE FOR PRODUCING OR REPRODUCING DESIGNS AND OTHER FORMS
Filed March 12, 1929   35 Sheets-Sheet 26
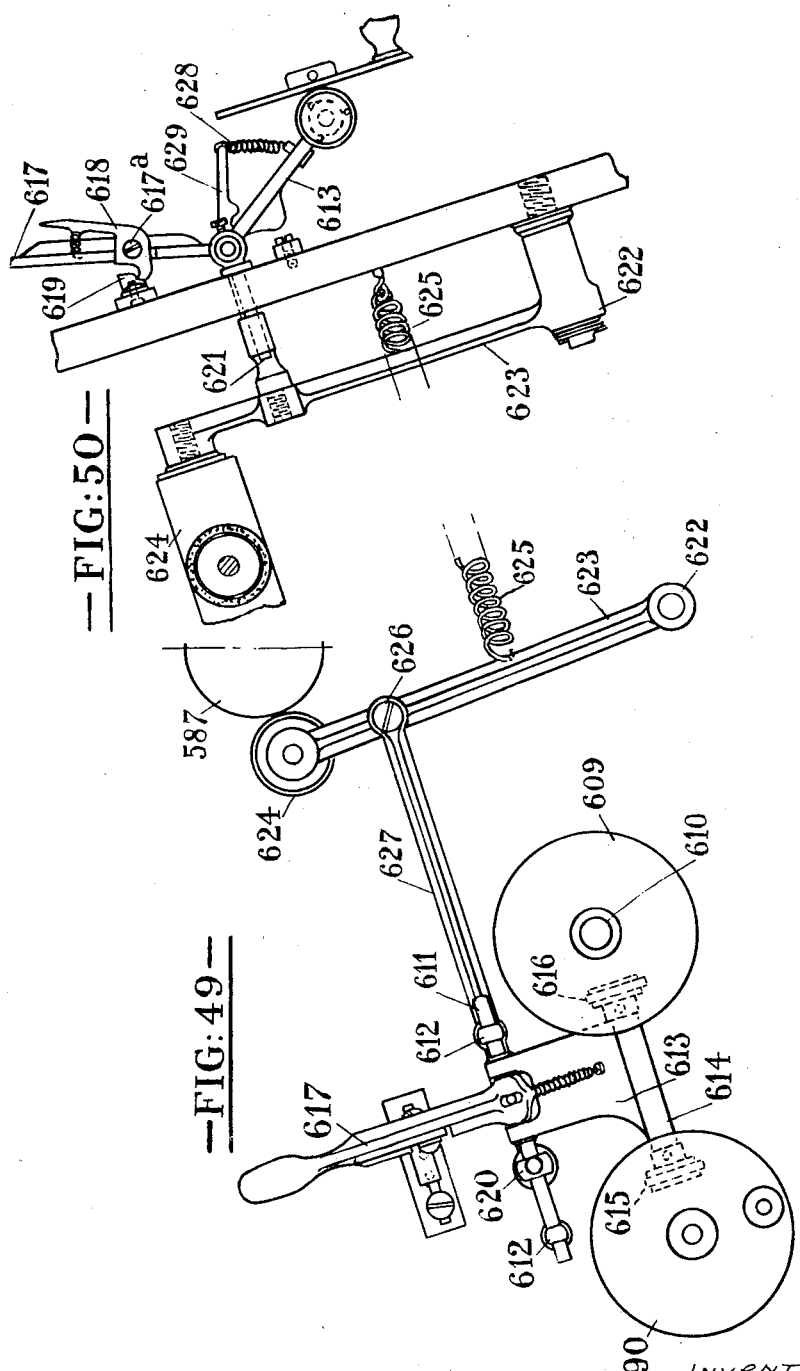
INVENTORS:
W. Wilkins &
E. J. Vandy
by: Mark & Clerk
Attys.

Feb. 6, 1934. W. WILKINS ET AL 1,945,928
MACHINE FOR PRODUCING OR REPRODUCING DESIGNS AND OTHER FORMS
Filed March 12, 1929 35 Sheets-Sheet 27
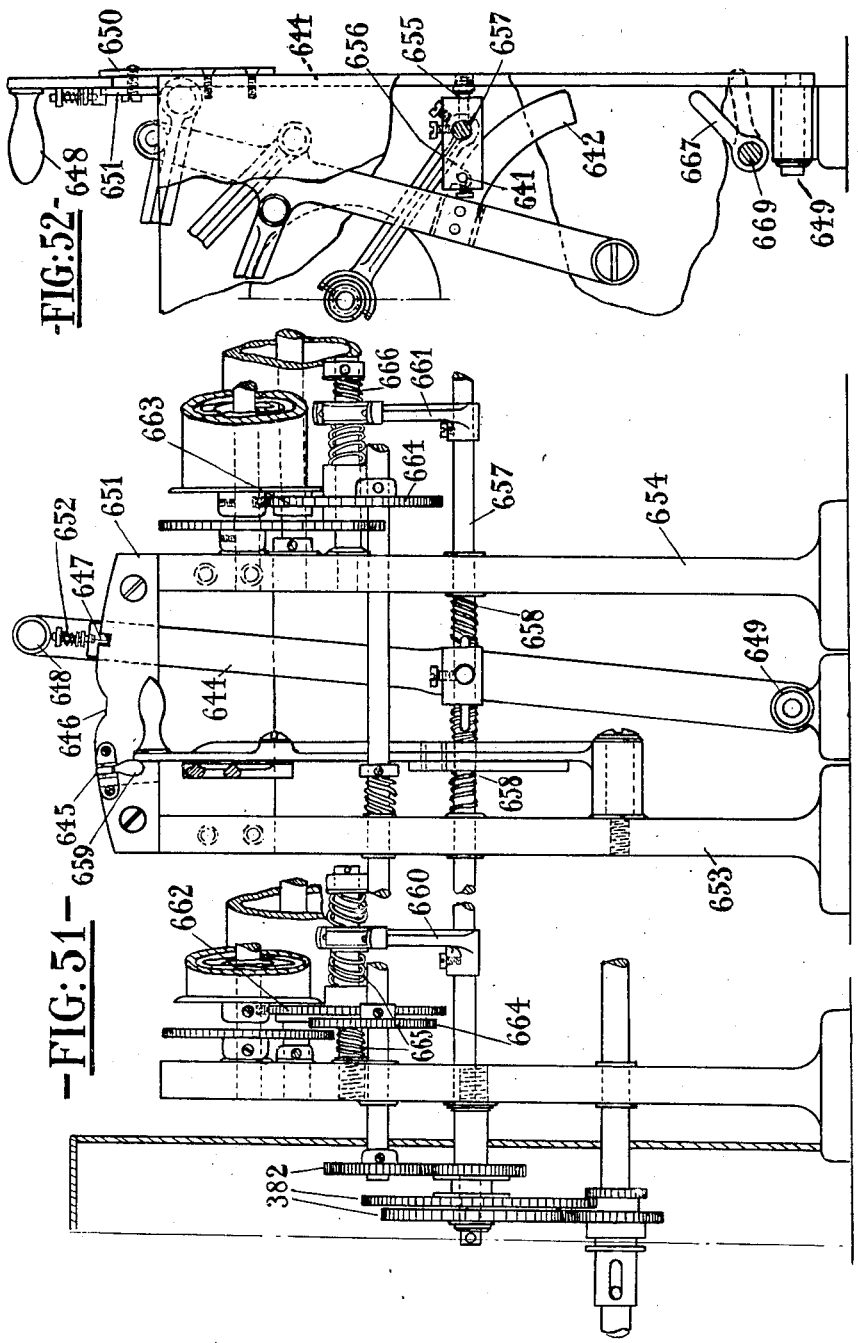
INVENTORS:
W. Wilkins &
E. J. Vandy
By: Marks & Clerk
Attys.

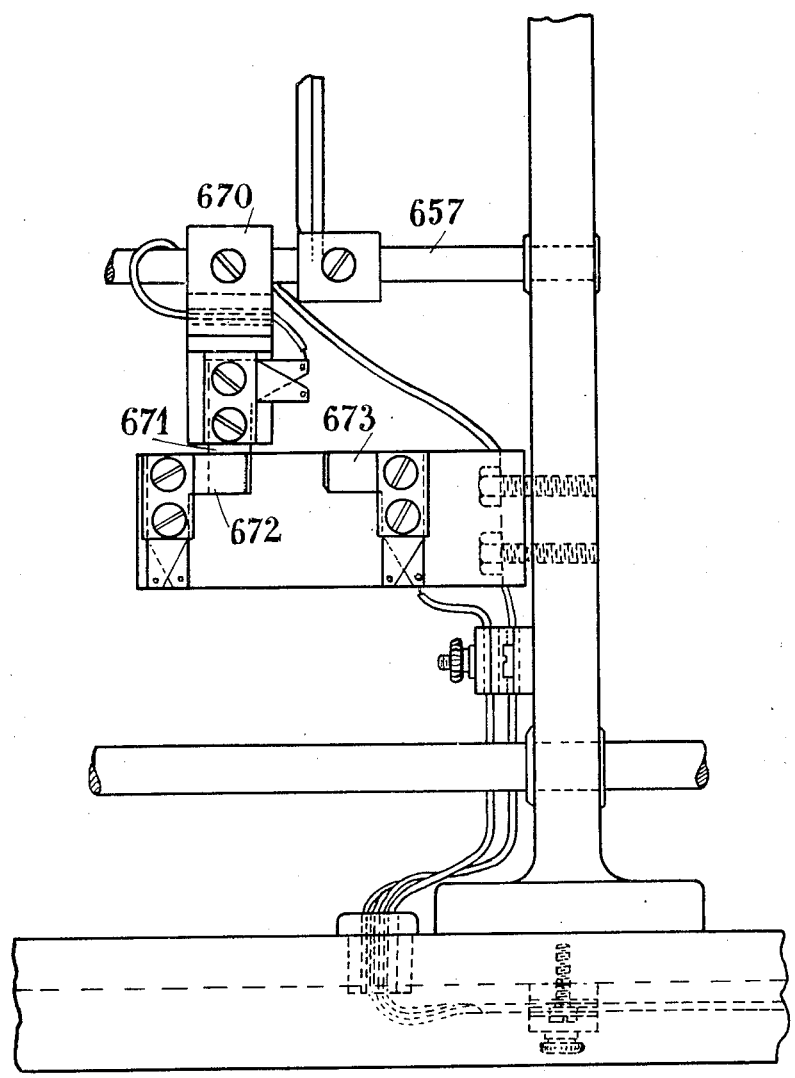

Feb. 6, 1934. W. WILKINS ET AL 1,945,928
MACHINE FOR PRODUCING OR REPRODUCING DESIGNS AND OTHER FORMS
Filed March 12, 1929 35 Sheets-Sheet 29
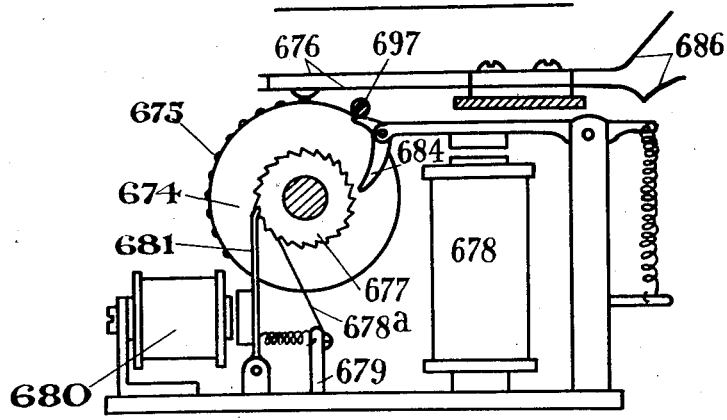
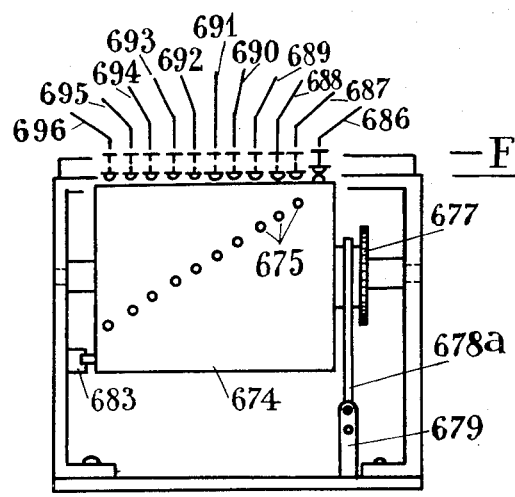
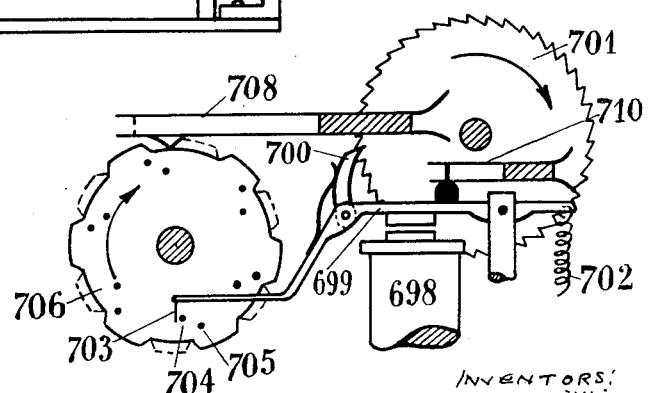
INVENTORS:
W. Wilkins &
E. J. Vandy
By: Marks & Clerk
Attys.

Feb. 6, 1934. W. WILKINS ET AL 1,945,928
MACHINE FOR PRODUCING OR REPRODUCING DESIGNS AND OTHER FORMS
Filed March 12, 1929    35 Sheets-Sheet 30
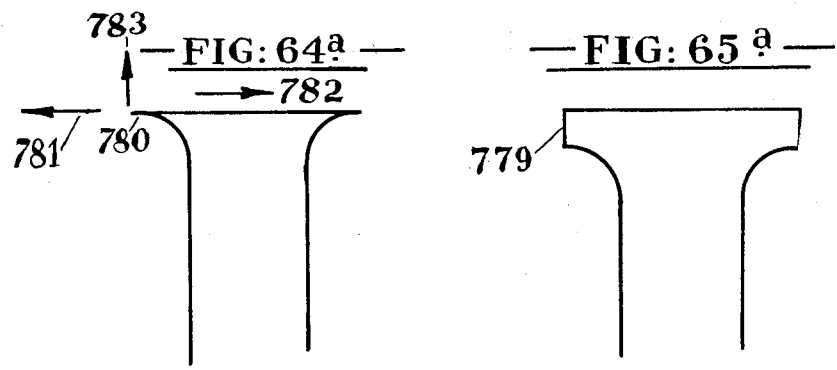
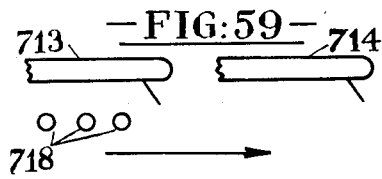
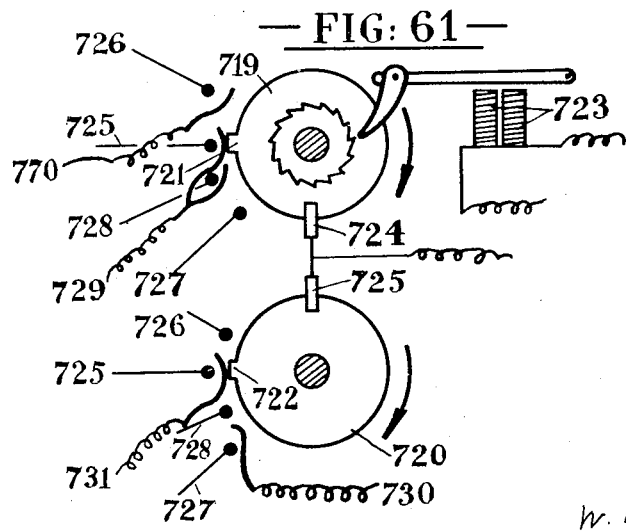
W. Wilkins &
E. J. Vandy
INVENTORS
By Marks & Clark
Attys.

Feb. 6, 1934. W. WILKINS ET AL 1,945,928
MACHINE FOR PRODUCING OR REPRODUCING DESIGNS AND OTHER FORMS
Filed March 12, 1929 35 Sheets-Sheet 31
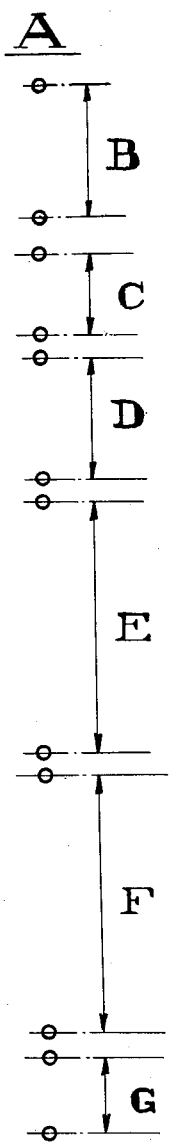
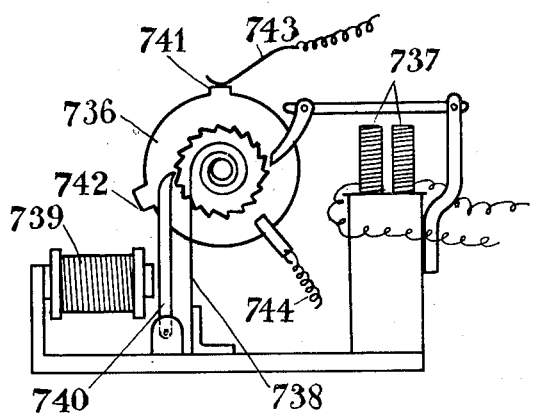
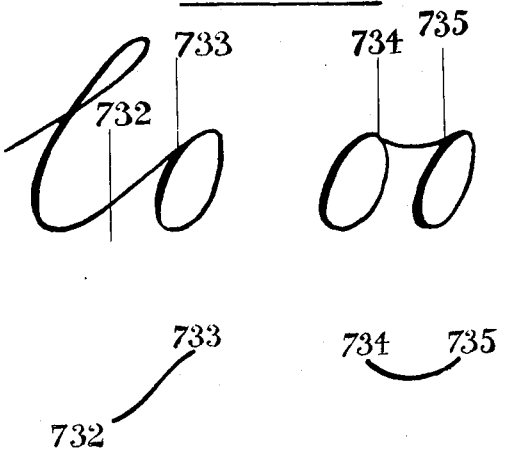
W. Wilkins &
E. J. Vandy
INVENTORS
By: Marks & Clerk
Attys.

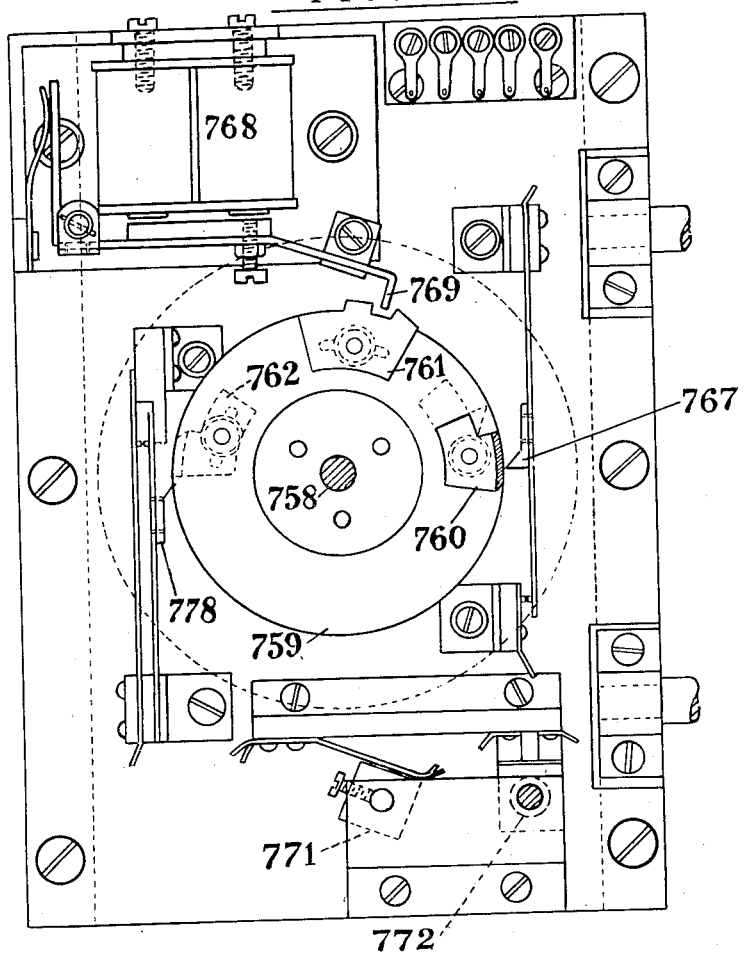
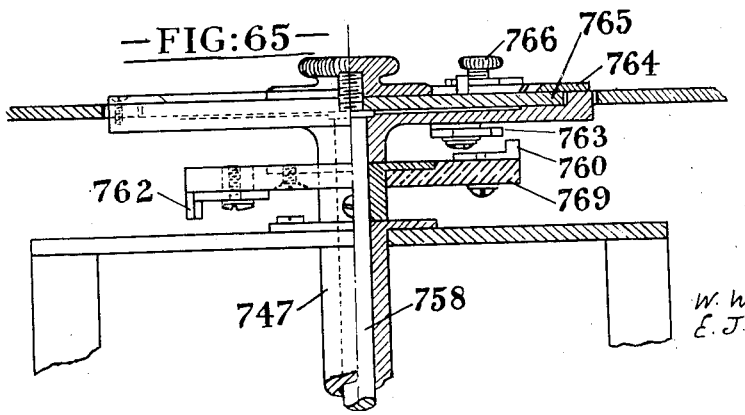

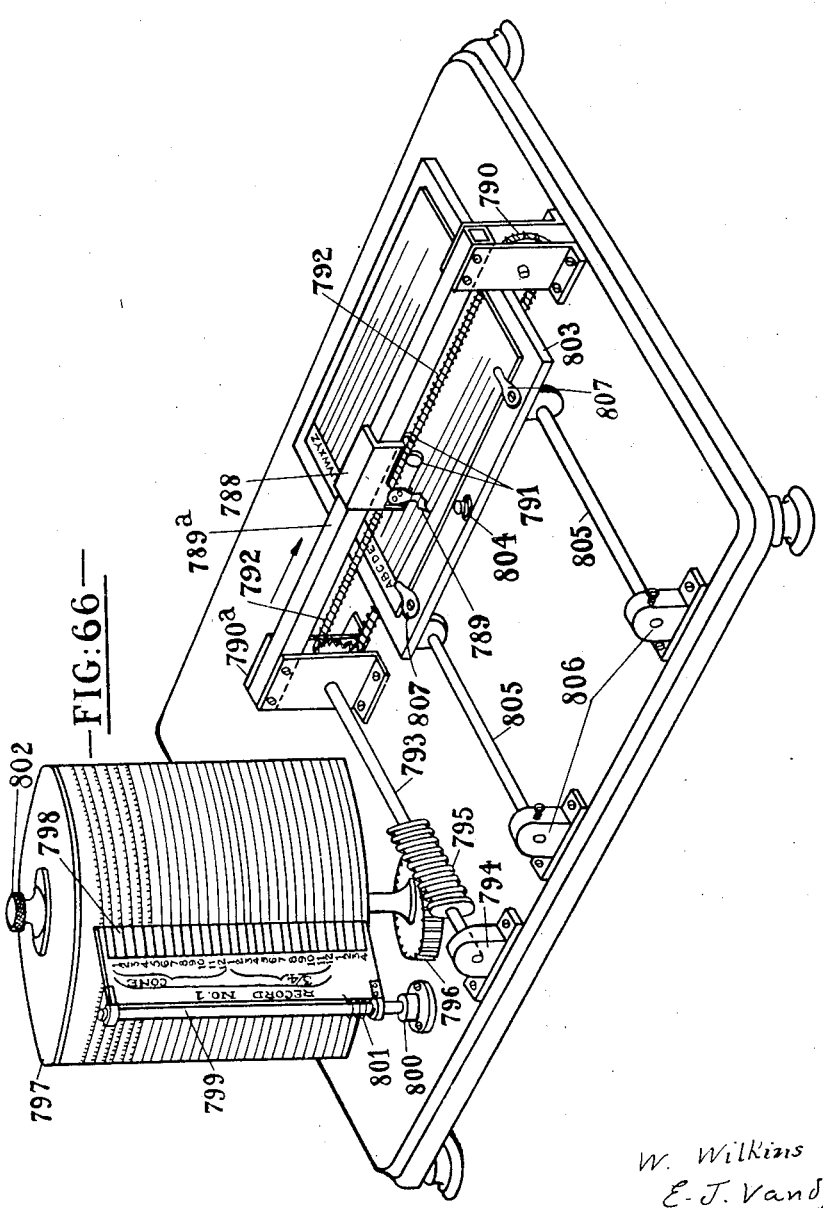

— FIG: 67 —
| GEAR Nº | | 1 | 2 | 3 | 4 | 5 |
|---|---|---|---|---|---|---|
| 1 | 0 | | | | | |
| 2 | 0 | ⅞ | 1¾ | 2⅝ | 3½ | 4⅜ |
| 3 | 0 | | | | | |
| 4 | 0 | | | | | |
| 5 | 0 | ¾ | 1½ | 2¼ | 3 | 3¾ |
| 6 | 0 | | | | | |
| 7 | 0 | | | | | |
| 8 | 0 | ⅝ | 1¼ | 1⅞ | 2½ | 3⅛ |
| 9 | 0 | | | | | |
| 10 | 0 | | | | | |
| 11 | 0 | ½ | 1 | 1½ | 2 | 2½ |
| 12 | 0 | | | | | |
— FIG: 68 —
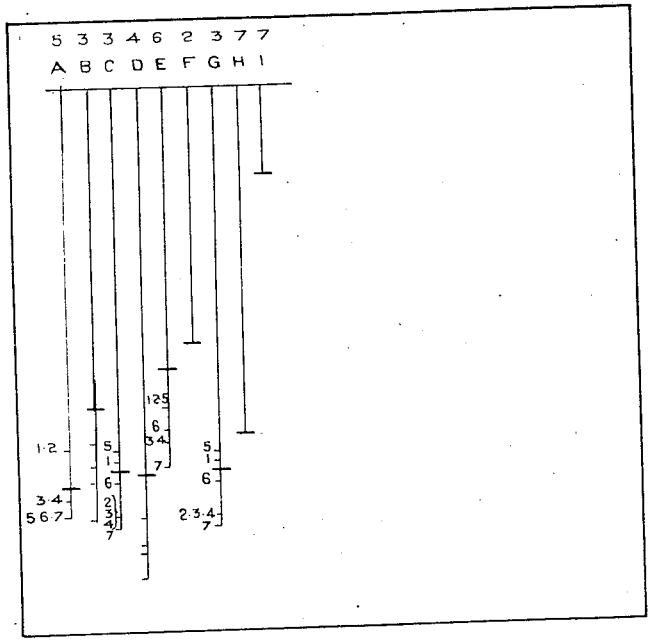
W. Wilkins &
E. J. Vandy
INVENTORS
By: Marks & Clerk
Attys Feb. 6, 1934.    W. WILKINS ET AL    1,945,928
MACHINE FOR PRODUCING OR REPRODUCING DESIGNS AND OTHER FORMS
Filed March 12, 1929    35 Sheets-Sheet 35

| READING EDGE | | | CYLINDER LENGTHS | | | | |
|---|---|---|---|---|---|---|---|
| RECORD | STEPS | GEAR | 0 | 1 | 2 | 3 | 4 |
| 1 | 96 | CONE ONLY | | ¼ ½ | 1 | 1½ 1¼ | 2 2 |
| | | CONE + ½ | | ¼ | ½ | ¾ | 1 |
| 2 | 64 | CONE ONLY | | | | | |
| | | CONE + ½ | | | | | |
| 3 | 48 | CONE ONLY | | | | | |
| | | CONE + ½ | | | | | |

W. Wilkins &
E. J. Vandy
INVENTORS

By  Marks & Clerk
Attys

Patented Feb. 6, 1934

1,945,928

UNITED STATES PATENT OFFICE 1,945,928

MACHINE FOR PRODUCING OR REPRODUCING DESIGNS AND OTHER FORMS

Walter Wilkins, Finchley, London, and Edgar Joseph Vandy, Manor Park, London, England, assignors of one-third to George Edward Vandy, London, England Application March 12, 1929, Serial No. 346,445, and in Great Britain March 14, 1928

104 Claims. (Cl. 33—18)

This invention relates to an improved machine for drawing, engraving, copying or reproducing designs, letter press, numerals and other forms on any suitable material or surface including lithographic stones.

The machine to be hereafter described is an improvement of the machine described and claimed in the specification of United States Patent No. 1,441,469.

In the machine embodied in the above patent, a marking instrument was controlled by the intermittent operation of output shafts in the form of two lead screws arranged at a right angle to one another, so that according to the amount of stepwise rotation imparted to such screws so the instrument would be moved in the desired direction. If one of the screws was held stationary and the other moved, then the carriage would follow a right line, if, on the other hand, equal movements were imparted to both screws, the resultant line produced would be at an angle of 45° and the angle could be varied by relatively adjusting the rotation of the screws.

In the system described, the movements imparted to the screws were such that they received a number of short intermittent rotational movements effected by a pair of escapements which were electromagnetically controlled by the movement of a record band in such a way that according to perforations made on the band, impulses of a variable frequency could be imparted to escapement wheels to drive the screws by a series of short intermittent impulses, the directional movements of the marking instrument being controlled by a direction wheel which caused impulses to be imparted to the escapement wheels and so varied the direction to be taken by the marking instrument.

One object of the present invention is a new construction of such a machine whereby the output shafts will receive an uninterrupted rotational movement by which the work may be produced at increased speed, the work will be steadier and the general controlling mechanism be very much simplified.

Another object of the invention is a driving mechanism which not only permits of a general speeding up of the machine, but admits of many speed variations depending upon the character of the work and applicable when desired whilst the machine is running.

A further object is to so adapt the machine that by simple manipulation it may execute work such as letterpress, in all forms, and to automatically space the characters apart with regard to the particular forms of any two letters or numerals that have to be drawn next to one another.

A still further object of the invention is the manufacture of a record band, from which work may be subsequently reproduced.

The invention principally consists in a draughting engraving or like machine, wherein forces acting at an angle to one another co-operate to provide an uninterrupted drive for producing relative movement between an operating instrument and a work support, whilst direction is imparted to such movement by relatively adjusting the forces through the medium of a mechanical record of predetermined form, the arrangement being such that the continuity of the drive is entirely independent of the record during the said relative movement.

The invention will now be described with reference to the accompanying drawings, in which:

Figure 1 is a diagrammatical view of the working arrangement of the machine,

Figure 2 is a perspective view of the machine,

Figure 3 is a plan view of a top panel showing the manually adjustable hands and indicating dials of the machine in position, Figure 4 is a diagrammatical view of the driving mechanism, Figure 5 is an end elevation of part of Figure 4, Figure 6 is a front elevation of the driving mechanism, Figure 7 is an end elevation of Figure 6, Figure 7a is an end elevation of a part of the driving mechanism, Figure 7b is a modification of the driving mechanism, Figure 7c is a side view of the modification shown in Figure 7b, Figure 8 is a perspective view of the driving shafts, Figure 9 is a front elevation of a group of mechanism, Figure 10 is an end elevation of Figure 9, Figure 10a and 10b are details, Figures 11 and 11a are diagrams, Figure 12 is an electrical circuit, Figure 13 is a diagram, Figure 14 is an elevation of a clutch member, Figure 15 is a transverse section of Figure 14, Figure 16 is a detail of the clutch member, Figure 17 is a diagram, Figure 18 is a side elevation of a group of mechanism, Figure 19 is a transverse section of Figure 18 on the line 19—19, some of the parts being cut away,

Figure 20 is a side elevation of the reversing cam mechanism detached,

Figure 21 is a sectional elevation of the reversing discs and the mounting thereof, Figure 22 is a transverse section of group $X^4$, Figure 23 is a view of the driving pulleys and the mounting thereof, Figure 23a is an end view of a carriage supporting wheel and its associated track, Figure 24 is a diagram, Figure 25 is a diagrammatical view of the differential coupling for superimposing the complementary motions, Figure 26 is a plan view of a constructional form of the couplings for superimposing the complementary motions, Figure 27 is a plan view of the instrument carriage, Figure 28 is a side elevation of Figure 27, Figures 29, 30, 31, 32, 33 and 34 are diagrams, Figure 35 is an electrical circuit, Figure 36 is a transverse section of the marking instrument, Figure 37 is a modification of Figure 36, Figures 38, 39, 40 and 41 are detail views of the pen blade of the marking instrument, Figure 42 is a diagram, Figure 42a and 42b are details, Figure 43 is a view of the attachment between the driving wires and the bridge and carriage, Figure 44 is a front elevation of the trip device, Figure 44a is a detail of Figure 44, Figure 45 is a view of the attachment, shown in Figure 43, being released, Figure 46 is a view of a feeler member, co-operating with a perforated record band, Figure 47 is a front elevation of a record frame, Figure 48 is an end elevation of Figure 47, Figures 49 and 50 are front and side elevations respectively of the means for automatically rewinding the record band upon the delivery roller, Figures 51 and 52 are front and side elevations respectively of the change-over lever and its associated elements, Figure 53 is a switch for completing the electrical circuit of the record frames, Figures 54 and 55 are front and end elevations respectively of the selector, Figure 56 is a front elevation of the impulse wheels associated with the selector, Figure 57 is a detail of Figure 56, Figure 58 is a diagrammatical view, showing the relative positions of the feeler members, Figure 59 is a diagrammatical view of two feeler members co-operating with the same line of perforations in a record band, Figure 60 is a diagrammatical view of the perforations for effecting automatic spacing, Figure 61 is a diagrammatical view of the automatic spacing mechanism, Figure 62 is a diagram, Figure 63 is a diagrammatical view of a modified form of the automatic mechanism, Figure 64 is a plan view of the additional spacing device, Figure 65 is a transverse section of Figure 64, Figures 64a and 65a are diagrams, Figure 66 is a perspective view of the calculating apparatus, Figure 67 is a developed view of the calculator indications, Figure 68 is a view of a card for use with the calculating apparatus, Figure 69 is a diagram, Figure 70 is a developed view of modified calculator indications.

Before commencing to describe the whole machine in detail, reference is first made to Figure 1, which diagrammatically illustrates the general working system in plan view.

A represents the surface upon which the design is to be drawn and extending transversely over such surface is a bridge B supported at each end by rollers C adapted to roll to and fro on rails D, by means of a pair of taut wires or cables E attached by clips F to the bridge. Each of the wires is looped at one end around an idler pulley G on a shaft H extending along one side of the working surface A whilst the free ends of the wire are wound in opposite directions and anchored upon a pair of pulleys K carried upon a driving shaft L extending along the other side of the working surface. Thus as the shaft L is driven in one direction or the other, so the bridge is drawn to and fro in the direction indicated by the double arrow M, N, the wire always remaining taut.

Mounted upon the bridge B is a wheel carriage O that may be drawn up and down on it by a similar arrangement of taut wires or cables P anchored to the carriage at O' and looped at one end around an idler pulley Q, and at the other end wound in relatively opposite directions around a driving pulley R carried on one end of the bridge. The pulley R is so mounted by means of a feather S on a lay shaft T that it may be slid longitudinally thereon to cover the length of the working surface. The shaft in its turn is driven through worm gear U by a driving shaft V. By means of the shaft T the carriage O may be moved to and fro on the bridge transversely of the working surface in the direction of the arrows W, Y, at any convenient angle, but preferably a right angle to the movement of the bridge in the direction of the arrows M, N. The marking or other instrument Z is mounted on the carriage.

When both of the shafts L and V, which may be termed the complementary motion shafts, are rotated at equal speed, the bridge, driven in the direction of the arrows M, N, and the carriage in that of the arrows W, Y, causes the marking instrument Z to trace a resultant line at 45° as shown by the dotted line. If their relative speeds are unequal, the resultant line will be at a different angle, while a right line may be drawn by stopping one of the driving shafts altogether. Provision is also made for reversing the rotation of both shafts.

For driving the complementary motion shafts L, V independently two groups of driving mechanism $a$, $b$ are shown, each comprising an epicyclic train $c$, $d$ driven in parallel by shafts $e$, $f$ from a prime mover such as an electric motor $g$. By means of the belt pulley drive shown, the motor directly drives the shaft $e$ which in turn drives the shaft $f$ through the bevel gearing $h$ and cross shaft $k$. Such a driving arrangement is shown merely by way of example, and Figure 1 also shows a record band $l$, adapted to electrically control the various actuating circuits as being driven by the shaft $e$.

As will be hereinafter described in detail, each driving group $c$, $d$ comprises a series of sun and planet units $c'$ $c^2$ $d'$ $d^2$ and so on, and a differential $m$ and $n$ of usual form, certain elements of these driving groups being rotated in relatively opposite direction from shafts $e$, $f$. Thus the shaft $e$ by spur gears $e'$ $e^2$ drives one side of the differential $m$ in one direction and by spur gears $e^3$, $e^4$, $e^5$ drives the shaft 71 (Fig. 4) supporting the epicyclic units in the opposite direction. The same applies in the other driving group operated by shaft $f$, spur gears $f'$ $f^2$, and spur gears $f^3$, $f^4$ and $f^5$. Finally the resultant epicyclic motion is transmitted to the shafts L, V through the differential gears $m$ $n$ and spur wheels $o$ $p$ mounted on output shafts $q$, $r$ of which $q$ drives the complementary motion shaft V through bevel gears $s$, while shaft $r$ drives the other complementary shaft L through worm gearing $t$.

To vary the speed of the various wheels of the two epicyclic groups $c$, $d$ there is used a central shaft $u$ fitted with a number of cams $u'$ $u^2$ $u^3$ and so on corresponding to the elements $c'$ $c^2$ $d'$ $d^2$ etc., and corresponding sets of pawls generally by $v$, $w$, causes the epicyclic units to be stopped or released as desired by the stepwise rotation of the cams $u'$ $u^2$ etc. on shaft $u$. Such an adjustment of the cams is secured by a ratchet wheel $x$ on the end of the shaft $u$ actuated by pawl $x'$ and magnet $y$ shown as in circuit with a wiper $z$ coacting with the record band $l$.

The foregoing gives a general indication of the mechanism by which the marking instrument is directed and as will be hereinafter described, numerous other manipulations are provided for, such as general slowing-down or speeding-up of the work, reversing, changing the shapes of the letters or numerals and so forth.

Describing now the apparatus in detail, Figure 2 shows it in general perspective view in which the work surface A is arranged behind all the working and controlling mechanism of the machine the whole being supported on a suitable work bench.

The controlling mechanism is shown as divided into five groups in which X is the epicyclic driving mechanism which has been briefly described above, X' the recording band mechanism comprising a pair of frames on one of which a record band $l$ is shown in position; $X^2$ the means such as $x$, $x'$ and $y$ for controlling the cam shaft, $X^3$ groups of gears for obtaining further variations in the speed of the output shafts, and $X^4$ still further groups of gears to be hereinafter described, and with the machine in working order groups X, $X^2$, $X^3$ and $X^4$ are closed in by the cover plate $X^5$ shown detached in Figure 3.

Referring now to Figures 4, 5, 6, 7 and 8 the epicyclic group $c$ is shown as comprising four, for example, groups of gears $c'$ to $c^4$ carried on a shaft 71. One such group consists of the large ratchet wheel 72, the teeth around the circumference of which face in the direction shown in Figure 5, and carries by means of support 73 a pair of spur wheel planet pinions 74 and 75, adapted to mesh with a corresponding pair of sun pinions 76 and 77 mounted loosely on the central shaft 71. The pinion 76 is loose on the central shaft and is integral with one side wheel 79 of the differential $m$ while the other side wheel 80 is also loose on the shaft and is integral with the spur wheel $e^2$. These two side wheels 79—80 are geared together by the usual planetary pinions 81 which together carry the spur wheel 82 which, as described in connection with Figure 1, is in the case of group $c$ in gear with the spur wheel O on the work output shaft $q$. A similar differential is used in connection with the epicyclic group $d$, the differential spur wheel 82 of which is in gear with the wheel $p$ on the other work output shaft $r$.

As will be seen in Figure 4, the epicyclic group $c$ is made up of four groups $c'$ to $c^4$ and a larger or smaller number of groups may be used as desired. The same planet system is used for each and the same reference numerals apply with the addition of an index letter, for instance the large ratchet wheel 72 of unit $c'$ is denoted $72a$ for the unit $c^2$, $72b$ for the unit $c^3$ and $72c$ for the unit $c^4$ and so on. In the first group it will be seen that the planet wheel 74 is in gear with the first sun pinion 76 and that the planet wheel 75 is geared to a pinion 77 integral with a pinion 83 and both mounted loosely on the centre shaft 71. These two pinions serve to carry on the planetary moving parts from group $c'$ to $c^2$ and a similar arrangement is shown in connection with the other groups. Each ratchet wheel 72 of each group has a second ratchet wheel 78 close beside it which is keyed on the centre shaft, and two detents 84 pivoted on the wheel 72 are engaged with the teeth of the ratchet 78. From the arrangement thus described it will be understood that the ratchet wheels 78, $78a$ and so on will be driven by the centre shaft 71 from the spur wheel keyed on one end thereof, while the various planet elements are driven through the differential $m$ from the spur wheel $e^2$ mounted loosely on the centre shaft 71. The rotation of wheel $e^2$ and the said ratchet wheels are respectively opposite to one another and are of equal speed. In the finished construction of this epicyclic gearing shown in Figure 6, where six groups are shown, the planet members of each group are supported by bearing rings 85, also shown separately in Figure 7a.

The general operation of this epicyclic gear under three conditions is as follows:—

Case 1

Considering one epicyclic group such as 76, 74, 72, 75, 77, 78 if the wheel 77 is held stationary and a rotational force in the direction of the arrow (Figure 5) is applied to 76, then the wheel 72 carrying with it the planets 74, 75 will perform an orbital movement in the same direction and 76 can only be rotated if 72 is allowed to do so. If the central shaft 71 and the ratchet wheel 78 are also revolving in the same direction at a given rate, then the speed of rotation of 72 will be limited to the speed of the shaft 71 and ratchet wheel 78 by reason of the pawls 84 engaging the ratchet wheel 78, and this will also govern the speed attainable by the spur wheel 76.

Case 2

Conversely if the large wheel 72 is held stationary as will be described, and 77 is freed, then the rotational force at 76 will revolve as before, the whole now forming a simple gearing train. The speed of 76 in such a case will depend upon that allowed to 77.

Case 3

As 76 may be revolved if either one of 72 or 77 is freed, the other in the meantime being held, it is apparent that 76 may be rotated at a speed equivalent to that in Case 1 added to that in Case 2 if 72 and 77 are both freed and neither of them held and both revolving in the same direction as the arrow. Hence with 78 and 77 rotating at given speeds, always assuming the same direction, the amount of rotation allowed to 76 may be governed over two speeds by simply holding or releasing wheel 72, the speed of 76 being of course greater in the latter case, the conditions then being equivalent to Case 3. Such a governing or controlling may in practice be achieved by causing a pawl $v'$, $v^2$ and so on to engage with or to disengage from the teeth in the periphery of the large wheel 72 as will be presently described in detail.

These speeds are given by the following formulæ:

Case 1

$$1-(77/75 \times 74/76)$$

which is the proportion of rotation 76/78 where the rotation of 78 is 1.

Case 2

$$(77/75 \times 74/76)$$

which is the proportion of rotation 76/77 where the rotation 77 is 1.

Case 3

$$(77/75 \times 74/76) +1-(77/75 \times 74/76)$$

These fractional figures are merely the numerical references of the gears concerned and may be substituted by diameters or numbers of teeth.

As was explained, however, in Case 2 the speed of 76 can be governed also by the speed of 77, hence by varying the speed 77, a still further number of speeds are possible to 76. Now the speed of 77, it being coupled to 83, can be controlled by stopping and releasing the wheel 72a in exactly the same way as 76 is controlled by 72. It is clear therefore that 76 can be still further controlled by the wheel 72a, and likewise by 72b, 72c, and by as many such wheels or groups as are used.

The actual number of speeds possible to 76 is given by the formula $2^n$ (i.e. two to the $n$th power) where $n$ is the number of epicyclic groups, $c'$ $c^2$ and so on that is used.

Hence the wheel 76 may be controlled over a large number of rates of rotation in a very simple way merely by stopping or releasing the respective wheels 72, 72a, 72b etc., in various combinations, by, for example, causing the detents or pawls already referred to, to be engaged with or disengaged from their toothed peripheries.

This is effected in the present construction by stepwise rotating the various cams $u$ $u'$ etc., which act upon the various pawls $v$ $v'$ etc., and $w$, $w'$ etc., as will be described with reference to Figure 7.

It should be noted for the sake of clearness that the wheels 72, 72a etc., do not all have the same degree of effect on 76. For example if 72a is released it will have a different effect on 76 than if say 72 were released. This can be shown by considering the gear as a whole and assuming that all the wheels 72 72a etc., are held and the final wheel 77c is revolving steadily. The whole then forms a simple gearing train and the speed of 76 relatively to 77c can be worked out by the formula usual for such cases. If now 72c is allowed to revolve at a speed governed by 78c as described, the additional speed it gives to the wheel 83b by the formula for Case 3, is modified by the rest of the train between 83b and 76. But if instead wheel 72a is allowed to revolve, the additional motion it gives to 83 is modified by a much smaller train and therefore will have a greater effect on the speed of 76 than 72c.

Such a construction of variable speed mechanism permits of a very large number of speed changes to be obtained rapidly by simple means from a relatively small number of epicyclic groups occupying but little space, and constitutes one of the valuable features of this type of gearing.

Instead of the differential system described for driving the epicyclic gear shown in Figure 4, rotational force may be applied to the wheel 76 through a spring or friction drive from a prime mover, the required or modified movements being taken directly off the wheel also, and the spring or friction drive giving or slipping to allow of these changes of speed. Or again the wheels 72 may have spur teeth as shown in Figure 7b, meshing at one speed with a pinion 86 carried on the driving shaft $e$ and rotated through the clutch 87, or for another speed the wheel 72 is fitted with a second spur wheel 88 which is in mesh with a wheel 89 driven from the shaft $e$ through a second clutch 90 this latter being the position illustrated, the other clutch 87 being put out of action. In this way the wheel 72 can receive one of two speeds as well as a stationary condition, giving a greater number of speeds for the gear without increasing the number of groups. Other modifications of the gearing may be devised without changing the essentials of such a variable drive.

Referring again to the gearing shown in Figure 4, the final modified speed is given out to the centre wheel 82 of the differential $m$. If now it be assumed that all the wheels 72 are released, the entire epicyclic train will revolve en block with the spindle 71, carrying around with it the differential wheel 79. In such a case both sides of the differential i.e. wheels 79, 80 will be revolving at the same rate in opposite directions so that no motion is imparted to the centre wheel 82. If, however, one of the wheels 72 is stopped, the speed of 76 and consquently 79 is somewhat lessened, so that now 79 and 80 are travelling at different speeds, and therefore 82 receives a resultant speed which is equal to the difference so that a positive drive is given out.

It will be observed, however, that if there were an appreciable load on 82, its resistance to motion would merely cause one or other of the wheels 72 whichever one happened to be free, to revolve at a greater rate than formerly and dissipate all the motion that would otherwise be communicated to 82 were it not for the ratchet wheels 78 which limit the speed of the wheels 72 at all times to that of the spindle 71.

It is apparent therefore that by stopping the wheels 72 various rotational speeds are given out at 82, these speeds of wheel 82 increasing as the speed of wheel 76 becomes less and less. The resistance to motion of the apparatus being driven causes the aforesaid rotational force to be applied to the wheel 76 through the differential from spur wheel $e^2$. In order that the wheels 72 may rapidly gather up speed when released, a suitable method of driving may be employed such as the application of a small amount of friction to the wheels 72 from the spindle 71 and this may consist of a free wheel device that may serve the dual purpose.

Although many changes of speed may be imparted to the complementary motion shafts L, V by the epicyclic assemblies described, provision is made as will hereafter appear, to interpose between the output wheels 82 and the said shafts, various other devices and gears for obtaining still further changes.

Referring now particularly to Figures 6 and 7, these illustrate the definite construction of this driving mechanism in front and end elevation, and shows the cam shaft $u$ arranged centrally between and somewhat higher than the driving spindles 71 of the epicyclic groups $c$, $d$ of which six are shown. Further, the various wheels 72, 72a and so on, are provided with duplicate planetary sets of wheels 74 and 75, as shown in Figure 7a. It is to be noted that the system of driving the parts of the epicyclic assembly shown in Figure 4 is diagrammatic only, and cannot be adopted for the construction shown in Figures 6 and 7. In order to show the drive clearly, a perspective view thereof as detached from the machine is given in Figure 8. As in Figure 4, $e$ is the constantly rotating driving shaft and the two shafts 71 are each used for one of the driving groups or assemblies. The wheel $e^3$ in each case drives one end of an assembly in the direction of the arrow, while the wheel $e^2$ in each case drives the other end of the group in the opposite direction as shown by the arrow. On the main shaft $e$ turning in a clockwise direction are three spur wheels 91, 92, 93 of which 91 directly gears with $e^3$ and drives right hand end of an assembly in an anti-clockwise direction. Wheel 92 on the main shaft $e$ drives the wheel $e^2$ at the left hand end of the other driving group in an anti-clockwise direction and which wheel $e^2$ is loose on its shaft 71. The third wheel 93 on the shaft $e$ drives a wheel 94 on an intermediate shaft 95 anti-clockwise, and such shaft by means of a wheel 96 thereon drives the loose wheel $e^2$ in a clockwise direction at the left hand end of the first assembly. Shaft 95 carries a third wheel 97 to directly drive the wheel $e^3$ in a clockwise direction at the right hand end of the second driving group.

As will be seen in Figure 6, the various shafts carrying the epicyclic groups, the driving wheels, the cam and other shafts, are supported in suitable bearings on the frames 98, 99, the main shaft $e$ extending through the frame 99 into an adjacent group of mechanism illustrated in Figures 2, 9 and 10 where it carries a grooved driving pulley 100 driven by means of a belt or cable 101 from an electric or other motor not shown. By this means therefore both epicyclic groups are driven so that a steady constant rotation will be ultimately imparted to the output shafts $q$, $r$, equal or unequal as the case may be, depending upon the particular adjustments of the respective epicyclic units by the cams $u'$, $u^2$ etc.

The construction of these cams and their corresponding pawls are clearly shown in Figure 7 where the cam-shaft $u$ carries a set of cams $u'$ each of which coacts respectively with a corresponding epicyclic unit $c'$ $c^2$ etc. The cams are in the form of discs $u'$ having peripheral projections and recesses which coact with pawls $v'$ $v^2$ etc., on one side and pawls $w'$ $w^2$, on the other side. Shafts 103 provide a pivotal support for each of the pawls, the noses of which are kept constantly pressed against the cam surfaces by leaf springs 104 anchored at 105 to the machine frame. Each pawl is formed with a tail-like extremity 106 and acts as a detent to engage the ratchet teeth of the speed controlling wheels 72, 72a, 72b etc., of each epicyclic unit, the arrangement being such that when a recess on the cam permits one of the pawls to move inwards, its opposite detent end moves outward to check the corresponding speed wheel.

From the above description it is clear that if both of the complementary motions as represented by the output shafts $q$ $r$ have the same rate of speed, the operating instrument Z will move in a straight line at an angle of 45°, and that if both of the epicyclic assemblies change their speed in the same way, the marking instrument will always travel in the same straight line and will only alter its speed. To control the operating instrument so that it will be given different paths of movement, it is essential that one epicyclic assembly be adjusted relatively to the other that they will give out relatively different speeds.

It has already been indicated in the prior patent specification before referred to, that curvilinear travel of the instrument is approximated to by a series of short straight lines disposed at a slight angle to each other, as illustrated for example, in Figure 11. The alterations in the direction of the line at the points 107 correspond with adjustments of one epicyclic assembly to the other by the cams $u'$ $u^2$ etc., and their speed is differentiated so that the line drawn is no longer the resultant of two equal movements at relatively right angles.

With a given regular rotation or stepping of the cams $u'$ $u^2$ etc., the character of the epicyclic gears will depend upon the series of directions it is required that the instrument shall take whether it shall be caused to move over a line or lines approximating to a circle, ellipse or any other outline, either closed or open. In the machine being described it is assumed that the instrument under above conditions will draw a circle, that is to say, the cams will impart regular adjustments at equal or approximately equal intervals of time to the epicyclic gears, and it is assumed that the change in the angles at 107 will be equal, that the intervening lines shall be of the same length and will be each drawn in the same time.

The mechanism for stepwise rotating the cam shaft $u$ under the control of the record band $l$ is indicated generally in the group $X^2$ Figure 2, and shown in detail by Figures 9, 10, 10a and 10b.

Referring more particularly to Figure 9, the cam shaft $u$ is continued from Figure 6, and supported by the framework 108 is the mechanism in group $X^2$. The cam shaft $u$ terminates in a head 109 circumferentially grooved as shown at 110. The main driving shaft $e$ carries a spur pinion 111 in gear with a spur wheel 112 keyed on a countershaft 113, which latter carries a pair of gear wheels 114, 115. The gear wheel 114 through an idler pinion 16 drives a spur wheel 117 loosely carried on a sleeve 118 in one direction while the gear wheel 115 directly drives a gear wheel 119 loosely mounted on a corresponding sleeve 120 in the opposite direction. These two sleeves are loosely mounted on a shaft 121 carried in the frame 108 in alignment with the axis of the cam shaft $u$. Between the two sleeves is fitted a differential element 122 the side wheels 123—124 of which are respectively mounted on the sleeves 118 and 120, the intervening pinions being fast with the shaft 121. By means of sliding friction drives 126, 127 of known construction the spur wheels 117 and 119 impart to each sleeve 118, 120 a tendency to turn with the corresponding wheel, but the actual rotation of the sleeves is checked by escapement wheels 128—129 respectively mounted on the sleeves. The escapement wheels, as will be described, cause a stepwise movement to be imparted to the shaft 121 in one or the other direction which is allowed for by the differential 122.

The alternate operation of the escapement wheels is as follows:

Referring more particularly to Figure 10a, each escapement wheel 128—129 is under the respective control of escapement devices 130—131 one of which is shown in the Figure 10a. Each device comprises a two armed lever fulcrumed at 132 attached at 133 to the armature 134 of a pair of electro-magnets 135—136 in the case of the device 130 while in the case of the device 131, it is controlled by a similar pair of magnets 138 both pairs being mounted on the frame 108.

Such a magnet operated escapement has the advantage of lightness inasmuch as the magnets do not have to supply the power to turn the escapement wheels, these always rotating step by step directly the corresponding escapement lever on each side is alternately released. Further as each escapement lever is under the control of two magnets, which are energized alternately it follows that for a given rate of stepping the escapement wheel 128 or 129 each magnet has double the period for one complete oscillation of the corresponding lever that a single magnet would have which is stepped in the usual way. The escapement wheels have to rotate the cams as described, and this is the heaviest operation which is required to be rapidly performed in the machine and therefore tends to set a limit to the general working speed of the machine, all of the other operations being very lightly controlled and capable of very rapid action. The feature of the above construction is that it allows the cam rotation to be as fast as the other operations, and thus gives a faster speed to the machine in general.

The magnets 135—136 and 138—139 are energized from the moving record band as will be described and depending upon which set are actuated, so the shaft 121 will be turned one way or the other. To transmit the movement of this shaft to the camshaft, the left hand end of shaft 121 (Figure 9) is terminated by a gear wheel 140 carrying a pair of prongs 141 which are adapted to engage corresponding holes formed in the head 109 on the end of the camshaft $u$ such head being fitted with a spur wheel 142. Such a transmission between the shafts 121 and $u$ is necessary because the camshaft should be capable of being longitudinally adjusted to change the set of cams in use at any particular time and in the position of the parts shown in Figure 9, the prongs 141 are entirely out of engagement but the transmission is being effected by a pair of pinions 143 and 144 on a countershaft 145, such pinions being in gear with the spur wheels 140 and 142 as shown.

Three sets of cams are provided in this machine on the camshaft $u$ depending upon the number of the lines to be drawn to approximate to the circle, and the reason will now be explained.

Considering the carriage and bridge to be moving at their maximum convenient rate, and the cams being stepped at their maximum rate, it is clear that with a given number of lines 107, Figure 11, to form a circle, that circle will be of a certain size and may only be reduced, for example, to half size by halving the speed of the carriage and bridge, that is to say, the instrument. Therefore the small circle will take as long to produce as the large one, because although its length of outline is halved, the speed of the instrument is also halved. But such a half size circle may not require so many small straight sides to preserve its good appearance as did the larger circle, and one half the number may suffice. Hence, if half the number of sides is used to produce this smaller circle, the camshaft has to make only half the number of steps to produce it, which it may do in half the time. Therefore the time of production is halved and moreover in this second case the instrument may retain its former maximum speed.

It will thus be clear that the small circle may be produced twice as quickly by halving the number of its sides, as it would be, by retaining the greater number of sides and halving the speed of the instrument. The time efficiency of the machine is doubled by using the second method in preference to the first.

From considerations found in practice, the two methods may, however, be conveniently compromised so that a certain amount of reduction in size may be made by causing the instrument to travel at slower and slower rates, and when a point is reached which allows of a reduction in the number of lines to form the curves without spoiling their appearance, the instrument may be brought back to its maximum speed and a smaller number of lines used.

In the present construction, this reduction in the number of lines used for the curves is brought about by changing over to a different set of cams, although this may be done in other ways, for example, by using the same cams but rotating them two or three steps at a time so cutting out the intermediate steps.

Therefore, as stated above three sets of cams are used, although a greater or a lesser number might be employed. The number of sides used for a circle in these three cases may be ninety-six, sixty-four and forty-eight respectively, although any other convenient numbers may be used. A different set of cams is used in each case, and are grouped side by side all on the camshaft $u$ so that a different set may be brought into register with the corresponding epicyclic units by sliding the cam shaft relatively to its bearings.

In the position of the transmission shown in Figure 9, the cam shaft $u$ has been adjusted to its extreme left-hand position, which gives sixty-four steps, and is capable of being adjusted into two other positions towards the right, bringing the other two cam sets into action corresponding to ninety-six and forty-eight steps respectively. In these two cases, the transmission will take place by means of the prongs 141 engaging corresponding holes in the head 109 of the shaft $u$ and the attached gear wheel 142. It is to be noted that ninety-six and forty-eight are multiples of one another, but sixty-four being different requires the use of the gears 140, 143, 144 and 142 which afford a separate transmission drive and a change of gear ratio which may be multiplying or reducing as desired.

The longitudinal adjustment of shaft $u$ is effected from a vertical rod 150 rotatable about its axis and held in position by a collar 151 contained within a fixed housing 152. The rod 150 is rotatable through a small arc by being fitted at its upper end with a lever 153 provided at its free end with a combined operating knob and locking device 154, see also Figure 10 and Figure 3. The rod 150 also carries an actuating arm 155 just below the housing 152 and is at its outer end fitted with a peg 156 which is in engagement with the circular groove 110 on the end of the camshaft $u$. Thus the movement of the lever 153 adjusts the camshaft $u$ into any one of its three positions, the driving transmission from shaft 121 still being maintained. The indicating panel $X^5$, Figure 3, shows the three positions of the lever 153, the lever itself being in the centre position and any suitable form of locking device 154 may be used.

In longitudinally adjusting the camshaft, arrangements must be made to avoid damage to the various pawls or detents which are in engagement with the cams, and therefore before the lever 153 can be moved, an unlocking lever 157 must be operated. For this purpose the lever 157 is fulcrumed on one of the shafts 103 which carries the detents $w'$, $w^2$ etc., Figure 7, and there carries a toe-piece 158 (see Figure 10b) that engages one end 159 of a rocker 160 which is centred on the other shaft 103 that carries the corresponding detents $v'$, $v^2$ etc. The other end 161 of the rocker 160 is under the pull of a spring 162, (see Figure 10b). The lever 157 also carries a finger 163 formed on its end with a semi-circular recess adapted to engage in one of a number of locking grooves 164 formed on the camshaft $u$ (see Figure 6). When the unlocking lever 157, Figure 10b, is moved anti-clockwise, the camshaft $u$ is released from the finger 163, and the two detent holding shafts are rotated outwardly by means of the toe-piece 158 and rocker 160. This movement by means of small cranks 165 Fig. 7 keyed upon the shafts 103 also disengages the noses of the panels from engagement with the various cams by means of small rods 166 which connect the cranks together on each shaft. The camshaft is then ready to be adjusted lengthwise without any liability of damaging the detents and other parts. The upper end of the lever 157 passes through a guide slot in the indicator panel $X^5$, Figure 3, and may be provided with any usual locking device to retain it in one of its two positions, if necessary.

Reference will now be made to the electrical circuit arrangements shown in Figure 12 whereby the magnets 135, 136, 138 and 139 are energized for stepwise rotating the camshaft.

Wheels 167, 168, 169 are three simple and very light switch wheels all of the same kind and capable of being rapidly rotated stepwise by magnets 170, 171, 172 by the pawls and ratchet wheels shown. Each wheel is in contact with a circuit wiper 173, 174, 175 and the switch wheels each have peripheral projections or teeth whereby current may be conveyed alternatively to one of two wipers. In the case of the switch wheel 167 the alternately acting wipers are 176 and 177 so that a succession of impulses given to the magnet 170 will cause the magnets 135 and 136 to be alternately energized to actuate one of the escapements already described. In a similar way impulses given to the magnet 171, will by means of the wipers 178, 179 cause the other escapement magnets 138—139 to be alternately energized. In the case of the third magnet 172 however, an impulse given to it has a selector action, since the wipers 180—181 are respectively in circuit with the magnets 170 and 171 so that one or the other is thrown out of action, as are also the corresponding magnets 135 and 136 and 138—139. 182 indicates a contact operated by the moving record band which when operated and a series of impulses are sent out to magnet 171, the camshaft $u$ will be stepped round in one direction. If a second contact 184 is now operated once only and by the moving record band as before, so that an impulse is sent to the magnet 172 and the wheel 169 moved by one step, the series of impulses from the contact 182 are now diverted to the magnet 170 so that the camshaft will now be stepped round in the reverse direction. Thus a reversing of the rotation of the camshaft is very simply controlled by a single actuation of contact 184. One or other of the magnets in either pair 135—136 or 138—139 is always left energized, according to the position in which the controlling switch wheel for that pair is left. For example, in Figure 12, magnet 135 in one pair and 138 in the other pair are shown as being left connected to the electrical supply, and this feature serves to effectively lock that side of the differential 122, Figure 9, previously described, which is not at the time being operated and so prevents it receiving any undesired rotation. The switch wheels and their operating magnets are accommodated in the chamber or casing 102, Figure 2.

The devices above described result in the two epicyclic assemblies being so controlled that the output shafts $q$, $r$, Figure 1, are given certain changes of speeds, so that a series of lines may be drawn which are angularly displaced relatively to one another, see Figure 13, but means must be provided whereby, for instance, when a line has been drawn the succeeding angularly displaced line shall be drawn to one side or the other. This is usually done by reversing the direction of rotation of the cams as above described but in some instances either of the work output shafts will require to be reversed in its rotation as when the instrument is following round the outline of a closed figure, and again at certain points one of the work output shafts must be stopped altogether.

Referring to Figure 13 in which the dotted lines represent the bridge B, carriage O and marking instrument Z it is apparent that in marking the half circle shown in the figure (represented by a much exaggerated half polygon) the instrument will reach points such as 185 and 186 when one of the complementary motions must be stopped while the other only continues to move. For example, considering the instrument to be drawing the two lines meeting in the point 185, the bridge will be moving towards N while the carriage is travelling towards Y. When the point 185 is reached all movement of the bridge towards N ceases but the carriage continues to travel towards Y thus producing the line 187. When this is completed, the complementary motion which was stopped is again started but its motion is now reversed. Thus at the point 188 the bridge commences to move again but now in the direction towards M. The same thing takes place but vice versa for the bridge and carriage at points 186 and 189.

For effecting these reversals the camshaft $u$ is extended from the mechanism group X, Figure 2, into the adjacent group $X^3$ of which an enlarged side elevation is seen in Figure 18 and a transverse sectional elevation is seen in Figure 19, while Figure 20 shows a side elevation of the reversing cam mechanism detached and Figure 21 a sectional elevation of the reversing discs and the mounting thereof on their shaft.

The reversing gear is carried on a bracket 191 secured to the framework 190 of the group $X^3$ and the extended end of the camshaft $u$ is supported in a suitable bearing in the frame 190. The end of the camshaft carries a gear wheel 192 through which passes in a direction opposed to the camshaft a crank pin 193 from a crank 194 centered upon a stub shaft 195 (Figure 21) supported by an extension 196 of the bracket 191. By means of the crankpin 193 the stepping of the camshaft $u$ through the gear wheel 192 drives another gear wheel 197 mounted on the stub shaft 195, which imparts rotation to a spur wheel 198 mounted upon a shaft 199 arranged parallel to the extended camshaft $u$ and having one end supported by the machine frame 190, its other end being carried in a bearing 200 extended from the main bracket 191 and intermediately by the bearing extension 196.

The shaft 199 carries as shown two pairs of reversing cam discs 201, by means of an insulating bushing 202, and such discs each carry a projecting peripheral cam such as the one shown at 203, Figure 19, each pair of cams being relatively displaced to the other pair by 90°. Corresponding to each disc cam is a pair of spring contact tongues 204, 205 (see Figure 19) of which one 204 is fitted with a contact point 206 which constantly presses upon its disc cam 201. The other side of the spring tongue 204 carries a contact piece 207 which is adapted to press upon the second spring tongue 205. Both of the spring tongues are held in position at their lower ends by blocks 208, 209 respectively to which the several electric circuit leads as indicated by 210 are connected. The arrangement of these spring tongues is such that with the high part of one of the cam discs in contact with the point 206 the circuit between the two tongues is closed, but in the rotation of the discs the low part thereof allows the point 206 to move inward and thus break the contact between the two tongues. It should be noted that the tongue 205 is somewhat stiffer than 204.

The driving position of the gear wheel 192 by the shaft $u$ Figure 20 corresponds to the limit of longitudinal adjustment of the camshaft $u$ in one direction which takes place as before described to bring other sets of cams into operation. The limit of movement in the right hand direction of the shaft $u$ after passing a central intermediate position will disengage the gear wheel 192 from the crank pin 193 and cause it to engage with a gear wheel 211 on the reversing camshaft 199 to provide the necessary alternative drive.

For the purpose of giving a visible indication of the direction of movement of the instrument at any time or for manually adjusting the machine to move the instrument in any desired direction from the inspection panel $X^5$ the shaft 199 by a pair of bevel wheels 212 imparts the movement of the camshaft $u$ to a vertical shaft 213 supported in bearings 214. The upper end of the shaft 213 carries a pointer 215 held by a knob 216, the former moving over an indicating dial 217, so that the pointer by moving with the camshaft $u$ will indicate at all times the exact direction of motion of the operating instrument.

The function of the reversing cam discs 201, is to electrically actuate clutches on the work output shafts as will be hereinafter described.

Referring back to Figure 1 the differential balance wheels 82 were described as respectively driving gear wheels $o$ $p$ so as to operate the work output shafts $q$ $r$. In the actual machine however, systems of gearing are interposed by which the driving speed from the balance wheels 82 may be extensively varied as will now be described.

As shown in Figures 6 and 7 the balance wheel 82 of each epicyclic assembly is in gear with a wheel 218 on shaft 219, both shafts being supported in bearings such as 220 in the frame members 98, 99 of group X. As the mechanism to be described arranged in connection with one shaft 219 is duplicated on the other, one group only will be described.

On the shaft 219 is mounted a cone 221 of gear wheels of graduated sizes into gear with any one of which a tumbler wheel 222 is adapted to be adjusted. For this purpose the tumbler wheel is pivotally carried at 223 on a bracket 224 which is adapted to be slid longitudinally along a shaft 225 by means of feathers or grooves 226. The bracket 224 by means of a forked part 227 carries a gear wheel 228 which is keyed upon the shaft 225 and is constantly in mesh with the tumbler wheel 222 so that the shaft 225 will be driven. The upper part of the bracket 224 is extended upward to form an operating handle 228a projecting above the machine frame in order that the tumbler 222 may be adjusted into mesh with any one of the wheels of the cone 221. To guide the operating handle 228a, a convex cover 229 is fixed to the top of the machine frame and formed with a helical slot 230, through which the operating handle passes. In order that the handle 228a may be locked in proper position relatively to any one wheel of the graduated cone 221, a locking lever 231 is pivoted to the handle 228a at 232 and carries a locking pin 233 adapted to engage with any one of a series of locking holes or notches 234, the pitch of which agrees with the centres of the various wheels forming the cone 221.

By the foregoing arrangement therefore both balance wheels 82 of the epicyclic assemblies each drives a shaft 219 and according to the particular wheel of each cone 221, that is arranged to be in gear, so the shafts 225 are driven at the gear ratio desired. From this group X the shafts 225 are extended into the next group $X^3$ where a series of change speed gears for each shaft are provided.

Referring now to Figures 18 and 19 the two shafts 225 are supported by suitable bearings on the frame 190 at its upper end and on both shafts a first change speed gear element consisting of slidable gear wheels and geared countershaft are arranged. These are of the usual character and will not be further described. Such first group is adjusted into position by a peg 235 carried upon a vertical shaft 236 by means of an arm 237. Second and third speed groups are similarly arranged and actuated by other vertical shafts 236, these gears being arranged on horizontal shafts 238, 239. Each vertical shaft 236 is extended through the top of the frame and fitted with an actuating lever arm 290 adapted to be secured in an adjusted position by locking pin 291. As clearly shown in Figure 19, the movement given by each of the shafts 225 entering this group may be varied through three speed ratios till a final drive is exerted on two parallel horizontal shafts 292, 293, supported in bearings at the lower part of the machine frame, and near each side.

These shafts 292, 293, are extended into group $X^4$ (see Figs. 2, 18 and 22) for giving out the power imparted to them to output shafts 292a 293a or $q$ $r$. The direction of rotation of the shafts 292a 293a is reversible by the action of the reverse cams 201, Figure 20, already described, as follows:—

Referring more particularly to Figures 18 and 22, 296, 297 are a pair of electro-magnets arranged in the bottom of the frame and as shown by the one magnet 296 shown at the bottom of Figure 18, its armature 298 pivoted at 299 is adapted, when the magnet is energized by means of a link 300, to actuate a clutch fork 301 pivotally mounted at 302. The clutch member 303 which by way of example in this figure is shown as being toothed, is adapted to be slid in one direction by the armature 298 and in the other direction by a return spring 304, to and fro on the shaft 292 and its companion shaft 293 is fitted with a duplicate clutch and details under the control of the magnet 297. Each clutch 303 slidingly keyed upon its shaft is adapted to be alternatively engaged with one of two gear wheels 305, 306, loosely mounted on the same shaft. When the gear wheel 306 is clutched, it transmits rotation to a gear wheel 307 on each of the inside shafts 292a, 293a, to turn them in one direction, while when the gear wheel 305 is alternatively clutched, it drives through the direction reversing wheels 308, 309 a gear wheel 310 on the inner shaft 292a, the other shaft being similarly driven.

Thus by the reverse cam discs 201, the work shafts 292a, 293a, may be rotated to the left or right according to the requirements of the work at the time.

In the description relating to Figure 13, it has been stated that the reversal of one of the complementary motions should take place at points 188 and 189 but this is not altogether advisable, because at these points the complementary motion concerned again takes up movement which means that immediately they recommence to move, their direction would be reversed, and there may be lack of synchronism. It is therefore preferable that the reverse clutches should be operated in advance to ensure accuracy and therefore it is arranged that the reverse clutches shall operate at the points 185 and 186 where the motions concerned become stationary. But it will be understood, however, that if the curve is being traversed in a direction opposite to that of the arrow, these stationary points where the reversals should take place become 189 and 188. Hence considering the bridge, only its reverse clutch should operate either at 185 or 188 according to the direction of traverse of the curve. But as this direction of traverse depends upon the direction of rotation of the reverse cam discs 201 the means for varying this direction of rotation may also vary the points at which the reverse clutches shall operate, that is to say whenever the direction of rotation of the cams 201 is changed to change the direction of traverse of a curve, the points at which the reverses operate is changed also.

Hence according to the present construction two reverse cam discs 201 are provided for each complementary motion, one such cam controlling the reverse for one direction of rotation, while the other controls the reverse for the other direction of rotation. Thus four cam discs generally denoted by 201, are used as already described and shown in Figure 20.

Considering the bridge only, the cam discs 201a, 201b may for example be electrically connected to control its direction of motion. When the traverse of the curve in Figure 13 takes place in the direction of the arrow, the cam 201a for instance may be thrown into circuit to operate the reverse clutch at the point 185, while when the direction of rotation of the cams is to be changed to alter the traverse of the curve to a direction opposite to that of the arrow, the cam 201b is brought into circuit instead, which operates the reverse at the point 188.

The electrical circuits necessary for operating the clutches 303 according to such a system, may be similar to those shown in Figure 12 where there is brought into circuit either the magnet 170 or 171 for changing the direction of rotation of the cams and therefore the direction of traverse also as already explained by causing either the contact 180 or 181 to be connected in the circuit by switch wheel 169.

Another switch wheel exactly as 169 and another pair of contacts similar to 180 and 181 are arranged to be controlled by the same magnet 172, the two switch wheels being conveniently mounted on the same spindle. These other two contacts are connected one to one pair of reverse cam discs 201a 201c and the other to the second pair of reverse cams 201b 201d. Hence when the magnet 172 is stepped to change the direction of traverse of a curve, the pair of reverse cam discs to which current is supplied is also changed, so that as before stated, the points at which the reverse clutches shall operate is changed whenever the direction of traverse is changed.

It is preferable that the reverse clutches 303 shall be placed as near the complementary motions as possible, in the general train, in order that as few wheels as possible need to have their motion reversed in order that lost motion due to the wear of the teeth and so on, shall be reduced to a minimum. It is also preferable that the clutches shall be arranged or be of a type, as to give instant action and lose no motion in reversing when one of the complementary motions is to again take up motion as at 188, Figure 13. After being reversed for direction, the first movement of a complementary motion is very slow and its driving wheels revolve very slowly and thus the effect of lost motion is aggravated and in some cases may result in the passing over of one or two stepping movements of the camshaft u, before the motion is properly picked up, thus spoiling the work. A suitable form for the clutches 303 is a magnetic clutch which loses no motion such as might occur with engaging teeth. The drawings, Figure 18, show such a toothed clutch for convenience only.

A more suitable form of clutch is, however, shown in Figures 14 to 16 in which the wheels to be alternatively driven are 305, 306, which are loosely mounted on the shaft 292 as before. 311 is a rim fixed to or forming part of the wheel 305 and inside of which rotates with the driving shaft 292, a disc 312 formed with three pockets for example having right angled sides 313, 314. A steel ball 315 is carried in each pocket after the manner of a free wheel, and by means of a spring 316 mounted in the surface 314 behind each ball, it is kept pressed into engagement with the tapering space formed by the inside of the rim 311 and the surface 313 of the pocket. A rotational movement in the direction of the arrow of the driving shaft 292 causes the balls 315 to lock and thus drive the wheel 305. Such a drive is instantaneous as the parts cannot yield, and the wheel 305 moves at the instant the spindle commences to turn, so that there is no lost motion.

Closing in the open side of the rim 311 is a plate 317 conveniently attached to the disc 312 and formed with three holes that are positioned opposite to the ball-receiving pockets. Passing through each of such holes is a pin 316a, the three pins being carried by a slidable disc 317a. Each pin has a sloping face 318 at its end, see Figure 16 adapted to engage the corresponding ball 315 to press it back into disengaging position against the force of spring 316, when the pin is pushed laterally into the ball pocket and thus releasing the clutch. The construction described is duplicated for the other wheel 306 and the two pin carrying discs 317a are joined together by a sleeve 319 so that they can both move together by means of the clutch collar 320 slidably mounted on the sleeve. Thus when the collar 320 is laterally adjusted from the right side to the left Figure 14, the collar will strike upon the back of the disc 317a driving the pins 316 into the ball pockets and disengaging the balls by forcing them back and disengaging the wheel 305. At the same time the other pin carrying disc 317a is also moved toward the left and withdrawing its set of pins 316 and thereby engaging the free wheel clutch for 306.

As the engaging grip of the balls possesses appreciable friction, the collar 320 is made relatively heavy so that when it is moved laterally it will strike the corresponding disc 317a a relatively heavy blow to smartly disengage the balls, this being assisted by the extra distance allowed between the discs 317a. Collars 321 are secured upon the shaft 292 at the back of each of the wheels 305, 306 to maintain the parts in position.

The shafts 292a, 293a, the rotation of which is reversible by the action of the clutches above described are extended out of the mechanism group $X^4$ Figure 2, and became equivalent to the work output shafts $q$ $r$ Figure 1, and from thence to the complementary motions to actuate the operating instrument. The transmission includes worm and worm wheel drives $t$ $U$ of such a pitch that motion through them is not reversible so that at any sudden stopping of the carriage and bridge as frequently happens, the latter are brought to an immediate standstill, and none of their momentum is conveyed back to the gears, which would cause them to turn slightly through backlash that might result in slight over-running and a certain amount of lost motion when movement is resumed.

The motion being conveyed ultimately to the bridge and the carriage B and O preferably by means of taut wires as previously described, inertia is reduced to a minimum, since the wires possess practically no inertia, and as they can be kept taut, they have no lost motion or backlash. The wires E, P, have both ends attached to the drums K, K and R and are looped around the idler pulleys G Q and in order that they may be kept taut, such pulleys are slidably mounted as in Figure 23. The two ends of the wire E are shown as attached as at 322 to the drum K and from thence are wound in opposite directions upon the drum and pass finally outward from the top and bottom respectively of the drum and continuing as an endless loop which is passed around the idler pulley G which is grooved as shown. To tighten the loop, the spindle 323 of the pulley is made to press against two square-headed screws 324 that are each carried in a fixed support 325. In Figure 23a is shown one of the rollers C with its V-shaped edge which serve as roller supports upon which the bridge and carriage move, such roller running in the grooved rail D shown in Figure 23a. These rollers and grooves while reducing friction effectively guide and restrain the rollers.

Graduated scales may usefully be supplied, one attached to the front of the bridge B so that the carriage movable thereon may by means of a pointer that it may carry, be rapidly set to any position, or any position of the carriage at any time be read-off. The marking or working surface A is preferably located under the scale so that if the instrument is required to commence operating at say six inches from the edge of the surface A, the carriage has merely to be moved so that the pointer indicates six inches, the correct commencing position. Similar scales and for similar reasons may be attached to the rails D along which the bridge runs.

Also electric contacts may be fitted at the extreme ends of the travel of the carriage and the bridge so that should either of these latter by any chance have been set so that they would over-run their limit, the contacts are operated to actuate a main clutch to immediately stop the whole machine and prevent the machine being damaged. This clutch will be hereafter described.

Further a hand operated clutch is conveniently inserted somewhere along the shaft L, Figure 1, so that the bridge may be freed from its drive and rapidly moved by hand to a desired position over the working surface. At O' on the carriage is a suitable gripping device for attaching the carriage to its driving wire, which gripper may be also released by hand for freely moving the carriage like the bridge.

During the production of a piece of work various manipulations are required, depending upon the class or kind of work and these will now be considered. One of such adjustments has already been indicated i. e. the reversal of the direction of rotation of the direction control unit from time to time as required. Another adjustment would comprise the stopping and starting of the complementary motions irrespective of the other parts of the machine, such as the record; or again the lifting of the marking instrument out of action and subsequently lowering it again into action. All of these and others will now be described.

Considering the stopping and starting action in a machine as used for lithographic work, reference is made to Figure 11a in which it is assumed that the letter "E" is to be drawn. There are many points in such a production 326—327 and so on, at which the change in direction of the marking instrument is required to be greater than that given by one step of rotation of the direction control unit. At these points the direction control unit must be rotated several steps to arrive at the new required direction, and while this is being done the pen must remain stationary at that point and started again as soon as the new direction has been set.

The complementary motions must therefore be capable of being instantly stopped and instantly restarted automatically, and quite independently of the motion of the rest of the machine or the record which must continue to move.

This action may be achieved by disconnecting the drive from the prime mover to the complementary motions at any point along the train provided that the drive to the record band is not also disconnected. This may be done in any suitable way such as by the movement of a clutch; or in a machine wherein the variable gear device is driven by a spring or friction, the whole of such gear may be stopped by causing a suitable pawl or pawls to engage a convenient moving part, and allowing the friction drive to slip. It is preferable, however, that as with the reversing mechanism, the stopping and starting device should be as near the complementary motions as possible so that as few wheels and parts as possible are suddenly stopped and started.

For this purpose a clutch of the kind described in Figures 14, 15, 16 is used and is arranged in the mechanism group $X^3$, Figure 2, and shown more particularly in Figures 18 and 19 for convenience as an ordinary toothed clutch, operated magnetically. The clutch denoted by 328 is arranged on each of the two shafts 292, 293, between the final change speed gear shaft 239 and the reversing clutches 303 which latter are mounted on a forward extension of the said shafts 292, 293. One end of the sliding part of the clutch 328 is adapted to be engaged with the stationary member 329 rigidly fixed to the framework 190 of this part of the machine so that the motion, corresponding with the square corner of the letter "E" being described, will be immediately stopped, while the other end is adapted to be alternatively engaged with a driving rotating wheel 330. As both complementary motions driven by the shafts 292 and 293, are arranged to be always stopped together, one electromagnet 331 is sufficient to work both of the clutches. The magnet 331 has an armature 332 on a lever 333 fulcrumed at 334 at one end; its other end has a link 335 which actuates a shaft 336 common to both clutches, and this in turn carries a pair of clutch forks 337 by which the two clutches 328 are respectively operated. These are clearly seen at the lower part of Figures 18 and 19.

Referring again to Figure 11a, if the instrument is travelling round the outline of the letter "E" in the direction of the arrows, then at the points 326, 327 the direction control unit is required to rotate in order to change the direction of movement, in a clockwise direction; whereas at the points 338 and 339 the direction must be changed, in an anti-clockwise sense, and at 340 changed again to clockwise. Therefore before rotating at the point 338 an impulse would require to be sent out to alter the direction of rotation of the direction control unit in the manner that has been explained, see Figure 12. At 340 a similar impulse is provided to again cause the direction control unit to change back to clockwise direction. The approach lines to these points being straight and the direction control unit not being in use, the impulses referred to may however be conveniently sent out during the traverse of the instrument along these lines, so that when the points indicated are reached, the direction control unit is already set for its change of rotation, and proceeds to rotate without delay.

Another similarly operated and automatically controlled clutch device is shown at 341 and 342, Figure 19 in connection with shafts 294, 295 which are interposed between the final change speed shafts 239 and shafts 292 and 293. These are only seen in end view and are operated by the single magnet 343 in a manner similar to that of magnet 331, i. e. its armature actuates a link 344 to cause the cross shafts 345 to operate both clutch forks 341, 342. The object of these clutches is to suddenly and considerably reduce the speed of travel of the marking instrument, by coupling up a much smaller gear to drive the motions and to revert again to the former speed when required. This is done during the traverse of curves of very small radius to avoid slowing down the whole machine to produce such curves, as will be described.

In some designs that may be required, there may be a very great divergence of radii between the greatest and the smallest curves, or in another sense some curves therein may be very small compared with the general size of the design. Such cases occur in letter-press characters having very small serif curves.

With a given number of lines to the circle, as has been defined, and assuming the instrument to be travelling at its greatest rate and the cams to be rotating at their maximum rate, a curve of a certain radius will be produced, as previously indicated, and it is clear that such curve will be smallest producible under such circumstances. The smallest curve in a design will therefore have to be of this size and the remainder of the design will have to be proportioned thereto. This may, however, give a design of much larger size than is usually required, and to reduce it to this size would require that the instrument should travel at a much slower rate for the whole design by putting into action a very slow change speed gear so that the instrument would travel a smaller distance in a given time. This reduces the general output of the machine, and if a fewer number of steps were used to overcome the difficulty the appearance of the design might be impaired. Hence the clutches 341, 342, have been provided in order that the rate of travel of the instrument may be temporarily reduced for the small curves only in order that they shall be produced at a small radius while the remainder of the design may be drawn at the usual speed.

Taking the simple letter "I" as an example, Figure 17, if 346 is assumed to be the smallest circle producible, and 347 the size of the serif required for this letter 348, then the letter will have to be of the height shown to retain its correct proportions, but 349 (the smaller letter I) may be the height or size usually required, viz. half the height of 348. Hence the instrument would have to travel at one half the rate in order to produce the size at 349. But another letter "I" 350 could be drawn with the instrument travelling at its maximum rate because such letter has no curves. Therefore 349 would take twice as long to produce as 350 although both are of the same size.

By means of the slow gear device, however, being described, the instrument need be only slowed down while traversing the small curves so that for 349, the instrument may be travelling at its maximum rate until it reaches a point where the serif begins when it is then automatically slowed down in order that the serif may be produced at the required size, and upon completion may revert again to its former maximum rate. In this way 349 may be produced approximately just as rapidly as 350. Furthermore with a given gear ratio, it allows all letters of different styles, which may otherwise vary considerably in height owing to different curve proportions to be all reduced to a standard height for that given gear ratio.

This automatic change in gear may be of any ratio desired, a reduction of three to one, for instance being suitable and the clutch for operating the slow gear device is preferably of a similar type and operated in a similar manner to the reverse and stop-and-start clutches hereinbefore referred to.

The various motions just referred to are automatically controlled by the record band and the method of these automatic controls together with other automatic motions, such as spacing will be hereinafter described in detail.

There are, however, several other elements or devices which are non-automatic and which are adapted to be manually controlled or set prior to the commencement of work, and in this respect the control of the size and proportions of the work produced is an example of such a hand control.

Considering the means which may be provided for varying the scale or proportion of the work being produced, such means may comprise a series of gears for changing the average or general speed of the instrument in relation to the speed of the record band so that the instrument may be caused to traverse varied distances for a given length of travel of the said band.

The same amount or portion of the record band having for instance been twice utilized, the automatic manipulations given by it to the instrument and the machine generally will be the same although the distance travelled by the instrument between such manipulations may be different, that is to say, the forms or outlines separately produced may have similar contours but different sizes, according to the difference in the relative speeds of the instrument and the record band during each separate production.

The highest or greatest ratio given by such gears may be the maximum safe speed for the instrument and may be regarded as a standard or normal gear ratio to which the alphabets are standardized as above described. The gears as a whole may then be regarded as a means for progressively decreasing the speed of the instrument in relation to the speed of the record band for producing various sized pieces of work smaller than the standard.

After a certain amount of reduction has been effected by means of the gears and when a point is reached at which a smaller number of sides or steps may be utilized to produce the curves without spoiling their appearance, the output speed of the machine can be increased by using such a smaller number of sides to effect the reduction reinstating the gears to their normal position so as to give the greatest possible speed to the instrument, and using a record having the required form recorded to a smaller scale. Such a record may conveniently be arranged to produce a form, with the instrument moving at its greatest speed, of the same size as that produced by the previous record when the instrument was moving at its slowest speed. In other words the second record may commence where the other left off.

The gears may be then used for a second series of reductions until a point is reached at which the number of steps or sides necessary to produce a circle of good appearance may again be reduced, when a third record and a third series of reductions by means of the gears may ensue.

In this way any series of different sized forms from a maximum to a minimum may be produced and at the same time maintain a fairly high average speed for the instrument. It will be understood, however, that the aforesaid series of reductions are given by way of example only and that such a series may be varied as required and according to the particular construction of the machine. For instance, the various productions comprising the series may each be produced differently by varying the manner of recording the designs.

Such a series of reductions may also be produced without changing the number of steps or sides per circle, and this is effected entirely by gear changes, that is to say, by giving a slower and slower motion to the instrument, although as previously explained the reduction in the number of steps per circle at suitable stages allows the smaller sized designs to be produced at a greater rate.

A suitable set of reduction gears for varying the sizes of the productions have been previously referred to and are illustrated in Figures 6, 18 and 19.

Referring more particularly to Figure 18, the reduction gears adjustable by means of the vertical shafts 236 are each adapted to produce large steps of reduction, intermediate steps of reduction being provided for by the cone 221 of graduated gear wheels (see Figure 6). The gear reduction effected by changing the gear from one extreme gear of the cone 221 to the other extreme gear thereof is preferably made to correspond to the reduction effected by each of the gears controlled by the vertical shafts 236, and in this way the graduated gear wheels of the cone 221 may be utilized to produce gradual reductions between the large steps of reduction effected by the gears controlled by the actuating lever arms 290 of the said shafts 236.

Thus assuming that the tumbler wheel 222 is in engagement with the largest gear wheel of the cone 221, gradual reduction can be effected by causing the tumbler to mesh with each gear wheel of the said cone in turn.

After the tumbler wheel 222 has been caused to mesh with the smallest gear wheel of the cone, one of the lever arms 290, is manually actuated and the tumbler wheel 222 is returned to mesh with the largest gear wheel of the cone also by hand. Such an actuation of a lever arm 290 causes the particular slidable gear wheels controlled thereby to effect a large step of reduction, but as the tumbler wheel 222 now meshes with the largest gear wheel of the cone 221 the speed of the machine may not vary as the resultant effect of this position of the gears may conveniently be arranged to be the same as the effect given by the meshing of the tumbler wheel 222, with the smallest gear wheel of the cone 221 before the actuation of the said arm 290. Hence the tumbler wheel can again be caused to step down the cone as before to produce another gradual series of reductions until the smallest gear wheel of the cone is again reached when another lever arm 290 is actuated and the tumbler wheel is again returned to mesh with the largest gear wheel of the cone, and this procedure may be repeated for each large step of reduction caused by the actuation of a lever arm 290.

In this way a very large number of gear reductions can be effected with a minimum number of gears which may be constructed to any desired proportions and to give any convenient steps in reduction.

The aforesaid gears are set manually to give the required size or proportion prior to the commencement of work and in this respect the necessary setting is determined by a calculator device hereinafter described.

As previously stated a separate set of such gears is preferably provided for each complementary motion so that the said gears may be set differently. If the work to be produced is required to be strictly to original proportions, both of the sets of gears are changed to the same degree, that is to say, both have identical settings but to produce work of different proportions the settings for each set of gears may be different. For example, a design may be spread out laterally or raised in height by causing one of the complementary motions to have a greater general speed than the other by setting their respective sets of gears differently.

Hand wheels 351, Figures 3 and 18, are provided for turning the gears into a free meshing position when the gears are being changed as it frequently happens that the gear teeth meet and do not slide directly into engagement.

A further variation in the work which may be effected by a manual adjustment of the machine prior to starting the said work consists in imparting thereto a slope, such as for example a slope in italic lettering, or sloping the base line of a series of letters in a word or alternatively imparting both these slopes simultaneously and in either direction. These slopes may vary in extent and the characters of forms partaking of the slopes may at the same time be varied in size and proportion as hereinbefore explained, that is to say, the fact that the characters are sloped does not prevent them from varying in size and proportion.

Such a sloping effect is produced by superimposing a suitable proportion of the movement of one complementary motion upon the movement of the other, or both simultaneously, and this is carried into effect according to the construction being described by means of differential couplings.

Referring now to Figure 24 and taking the letter I as an example, this is normally produced as shown in dotted outline and while the side marked 352 is being drawn by one complementary motion, the other will usually be stationary. But if the stationary complementary motion has some of the movement of the moving complementary motion conveyed to it, the side 352 will become sloped as shown in the full line, such slope depending upon the proportion of the motion conveyed to the stationary complementary motion. The slope thus obtained, produces an italic effect but if, however, the motions were reversed, that is to say, if the base 353 was being drawn by one complementary motion and some of the movement of this motion was conveyed to the other complementary motion which would normally be stationary, then the letter I would have a sloping base line, and in this way an upright word or words could be drawn on a slope.

Figure 25 illustrates diagrammatically one form of the differential coupling for superimposing the complementary motions and in order to show the transference of motion clearly, the means for effecting such transference is shown for one way only and not vice-versa, the latter comprising a similar coupling transposed.

According to the illustration 354 is a shaft driving one complementary motion, which may for convenience be termed the vertical component, while 355 drives the other complementary motion or horizontal component, the wheels 356, 357, 358, 359 and 360 forming the elements of a differential of the usual type. The horizontal component is normally driven through this differential owing to the pawl 363 engaging the wheel 356 and thereby allowing the shaft 355 to drive the shaft 361. This is the normal condition for the production of upright forms such as that shown in dotted outline in Figure 24. If, however, the wheel 356 is freed from engagement with the pawl 363 and a wheel 362, slidably coupled to the shaft 354, is caused to mesh with the wheel 356, then the motion of the shaft 361 will be modified by having the motion of the shaft 354 superimposed upon the motion of the shaft 355. If the shaft 355 is stationary then the shaft 361 will be driven through the differential by the shaft 354 so that instead of the horizontal component remaining stationary while the vertical component traverses the side 352 (Figure 24), the said horizontal component will also receive a movement, for instance, to the right, so that the line 352 will be given a slope.

If the motions were reversed, that is to say, if the motion of the shaft 355 was superimposed in a similar way upon the shaft 354, then a figure with similar characteristics to that indicated by 352a in Figure 24 would be produced.

A wheel 364 may be interposed between the wheels 362 and 356 to reverse the communicated motion and thereby produce a slope in the opposite direction, and various combinations of the aforesaid interchanges of motion will give a great variety to the work produced. The wheel 362 may, if desired, be supplanted by a series of wheels of different sizes so that the amount of motion superimposed is variable, and thus slopes of different angles may be produced.

The wheel 362 or its counterpart is controlled by a hand lever 370 (Figures 3, 18 and 22) so that it may be set before the work is commenced.

Two such differential couplings are utilized in connection with the machine being particularly described and are arranged on shafts 292a and 293a (Figure 22).

Figure 26 illustrates the constructional form of these differentials which are shown as supported in position on the frame of the machine, certain details being omitted for clearness.

It will be understood that the lower half of this figure illustrates the mechanism of one complementary motion while the upper half illustrates that for the other complementary motion, with references to the same parts for each motion being differentiated in most cases by the index letter "a".

Referring now to the drawings 303 and 303a are the reversing clutches one of which is shown in Figure 18, and the wheels 305 and 306 are those previously described as associated with the said reversing clutches. The shafts $q$ and $r$ are the output shafts of the complementary motions while the shafts 292 and 293 upon which the reverse clutches are mounted, are the shafts conveying motion from the variable gears to the said output shafts.

Considering now the lower half of the figure, motion is transmitted from the shaft 292, to the wheels 365 or 366 through either of the wheels 305 or 306 according to the position of the clutch associated therewith, the wheel 306 meshing directly with the wheel 366 while the wheel 305 engages with the wheel 365 by way of the reversing wheels 309 indicated in Figure 22. Thus according to whether the wheel 305 or 306 is acting as the transmission means, motion in opposite directions is transmitted to the wheels 365 and 366 rigidly attached to each other and to the member 357 of the differential, the said member and the wheels rigidly attached thereto being loosely mounted on the output shaft $q$ which is rigid with the supporting spindles of the balance wheel 356.

Assuming that, as shown in the drawings, the wheel 306 is transmitting the motion of the shaft 292 to the wheel 366, and that the member 360 of the differential is being held stationary, then motion will be conveyed from the wheel 306 to the shaft $q$ in a known manner.

Attached to the member 360 of the differential is a slotted sleeve 367 which, together with the said member, is also loosely mounted on the output shaft $q$. Slidably mounted on the said sleeve is the wheel 362, the normal position of which is in engagement with a wheel 368 (Fig. 26) normally held stationary but being capable of rotation as hereinafter described. Hence by maintaining the wheel 368 stationary the member 360 of the differential is also held stationary so that the normal drive to the output shaft $q$ can be effected as described. If however during such a normal drive, the wheel 362 is rotated, the motion conveyed to the shaft q is modified in consequence of the operation of both side members of the differential. The wheel 362, moreover, is adapted to be rotated by the driving mechanism of the other complementary motion so that some of the movement of this complementary motion is conveyed to the output shaft q and in this way sloping characters or forms may be produced as previously explained.

Referring again to the illustration, the wheel 362 is shown in engagement with the wheel 365a through a reversing wheel 369 thus producing rotation of the said wheel 362 in a certain direction. Should however, the wheel 362 be slid along the sleeve 367 towards the left it will be disengaged from the reversing wheel 369 and will directly engage the wheel 366a which rotates the said wheel 362 in the opposite direction and incidentally causes the characters or forms being produced to slope in an opposite direction to that above referred to. If the wheel 362 is slid still further towards the left it engages the wheel 368 and is thereby held stationary so that no slope is given to the aforesaid characters or forms.

The sliding movement of the wheel 362 is effected by means of a lever arm 370 (Figure 22) controlling the pivotal movement of a shaft 365, rigidly supporting a lever 372 having a projecting pin 373 fitting into an annular groove 374 in the bossed portion of the wheel 362, which groove is shown clearly in Figure 26.

It will be understood that the mechanism illustrated in the upper half of Figure 26 may alternatively be operated in a similar manner to that illustrated in the lower half thus giving a slope to the portions of the characters or forms produced that would normally, say for example, be horizontal.

Shafts 375 and 375a which rigidly support the wheels 368 and 368a respectively are carried through the machine and terminate in hand wheels 376 and 376a (Figures 47 and 48) adapted to be locked so that the wheels 362 and 362a may be held stationary as described.

If, however, the said hand wheels are freed they may be manually turned to rotate the wheels 368 and 368a, such a rotation being normally utilized to correctly position the instrument in relation to the working surface to a fine degree when setting the machine, but the said rotation of the wheels 368 and 368a can also be utilized, if desired, when the machine is in operation, and in this way the forms or characters produced may be varied in form by hand manipulation.

The shafts 375 and 375a are loosely supported in the frame of the machine so as to be capable of axial movement, such a movement permitting the rapid adjustment of the bridge or carriage, for example down to the next line of lettering by hand manipulation, for instance, if the hand wheel 376 is pulled outwardly so as to move the shaft 375 axially towards the right, a wheel 377 rigidly supported by the said shaft may be caused to engage a wheel 378 and thereby actuate wheels 379 and 380 and impress a fast speed directly on the shaft q so that the bridge B or carriage O will be rapidly moved. Notches 381 are provided at the ends of the shafts, which notches are adapted to co-operate with suitable spring catches to maintain the said shafts in the desired axial position.

Sloping characters or forms may also be produced in a different construction by arranging the bridge B so that it is not disposed at a right angle to its direction of travel, this arrangement being such that the bridge movement will not be at a right angle to the movement of the carriage, and thus the work produced will be correspondingly sloped.

Still further variety may be imparted to the work by causing it to be produced in different positions in relation to its normal position, such as, for example reversed, at a right angle, upside down, or any combination of these various relative positions.

Such relative positions of the work are predetermined by manually setting the machine prior to the commencement of the work, and any of the aforesaid variations may be produced from the same record, although still further variations in the work produced may be obtained by utilizing a series of records differently recorded.

The size of the work produced may be enlarged above the standard previously referred to by either utilizing a record recorded on a sufficiently large scale, or reducing the rate of travel of a record so that for a given length thereof the instrument will have travelled a greater distance.

Such a reduction in the rate of travel of a record may be effected by suitable hand controlled gears indicated generally by 382, Figure 51, these gears being controlled by an arm not shown, actuated in a similar manner to the levers 237 (Figure 19) controlling the change speed gears, the general position of this arm being indicated by 383 in Figure 3. The changes thus effected in the size of the work produced are conveniently arranged to be comparatively large, the reduction gears being utilized to produce the smaller changes in size of the work, as hereinbefore described.

If gears only are used throughout the machine to effect all changes in size of the work produced, then one record only may be utilized to cover the whole range of sizes of a given design, and taking the height of a letter as an example, the variation in height thereof may reasonably be from three feet to half an inch.

By using a plurality of records, however, for example three, a greater general output speed of the machine may be obtained as previously explained, and any number of records covering the range of sizes desired may be used in the same machine. The limits to the largest and smallest sizes possible to the work produced being imposed only by the size of the machine and the change gears respectively.

The various gears and modifying principles referred to may be arranged in any suitable sequence such as, for instance, as shown in Figure 2.

Such a train of devices as illustrated in Figure 2 may, however, be supplemented by various other devices as hereinafter described to still further increase the utility of the machine.

Considering now the instrument carriage O Figures 1, 2, 27, 28 and 36 this is adapted to support an operating instrument 284 which may have the form of a marker or pen when the machine is being utilized to mark a working surface with a fluid, such as, for instance in lithographic or like work.

For the purpose of elucidation the instrument 284 will be termed a pen throughout this description although it will be realized that the said instrument may have any desired form according to the requirements of the work to be produced.

It will be obvious that if the portion of the pen resting upon the working surface is circular in form, then the lines produced thereby will be of uniform thickness for all directions of travel of the carriage, without relatively moving the pen. While such a circular pen has many advantages it has the disadvantage that it cannot be made to produce sharp corners, and it is preferable therefore to utilize a pen constructed so that the portion thereof bearing on the working surface has a blade-like form in which case during the production of uniform thick lines it will be necessary to rotate the pen in relation to the carriage so that a wide surface of the blade-like portion of the pen always faces the direction of its travel.

Now as the direction of travel of the pen is changed by the direction control unit, it will be clear that if the latter also controls the aforesaid rotation of the pen, then this rotation can be made to synchronize with its change of direction, and thus allow a wide surface of the blade-like portion of the pen to constantly face its direction of travel.

The pen may therefore be positively and mechanically connected to the direction control unit by suitable shafts and bevel gears, or a suitable stepping magnet or magnets may be mounted upon the carriage and connected in parallel with the magnets of the direction control unit, so that the impulses controlling the latter and changing the direction of the instrument may also be utilized to step the pen round simultaneously. In this case the switch controlling the direction of rotation of the direction control unit may then also control the direction of rotation of the pen. Such means for producing the rotation of the pen, while practicable, do not allow independent rotation thereof and requires special manipulation when dealing with acute corners as illustrated, for instance, in Figure 29 wherein the lines 385a, 385b and so on indicate the blade-like portion of the pen in different positions which may be assumed during its travel in the direction of the arrow, and 386—387 indicate the acute corner to be negotiated or drawn by the pen.

It will be seen that when the pen reaches the point 385b or 385c it is necessary to turn the said pen so that it will not assume the position indicated by 385d, and this may be effected by stopping the complementary motions, turning the direction control unit and pen until the latter assumes a position parallel to line 387, freeing the pen from the direction control unit by breaking the circuit of the magnet or magnets controlling the pen, and returning the direction control unit so as to enable the line 386 to be completed as far as the corner. It will then be necessary to re-adjust the pen to enable the line 387 to be drawn.

Such complex manipulation is avoided and a quicker operation of the machine made possible by providing a separate record or line of holes to control the turning movement of the pen as hereinafter described, such a separate control enabling the pen to be manipulated independently of the direction control unit and also independently of its own direction of travel.

It will be clear that for obtaining sharp corners in the work being produced by means of a blade pen as described, the latter should preferably rotate about one of its ends and not about its centre point as in the latter case round corners would be produced.

Figure 30 shows such an arrangement diagrammatically the rotary movement of the pen being indicated by a dotted line and the interior edge about which the pen rotates being that adapted to follow the outside of the design as shown in Figure 31, wherein a similar acute angled corner to that shown in Figure 29 as illustrated as being produced by a pen having its turning movement controlled by a separate record. In Figure 31 the pen, travelling in the direction of the arrow, is shown as being turned about its pivotal point as it approaches and recedes from the corner lines 385 indicating the various positions assumed by the pen during its travel along the lines 386 and 387, and the finished corner produced in this way is illustrated in Figure 32. Other corners are also easily negotiated when the pen is independently controlled in the above manner the precise manner of the manipulation of the pen varying and depending upon the circumstances.

The operation of other parts of the machine may also be utilized to assist in producing the corners, for instance, the slow gear may be caused to reduce the speed of the forward movement of the pen while it is rotating to form the said corner. The preferable manipulation of the pen must, however, be decided upon at the time of preparing the records so that the said manipulation may be recorded on the latter and thus become automatic.

Still another feature of the aforesaid independent control of the pen is that variation in the thickness of the line being produced may be obtained by causing the pen to rotate so that the full width of its wide surface is not facing its direction of travel. Such a line is shown in Figures 33 and 34 wherein the transverse thick lines again show the positions assumed by the pen during its travel.

This feature still further increases the output of the machine as it allows certain styles of lettering, such as that illustrated in Figure 34, to be produced in one stroke of the pen.

Considering now the control of the pen, Figures 27 and 28 illustrate one constructional form whereby such control may be effected, the catch for connecting the pen supporting carriage to its operating wire being omitted for clearness.

On the carriage O, supporting the pen 284, three running wheels C are suitably journalled, upon which wheels the carriage is adapted to reverse the grooved track 389 formed in the bridge B. Rigidly attached to the said carriage is a tubular housing 390 within which is loosely fitted another tubular member 391 Fig. 36 adapted to support a fluid container 392 which is hereafter termed the body and supports the blade 393 of the pen. Ratchet wheels 394 are rigidly attached to the tubular member 391 and are disposed so that their teeth face in opposite directions. Spring controlled pawls 395 and 396 Fig. 27 operated by a magnet 397 are adapted to engage the ratchet wheels 394 so as to turn them step by step in opposite directions as required, that is to say, the pawl 395 steps the tubular member 391 in one direction while the pawl 395 steps the said member in the opposite direction.

The pen body 392 and the pen blade 393 are so supported by the tubular member 391 that they partake of its rotation. The magnet 397 may be polarized so that the direction of oscillation of its armature is reversed by reversing the direction of electric current passing through its coils, such a reversal of oscillation of the armature is utilized to step the pen body in opposite directions as hereinafter described. Alternatively the coils of the magnet may be in different circuits and may be energized separately to produce the necessary oscillatory motion of the armature to effect the rotation of the pen body in the desired direction. In either of these cases the armature 398 of the magnet 397 is pivotally supported at a point 399 so that each end can be attracted by a coil of the magnet, and in this way the oscillatory movement of the said armature depends upon which particular coil is energized. An arm 400 is rigidly attached to the armature 398 so as to oscillate therewith and this arm controls the movement of a rod 401 to which the pawls 395 and 396 are pivotally attached. Hence, if the left hand coil of the magnet 397 is energized, the left hand end of the armature 398 is attracted and the rod 401 is moved to the right by the arm 400. During such movement the tail portion of the pawl 396 moves out of contact with a spring controlled arm 402 so the spring associated with the said pawl causes it to engage the teeth of one of the ratchet wheels 394 and impart a partial rotation to the latter while the tail portion of the other pawl 395 abuts against a similar spring controlled rod 403 and is thus held out of engagement with a ratchet wheel 394. If, however, the right hand coil of the magnet is energized instead of the left hand coil, then contrariwise movement of the rod 401, and pawls 395 and 396 is effected. Springs 404 controlling the arms 402 and 403 function as a means for returning the rod 401 and its associated elements when the magnet 397 is de-energized.

When the turning movement of the pen body 391 is controlled by means of a separate record it is preferable that the number of teeth in the ratchet wheels 394 should correspond to the number of steps or sides being utilized to form a circle with the machine being described, and as, according to the construction of the latter, three different numbers of such steps can be alternatively used, the ratchet wheels 394 should be provided with three corresponding sets of teeth. The necessity for these three sets of teeth, however, can be obviated by providing each ratchet wheel 394 with a number of teeth corresponding to the lowest common multiple of the aforesaid different numbers of steps, and by varying the throw of the pawls 395 and 396 so as to in turn vary the amount of rotation imparted to the ratchet wheels 394.

For example, in the machine being particularly described, the numbers of the said steps alternatively utilized are 96, 64, and 48, the lowest common multiple of these numbers being 192. Hence the throw of the pawls 395 and 396 should be capable of adjustment so as to move the co-operating ratchet wheels over distances corresponding to either two, three, or four of their teeth, if the said ratchet wheels are provided with 192 teeth. Such an adjustment of throw of the said pawls is effected by means of a controlling knob, 405, adapted to rotate a rod 406 carrying at each end a set of adjustable stops 407, one set for each pawl. These sets of stops 407 consist of three set screws 408 being adapted to project three different distances as required, and according to the position of the knob 405, these are moved into the path of the movable rod 401 so as to limit its amplitude of movement. The knob 405 carries a pointer 409 to indicate the setting of the stops. Hence the number of throws of the pawl 395 or 396 necessary to rotate the pen through one revolution can be varied and controlled by the knob 405.

To obviate the possibility of the setting of these stops being overlooked when the machine has been adjusted to utilize a certain number of steps to produce a circle, a member 410 rigidly attached to the rod 406 and functioning as a means to lock the latter in any set position is constructed to additionally function as a switch.

The member 410 is of triangular cross section and is adapted to co-operate with the spring fingers 411 which engage as required with the flat surfaces of the said member to lock the rod 406 in its set position. The member 410 is, moreover, made of insulating material and is provided with metallic contacts 412, one on each of the said surfaces and each positioned to correspond with a different spring finger 411 so that the contacts 412 and the corresponding spring fingers 411 may be utilized to complete three separate electric circuits according to the setting of the knob 405. These electric circuits are provided with a common switch 413 Figs. 10 and 35 carried by the rod 150 functioning as the means for changing the set of cams being used according to requirements as described which switch and the said electric circuits are connected in series with the electric circuit of the main clutch magnet to be hereinafter described.

The switch 413 is constructed to close an electric circuit in three different positions according to the particular set of cams in use, and the three contact members associated with the said switch for this purpose are electrically connected to contacts closed respectively according to the position of the switch member 410, the circuits thus obtained being illustrated in Figure 35 wherein the main clutch magnet is indicated by 414. From Figure 35 it will be seen that if the particular set of cams in use does not correspond to the setting of the pen, that is to say if both the cams and the pen are not correctly set for the machine to produce a circle by utilizing a certain number of steps, then electric current is not supplied to the clutch magnet 414, and the machine cannot be operated.

Referring again to Figures 27 and 28, 415 is a small magnet positioned to attract a pivotal forked arm 416 normally supporting the pen blade 393 out of contact with the working surface by means of a tension spring 417. When the magnet 415 is energized the forked arm is attracted and the pen blade 393 falls by its own weight into contact with the working surface, whereas when the said magnet is de-energized the spring 417 raises the forked arm 416, which engages a disc 418 attached to the pen blade, and lifts the latter out of contact with the working surface.

When it is desired to change the pen, the forked arm 416 may be turned out of engagement with the disc 418 by rotating the standard 419 upon which the said forked arm is pivotally supported.

The pen may be of any suitable form and is shown in Figure 36 as a fountain pen containing fluid to be automatically delivered to the working surface only when the pen is in contact therewith and in quantities regulated by the speed of the pen over the said surface.

The pen body 392 which may be easily withdrawn from the inner tube 391, terminates at its upper end in a disc 420 provided with a small orifice adapted to engage a pin 421 attached to the upper ratchet wheel 394, such that the rotation of the said wheel is imparted to the pen body.

The pen body 392 rigidly carries at its lower end a small tube 422 slidably housing a close fitting plunger 393, constituting the working blade of the pen to which plunger a rod 423 is rigidly attached, which rod passing concentrically through the pen body and through a hole in the disc 420, supports the disc 418 co-operating with the forked arm 416 and a magnet 415 shown in Figures 27 and 28.

The pen body 392, constituting the marking fluid container, is provided with an orifice 424 whereby the marking fluid may be introduced.

The upper portion of the rod 423 is formed with a flat surface 425, and a key member 426 suitably attached to the disc 420 co-operates with the said flat surface so as to cause the rod 423 and the pen blade 393 carried thereby to rotate with the pen body 392. Moreover such a co-operation ensures one position only of the pen blade 393 in relation to the pen body 392 and thus facilitates the operation of reassembling the component elements of the pen after they have been dismantled for cleaning purposes.

A pointer 427 conveniently located on the carriage, serves to indicate, by means of markings on the disc 418, the position of the pen body 392 and its associated marking blade 393.

According to the construction illustrated in Figure 36 the pen blade 393 is adapted to be lifted out of and dropped into contact with the working surface the lifting disc 418 also functioning as a weight to supply the necessary pressure to the pen blade when the latter is in contact with the working surface. The pen blade 393 may be of any desired general cross section circular or otherwise, and the construction of its housing tube 422 varies accordingly. If for instance the said blade is of square or flattened general cross-section then the tube 422 is constructed to correspond thereto, and in this case the key member 426 will not be necessary as the pen body 392 and the pen blade will be unable to rotate independently when the latter is in position in its housing.

Figures 38 and 39 illustrate three constructional forms of the pen blade 393 the blade-like working edges of which are formed by suitably tapering the lower portions of the wide surfaces thereof, and these pen blades may be mounted either eccentrically or concentrically in the pen body, one method of obtaining the eccentric effect being by shaping the pen blade unsymmetrically as shown in Figure 39. This latter method is preferable to housing the blade eccentrically as it allows the substitution of symmetrical pen blades that are not required to work eccentrically, such blades being utilized, for instance, when it is desired to produce forms with rounded corners as described.

The lower view in Figure 38 shows a symmetrical pen blade for producing a line of the same thickness as that produced by the unsymmetrical blade illustrated in Figure 39, and both of these types of blade can be used in the same pen body.

The clearance between the pen blades 393 and their housing tubes 422 should be only sufficient to allow the relative sliding movement of the blades although the amount of such clearance can be varied if necessary according to the consistency of the fluid or ink being used.

When the fluids to be used vary considerably in consistency, then the pen blade may be changed if desired for each particular fluid, each pen blade being of such dimensions as to ensure the required clearance between it and the housing tube therefor.

The pen blades 393 are preferably provided with deep grooves 428 at their lower ends for conveying the fluid to the working edges thereof and such grooves may be formed in both faces of the pen blade (Figure 36) so that the latter may function equally well in either direction of travel although it is only necessary and sometimes preferable to groove the rear face of the pen blade only. The width or thickness of these grooves may also vary according to the nature of the fluids used.

Considering now the action of the pen, when the pen body 392 is filled or partly filled with marking fluid the latter flows between the pen blade 393 and the housing tube 422 and is normally prevented from leaking by capillary attraction or skin friction due to the small clearance between the said pen blade and its housing tube, but when, however, the pen blade moves over the working surface the fluid is withdrawn from the pen body by adhesion to the said working surface as in the usual writing fountain pen.

In this way the delivery of fluid is automatically controlled by the movement of the pen blade to and fro upon the working surface, and is automatically varied according to the speed of travel of the pen. Such automatic delivery of the fluid to the working surface is assisted by the grooves provided as described in the pen blade.

Manual control, however, may be exercised over the flow of fluid by varying the distance that the pen blade projects from its housing tube when in operation the flow increasing with increased projection and being cut off altogether when the degree of projection is very small even if the pen blade is in contact with the working surface.

Further control may also be exercised over the flow of fluid by varying the quantity thereof in the pen body, a greater weight of fluid producing an increased flow.

Means are preferably provided whereby the delivery of fluid is positively prevented when the pen blade is not in contact with the working surface, and for this purpose the upper end of the pen blade 393 is formed with a shoulder, 429, adapted to abut against the flanged end 430 of the housing tube 422 and thus prevent a flow of fluid when the pen blade 393 is in a raised position. The function of the shoulder 429 may be assisted by the provision thereon of a rubber ring or the like.

The manual adjustment of the pen blade 393 in relation to its housing tube 422 is effected by raising or lowering the position of the disc 418 on the rod 423 and this can be effected when its retaining set screw 431 is loosened. This set screw 431 abuts against the flat face 425 of the rod 423 so that the position of the disc 418 in relation to its supporting rod can only be varied vertically, and in this way the markings on the said disc always correctly indicate the position of the pen blade.

A modified construction of the pen body and its associated elements is illustrated in Figure 37, wherein the lifting disc 418 is rigidly attached to the pen body 392 so that the latter is raised and lowered to cause the pen blade 393 to assume its inoperative and operative positions respectively.

In this case the pen blade 393 is more or less free to slide in its tubular housing 422 and the supporting rod 423 rigidly carries a valve cap 432 adapted to co-operate with the upper end of the tubular housing 422 so as to cut off the fluid supply as before. When the pen body 392 is being lowered the pen blade contacts with the working surface prior to the completion of such lowering movement and the continued movement of the said pen body enables the valve cap 432 to be lifted out of engagement with the tubular housing 422 and so allows fluid to be delivered from the pen body to the working surface. Alternatively, when the pen body 392 is being raised the pen blade 393 is raised therewith owing to the upper end of the tubular housing 422 meeting the valve cap 432 such a meeting also cutting off the supply of fluid from the pen body.

The valve cap 432 is maintained in a closed position by the weight of the pen blade while the latter is in an inoperative position, and a rod 433, attached to the pen body 392, slidably engages an extension of the valve cap 432 and constitutes the means for causing the pen blade to rotate with the pen body.

The pen may also co-operate with a pressure feed device whereby the delivery of fluid to the working surface is regulated by increasing or decreasing the pressure on the fluid, or alternatively the latter may be supplied by a drip feed from a separate container, the drops being stopped when the pen blade is in an inoperative position.

According to a further modification illustrated in Figures 40 and 41 the pen blade is constructed in two separate parts 393 and 393a detachably coupled together the upper part 393 being formed with a bore 434, and the lower part 393a being provided with a split pin 435 adapted to be forced into the said bore to effect the coupling. The bore 434 is of such a length that the split pin 435 may project thereinto a sufficient distance to enable the parts 393 and 393a to contact with each other and thereby facilitate the transfer of marking fluid from the grooves 428 provided in the upper part to grooves 428a formed in the lower part.

The disposition of the grooves 428a formed in the part 393a is clearly shown in Figure 41 wherein such grooves are connected by means of a transverse groove 436 whereby the distribution of the fluid to all of the grooves 428a is effected.

It is preferable, more particularly when wide pen blades are being utilized to pivotally connect the part 393a to the split pin 435 so that the said part is free to move or rock into the positions shown in dotted lines in Figure 40 and by this means conform to irregularities in the working surface so as to prevent a broken line being drawn. To enable this rocking movement of the lower part 393a to be effected the upper part 393 is chamfered as indicated at 437.

It will be understood that the means for detachably coupling the separate parts of the pen blade are given by way of example only and that any other suitable means may be employed.

By so constructing the pen blade lines of different widths may be drawn thereby by merely changing the lower part of the said blade according to the width of line required.

It is not essential for the pen blade to contact directly with the working surface, for instance, a strip of rubber may be carried by the pen blade so as to rest on the working surface and effect the marking thereon.

The working surface A (Figure 2) is carried by four vertical adjusting screws 438 adapted to be adjusted simultaneously and for this purpose bevel gears 439 or other suitable means controlled by a hand wheel 440 are provided. Manipulation of this hand wheel causes the said working surface to be raised or lowered and at the same time maintains the level thereof constant. If, however, slight irregularities occur in the level of the working surface, such irregularities are provided for by the rocking movement of the pen blade as described, or its free movement in and out of its housing.

Should the production of a piece of work require a greater area than that provided for by the working surface upon which it is to be produced, it will be necessary to produce the work in sections, that is to say, to produce part of the work on the said surface and the remainder on another surface, so that when the sections are juxtaposed the desired piece of work is obtained.

For example, referring to Figure 42, the letters indicated therein may form part of an extensive letterpress announcement of such a character that the portions of the letters shown respectively in full and dotted lines are required to be produced on separate sheets.

In some cases, moreover, the work to be produced may be of such large proportions that a part thereof may extend beyond the limits of travel of the carriage and bridge, such limitations being imposed by the size of the machine.

When work of such large proportions is being produced it will be necessary to prevent the bridge and carriage from moving beyond the edges of the working surface such as, for instance, the edges indicated by 441 and 442, in Figure 42 and this undesired movement is automatically prevented by provision of suitable trip devices which will now be described and which are adapted to be set manually prior to the commencement of work.

The carriage O and the bridge B are preferable attached to their operating wires, always at the same point so as to prevent the possibility of the latter being overwound during the travel of the instrument over its working surface and at the points of attachment the said wires are looped round a disc-like element 443 as shown in Figures 42a and 42b, the operating wire 444 passing through apertures 445 provided in an extension of the said element 443, which latter is hereinafter referred to as the anchor.

The anchor 443 is normally located between the forked ends of a member 446 (Figure 43) rigidly supported upon a pivotal shaft 447 carried by the carriage or bridge, which shaft also rigidly supports a cam member 448 (Figure 44).

The forked member 446 and the cam member 448 are normally maintained in the positions illustrated in Figures 43 and 44 by means of a helical compression spring 449 acting on a plate 450 contacting with a flat portion of the cam member 448, and thus the anchor 443 is maintained in the position shown in dotted lines in Figure 43 during the normal operation of the machine, thereby enabling the bridge or the carriage to be driven.

The spring 449 and the plate 450 are supported by a rod 451 slidable in bearings 452 carried by a bracket 453 attached to the carriage or bridge.

A trip device 454 for limiting the movement of the carriage O is adjustably positioned on the bridge B and is adapted to be rigidly attached thereto by means of a locking lever 455 (Figures 44 and 44a) and upon which trip device a member 456 having a projecting finger is mounted so that the said finger projects into the path of the rod 451 carried by the carriage O.

A similar trip device to that being described is adjustably attached to the rail track of the bridge B so as to limit the movement of the latter as required.

Assuming now that the work being produced is that illustrated in Figure 42 the function of the trip devices will be considered.

These trip devices 454 are manually adjusted so that the rods 451 will meet the fingers 456 when the pen reaches the edges 441 and 442 of the working surface. Such adjustments can be effected by means of pointers 457 Figure 44 rigidly attached to the trip devices, and these pointers may co-operate if desired with a scale such as that indicated by 458.

The finger pieces of the pointers 457 are of the same width as the projecting fingers of the trip devices 454, and either edge of each finger piece may be utilized as the reading edge according to which edge of the projecting finger of each trip device is adapted to meet a rod 451.

Considering now that the pen is drawing the letter H and travelling in the direction of the arrow towards the point 459 upon this point being reached by the pen the rod 451 meets the projecting finger 456 of the member 454 and thereby prevents further movement of the bridge or carriage, as the case may be. The operating wire, however, continues its movement and as the anchor 443 associated therewith leaves the forked member 446 the latter is caused to rotate as shown in Figure 45.

Such a rotary movement of the forked member 446 is transmitted therefrom through the shaft 447 to the cam member 448 and the latter in rotating depresses the plate 450 and rod 451 against the action of the spring 449. The rod 451 during its depression moves into one of the gaps 560 provided in the member 456 and so effectively locks the carriage or bridge against movement in either direction. As one of the curved faces of the cam member 448 now bears against the plate 450 the tendency of the spring 449 to rotate the cam member into its normal position is counteracted, and thus the forked member 446 remains in the position shown in Figure 45 ready to again receive the anchor 443. The operating wire carrying the anchor continues its movement unimpeded as though the pen was completing the portion of the letter H shown in dotted line, and if the pen has been left in a position near its limit of travel imposed by the size of the machine, then the anchor 443 passes over the pulley at that end of the machine. Upon the said anchor arriving at the point 561 it meets and reenters the forked member 446 and causes the latter together with the cam member 448 to re-assume a normal position, thereby enabling the spring 449 to lift the rod 451 out of the gap 560 and thus release the bridge or carriage to continue its normal travel. In this way the pen may be caused to produce the desired portion of each letter shown in Figure 42 without travelling beyond the edge 441.

At the point 562 of the last letter to be produced the trip devices for both complementary motions will be in operation and thus the pen will be re-engaged by the anchor 443 of one complementary motion at the point 563 and will be caused to travel upwardly along the edge 442 until it reaches the point 564 where the anchor of the other complementary motion re-engages the said pen and causes it to travel horizontally.

According to a preferred construction of the machine, rotation of either camshaft 447 from normal is adapted to open a switch or the like to break the electrical circuit of the pen-depressing magnet, when the pen is obstructed by a trip device, so that the pen blade is lifted from the working surface.

A separate switch is provided for each complementary motion and these switches are preferably arranged in series so that the said electrical circuit is broken and the pen blade is caused to assume a raised position when either or both of the switches are open. In this way the pen blade is maintained in a raised position until both of the said switches are closed to remake the electrical circuit, which closure is effected by rotation of the camshafts 447 back to normal position.

Considering now the action of the aforesaid switches in connection with the production of the letter T (Figure 42), although the pen is re-engaged for upward motion at the point 563, the raised position of the pen blade is maintained owing to the trip device of the other complementary motion being in action, and in this way the pen blade will not be released until the point 564 is reached. The remainder or dotted portion of the design is produced in a similar way upon other surfaces and then these various surfaces are laid adjacent to each other and a complete and accurate design is obtained.

The record frame, the record band, and the manner in which the latter may control the various devices hereinbefore referred to will now be described.

The record band, which may be of any suitable material such as thin metal, thin paper or celluloid, is provided with a plurality of indentations, holes, pegs or projections arranged to constitute, as it were, a facsimile in code form of the design to be produced, which facsimile is hereinafter referred to as the record.

This record band, according to a preferred construction thereof, has the form of an elongated strip of paper capable of being conveniently wound upon a spool, and this strip of paper is provided with a series of perforations arranged so as to form the record.

Such a record band is adapted to travel from one roller to another and during its travel the perforations therein pass and actuate a device or devices which in turn actuate or control the various motions of the machine hereinbefore referred to. This control may be effected electrically, pneumatically, mechanically or in any other suitable manner, and in the machine being particularly described such control is effected electrically.

Figure 46 illustrates means whereby perforations in a record band may be utilized to produce electrical impulses.

An L-shaped bar 565 of light construction is pivotally supported at 566 and is provided at the extremity of its long limb with an inclined feeler member 567 adapted to frictionally contact with the record band 568. The feeler member 567 is preferably formed of steel wire of uniform cross section so that the surface thereof contacting with the record band remains constant during wear. Mounted on the short limb of the bar 565 is an adjustable contact screw 569 terminating in a contact member 570 of a non-corrosive, non-oxidizing conducting material, such as platinum or the like. Co-operating with the contact member 570 is another contact member 572 of similar material carried by an adjustable contact screw 571 mounted on an arm 573 pivotally or rigidly supported at 574.

A tension spring 578, adjustable by means of a set screw 579, is attached to a bracket 580 and bears against the short limb of the bar 565 so as to maintain the feeler member 567 in contact with the surface of the record band 568.

When, during the travel of the record band 568 in the direction of the arrow, a perforation 581 therein passes under the feeler member 567, the latter now being unsupported will drop into the perforation and thereby enable the action of the spring 578 to turn the bar 565 about its pivot 566 until the members 570 and 572 make contact. Such a contact is adapted to complete an electrical circuit and send out an impulse, one terminal of this circuit being connected to the bar 565 and the other to the arm 573. The continued travel of the record band 568 causes the rear end of the perforation 581 to raise the feeler member 567 and thereby return the bar 565 to its normal position, thus breaking the electrical contact between the members 570 and 572.

In this way an electrical impulse is emitted corresponding to each perforation in the record band.

If the arm 573 is pivotally supported at 574, then motion may be conveyed thereto from the bar 565 by means of projections 582 shown in dotted lines, and in this way the gap between the contact members 570 and 572 may be increased, as both the bar 565 and the arm 573 will now move to and fro to make and break the contact between the said contact members. This increased gap is thereby obtained without increasing the movement of the feeler member 567, which movement should be as small as possible in order to obtain the greatest duration of electrical contact between the members 570 and 572. A light spring may be arranged to bear on the projection 582 of the arm 573 so as to actuate the latter simultaneously with the bar 565.

One or several of the feeler members 567 together with their associated elements are housed within a cage 583 (Figure 47) supported by the record frame.

The record bands utilized in connection with the machine being described are preferably about 10 inches wide and several yards in length, although these dimensions may vary according to circumstances and requirement, and several records may be recorded on each record band.

These record bands are rolled upon tubes or rollers, hereinafter referred to as spools, one such spool being indicated at 584 (Figure 47).

The record frame as illustrated in Figures 47 and 48 comprises a framework for holding and actuating the record band during the production of work or during the preparation of records thereon.

When in use the record bands pass from the spool 584 over an idle roller 585, under the cage 583 housing the feeler members, over a driving roller 586, and from thence to a take-up spool 587.

Both the rollers and the spools are preferably provided with end flanges or cheeks to prevent lateral movement of the record band.

It is preferable although not fundamentally necessary for the record band to pass under the feeler member or members at a constant speed irrespective of the gradually increasing diameter of the take-up spool 587 when the record band is being wound thereon. If such a constant speed is desired, then the record band may be provided with a plurality of equi-spaced holes along its edges, such holes co-operating with pegs or projections on the actuating roller. Alternatively the record band may be passed between gripping rollers having rough surfaces and adapted to grip the said band firmly and cause it to move at a constant speed when desired.

Such gripping rollers are utilized in the machine being particularly described and are indicated by 586 and 586a (Figure 48) while the means for imparting rotation thereto will be described hereinafter.

In the case where the record band has a regular linear speed, the take-up spool must be driven to compensate for the gradually increasing diameter thereof when the record band is being wound thereon.

The spool 584 (Figure 47) is supported in the record frame by means of a spring plunger 588 and a short shaft 589 engaging its ends, and the shaft 589 is shaped to so engage the spool that the latter is incapable of independent rotation in relation to the said shaft. This enables rotation of the shaft 589 to be transmitted to the spool 584 when it is desired to rewind the record band thereon.

The shaft 589 terminates in a disc 590 provided with a handle 591 by means of which the said shaft can be rotated so as to in turn rotate the spool 584.

The function of the spring plunger 588 is to enable the spool 584 to be easily inserted and removed from the record frame.

A small ring, hook or other suitable fastening device is provided at the commencement of the record band for attachment to the take-up spool 587, so as to facilitate the winding of the record band thereon, such fastening device being preferably self-detachable when the record band is completely unwound from the said take-up spool.

This take-up spool 587 is also provided with a handle 592 (Figure 48) so that it may be turned by hand to facilitate the fastening thereto of the record band and to enable the latter to be turned to the position where the recordings commence.

In order that a record band may be easily inserted into or removed from the record frame, the upper gripping member 586a and the feeler cage 583 are adapted to be raised, and this is effected in the manner now to be described.

The roller 586a is journalled in the extremities of arms 593 the other ends of which are pivotally supported at 594 by the framework of the record frame.

The feeler cage 583 is slidably carried by rods or rails 595 and 596 connected together at their ends by arms 597 and forming therewith a rectangular framework termed hereinafter the feeler frame. This frame is adapted to pivot about the rod 596 which is supported in housings or bearings 598 in the side members of the record frame. Both the feeler frame and the roller 586a are normally maintained in the position shown by tension springs 599 and 600 respectively.

Attached to the upper rod 595 of the feeler frame is one end of a link 601 having its other end pivotally connected at 602 to a hand lever 603 in turn pivotally attached to a side member of the record frame at 604, which hand lever 603 is provided with an operating handle 608. The arm 593 carrying the roller 586a is also coupled to the hand lever 603 by means of a link 605 pivotally attached to the latter at 606 and to the arm 593 at 607.

When the hand lever 603 is moved in an anti-clockwise direction by means of the handle 608, the feeler frame and the roller 586a are lifted out of contact with the record band by the links 601 and 605, swinging about their fulcrums 602 and 606 against the action of the tension springs 599 and 600. During this movement of the hand lever 603, the springs 599 and 600 are subjected to a maximum tension as the links 601 and 605 assume positions parallel with the said hand lever 603, and as the movement of the latter continues the springs 599 and 600 begin to contract again owing to their associated links 601 and 605 assuming a position in relation to the centre line of the hand lever 603 opposite to that shown in the drawings, and thus the said springs, through the links 601 and 605, tend to rotate the lever 603 still further in an anti-clockwise direction, such further movement, however, being prevented by a stop 608. Hence, the feeler frame and the roller 586a are maintained in a raised position by the springs 599 and 600 until the hand lever 603 is returned to its normal position, and are thus adapted to be raised or lowered and locked in either of these positions by a suitable actuation of the said hand lever 603.

After the record band has been transferred from the spool 584 to the take-up spool 587, during the operation of the machine, the said record band may be conveniently re-wound upon the spool 584 either by turning the handle 591 by hand, as previously stated, or by automatically rotating the disc 590. For this purpose a disc 609 of similar dimensions to the disc 590 is mounted in the same vertical plane as the latter and is supported by a shaft 610 suitably journalled in the record frame and coupled to the prime mover. These discs and their associated elements are shown clearly in Figures 49 and 50.

A slidable shaft 611 is mounted in bearings 612 and carries a pivotal bracket 613 adapted to partake of the sliding movement imparted to the shaft 611 in the manner to be described. The pivotal bracket 613 forms a bearing for a shaft 614 having rubber covered wheels 615 and 616 rigidly attached to its ends and capable of contacting respectively with the discs 590 and 609. A lever 617 is pivotally supported on the shaft 611 so as to be capable of independent rotation in relation to the bracket 613. Pivotally supported at 617a by the lever 617 is a tooth or latch 618 adapted to engage a suitable groove in a catch 619 attached to the side member of the record frame.

Rigidly attached to the shaft 611 is a bush 620 carrying a pin 621 projecting into the interior of the record frame through a slot in the side member thereof.

Pivotally connected at 622 to the inside of this side member of the record frame is a lever 623 supporting at its upper end a roller 624 adapted to be maintained in contact with the take-up spool 587 by means of a tension spring 625 (Figure 49).

Pivotally attached at 626 to the lever 623 is one end of a link 627 the other end of which houses the projecting pin 621 rigidly carried by the shaft 611.

Considering now the function of the elements set forth in connection with re-winding the spool 584, it will be seen that as the record is being wound upon the take-up spool 587 during the operation of the machine, the roller 624 is gradually moved to the left, owing to the gradually increasing diameter of the said take-up spool, and this movement of the roller 624 actuates the lever 623 and link 627 thereby causing the pin 621 to slide the shaft 611 carrying the bracket 613 and the lever 617 in the bearings 612.

It should be understood, however, that during this sliding movement, that is to say, when the machine is in operation, the latch 618 is disengaged from the catch 619 and is not in the engaged position shown in Figure 50. The catch 619 is so positioned in relation to the latch 618 that when the roller 624 is in its normal position, that is to say, before the commencement of winding the record band upon the take-up spool 587, the latch 618 is clear of the end of the catch 619, and thus the position of engagement thereof shown in Figure 50 is only possible when a portion of the record band is wound upon the take-up spool 587. Hence, as the latch 618 is clear of the catch 619 prior to the commencement of the operation of the machine, the weight of the lever 617 causes it to rotate about the shaft 611, and this enables a tension spring 628, attached to an extension 629 of the lever 617 and to the bracket 613 to relax and thereby allow the wheels 615 and 616 supported by the bracket 613 to drop clear of the discs 590 and 609 by the rotation of the said bracket about the shaft 611.

After the completion of a piece of work, however, and when the record band is fully wound upon the take-up spool 587, the latch 618 is positioned opposite to the catch 619 in consequence of the sliding movement of its supporting lever 617 with the shaft 611.

As it will now be desired to re-wind the record band upon the spool 584 the lever 617 is pressed by hand towards the record frame, which movement first causes the wheels 615 and 616 to be brought into contact with the discs 590 and 609 owing to the spring 628 lifting the bracket 613, and then subjects the said spring 628 to tension, thereby enabling the latch 618 to engage the catch 619 and at the same time increasing the contact pressure between the said wheels and discs.

By virtue of the prime mover being coupled to the disc 609 a constant speed of rotation is imparted to the latter and is communicated therefrom, by means of the friction wheels 615 and 616 to the disc 590 so that rotation is imparted to the spool 584 and the record band is caused to be re-wound thereon. The speed of this re-winding will depend upon gear ratio involved by the relative positions of the wheels 615 and 616 and the discs 590 and 609, and such speed is arranged to be as rapid as possible without damaging the record band.

During the procedure of re-winding the diameter of the take-up spool 587 gradually decreases and thus allows the roller 624 and the members controlled thereby to move towards the right under the action of the spring 625. The diameter of the spool 584, upon which the record band is being re-wound, is, on the other hand continually increasing in diameter and if a constant speed of rotation is imparted to the disc 590, then the linear speed of the record band will also continually increase.

The movement of the wheels 615 and 616 across the discs 590 and 609, in consequence of the aforesaid movement of the roller 642 towards the right, however, obviates such a constant speed being imparted to the disc 590 and gradually reduces the gear ratio between the latter and the disc 609 thereby reducing the speed of the said disc 590.

This reduction of speed of the disc 590 is arranged to counteract the tendency of the record band to increase in speed so that the latter travels at a constant linear rate during its re-winding procedure.

Upon the take-up spool 587 becoming empty or just prior to this the roller 624 and the elements controlled thereby have re-assumed their normal position so that the latch 618 clears the catch 619, and thus the hand lever 617 is released and the wheels 615 and 616 move out of engagement with the discs 590 and 609 as described.

At the end of the production of a piece of work therefore, it is merely necessary to press the hand lever 617 to re-wind the record band, the action of the elements for effecting the re-winding being automatically stopped at the completion thereof.

Referring again to Figure 48, 630 is a friction pawl pivotally supported at 631 and normally maintained in frictional engagement with the disc 590 by means of a tension spring 632. The function of this friction pawl is to prevent manual re-winding of the record band while the feeler frame is in a lowered or working position. In this respect it will be realized that if the record band 568 (Figure 46) is moved in a direction opposite to the arrow, the feeler member 567 will drop into one of the recorded perforations 581, and the said member 567, in consequence of its inclination, will tear the record band.

It is to obviate such damage to the record band that the friction pawl 630 is introduced, and this pawl is provided with a projection 633 positioned in the path of a member 634 adjustably supported by a rod 635 slidably mounted in bearings 636 and connected to the hand lever 603 by means of a link 637. When the hand lever 603 is moved in an anti-clockwise direction to lift the feeler frame as described, the member 634 meets the projection 633 of the friction pawl 630 and raises the latter out of engagement with the disc 590 which is then free to be rotated for the purpose of re-winding the record band upon the spool 584.

When the hand lever 603 is in its normal position as shown in Figure 48, the member 634 is interposed between the record frame and the lever 617, and thereby the latter is prevented from being moved into a position for automatically re-winding the record band as hereinbefore described. Hence, the record band cannot be re-wound either automatically or manually while in engagement with the feeler members.

A friction brake 638 is normally held out of engagement with the rim of a disc 639, attached to the shaft of the take-up spool 587, by means of a pin 640 carried by the hand lever 603 and bearing against the said friction brake 638. When, however, the lever 603 is actuated to lift the feeler frame and the roller 586a so as to allow the record band to be re-wound, the friction brake 638 is released from the pin 640 and frictionally grips the rim of the disc 639 to an extent sufficient to ensure that a slight tension is placed upon the record band during the re-winding procedure which tension prevents the record band from being loosely re-wound upon its spool.

As the feeler members 567 (Figure 46) make an electrical contact when they are allowed to drop it will be apparent that upon raising the feeler frame this contact will be made by the dropping movement of the feeler member and maintained during the period that the said frame remains in a raised position.

Such a continued contact would complete an electrical circuit through the devices controlled by the feeler members and so disorganize the adjustment of the machine besides causing excessive heating thereof each time the feeler frame was raised.

This disadvantage is obviated by the provision of means whereby the feeler frame is prevented from being raised while electrical current is being supplied to the feeler members, and these means comprise a pin 641 adapted to be actuated by a member 644 Fig. 51 associated with a switch as hereinafter described, the arrangement being such that the pin 641 projects outwardly through a side member of the record frame and engages a recess in a segment 642 Figs. 48 and 52 when the said switch completes the electrical circuit to the feeler members. The segment 642 is rigidly carried by the hand lever 603, and the engagement of the pin 641 with the said segment is such as to prevent the actuation of the said hand lever.

When, however, the switch breaks the electrical circuit of the feeler members the pin 641 is withdrawn from engagement with the segment 642 and the lever 603 is free to be actuated.

When the feeler frame is in a raised position, the said switch cannot be actuated to restore the supply of electric current to the feeler members owing to the fact that the extremity of the segment 642 prevents the pin 641 from being projected outwardly when the hand lever 603 abuts against the pin 608 and so prevents the said switch from being actuated.

As previously stated, a hand operated clutch may be associated with the shaft driving the bridge so that the latter may be uncoupled from its driving means and rapidly adjusted in the required position. Such a clutch is operable by a hand lever 643 (Figure 48) supported by a pivotal shaft 669 and adapted to disengage the clutch when moved in a clockwise direction.

If during the adjustment of the machine, prior to commencing a piece of work, the actuation of this clutch to couple the bridge with its driving means is inadvertently overlooked, then the carriage only would be driven, and in this way the piece of work would probably be spoiled before the omission was discovered and rectified.

The possibility of such an omission is obviated by the provision of a catch member 667 Fig. 52 mounted upon the pivotal shaft 669 connecting the lever 643 Fig. 48 to the said clutch, and this catch member is adapted to prevent the driving rollers of the record frame from being engaged to be driven unless the clutch is in a position to couple the bridge with its driving means. Such an engagement is prevented by the co-operation of the catch member 667 with the lever 644 mentioned hereinbefore and to be described hereinafter, which lever operates the pin 641 and the switch associated therewith, and controls the coupling of the driving rollers of the record frame to their driving means.

A plurality of record frames may be conveniently utilized in connection with the same machine and according to the construction being particularly described, two such record frames are provided (see Figure 2).

In a machine utilized for the production of announcements in letterpress the designs recorded upon the record bands will be principally letters of the alphabet, and in such announcements the initial letters of words are frequently of capital form, or what is technically known as upper case letters, whereas the remaining letters of the words are of small form, or lower case letters.

For convenience the upper and lower case letters should be recorded on separate record bands and, hence, in the event of one record frame only being used, substitution of a record band having upper case letters for that having lower case letters would be entailed for each upper case letter required in the work being produced.

The use of two record frames, therefore, considerably increases the output speed of the machine by allowing the use of record bands differently recorded to be used alternatively as required without necessitating the removal thereof from their frame, and furthermore, should a change of record band become essential, this can be effected on the frame not in use and while the other frame is in operation.

These record frames may, however, be provided with bands having identical recordings thereon so that if, for instance, one letter has been completed by the first frame then the second frame may be brought into action to continue with the next letter while the first record band is being re-wound and adjusted to proceed with the next succeeding letter.

Referring now to Figures 51 and 52, the lever 644, disposed between the record frames, is adapted to assume one of three positions indicated respectively by 645, 646 and 647 and the combined function of this lever is to engage gears coupling either of the record frames with the driving means, to actuate the switch adapted to supply electric current to either set of feeler members, and to operate the pins 641 for preventing the incorrect manipulation of the machine as hereinbefore described.

This lever 644, which is provided with a suitable handle 648 at its upper end and is pivotally supported at its lower end at 649, is adapted to move between guide plates 650 and 651 (Fig. 52), the latter plate being provided with three notches in its upper edge for the purpose of co-operating with a spring catch 652 carried by the lever 644 to lock the latter in the three positions referred to. The extreme notches are constructed to positively lock the lever 644 until the catch 652 is raised by hand, whereas the central notch is formed with inclined sides so that when the lever 644 is located in the central position a slight pressure thereon causes it to be moved, the spring catch riding up the inclined sides of the notch.

The machine is so arranged that when the lever 644 is locked in either of its extreme positions the record frame at that side of the machine is in engagement with the driving means, the adjacent side members of the record frames being indicated by 653 and 654.

The lever 644, termed hereafter the change over lever, rigidly supports a pin 655 (Figure 52) engaging a member 656 rigidly carried by a slidable shaft 657 hereafter referred to as the shift rod. Helical springs 658 surrounding the shift rod 657 are interposed between the member 656 and side members 653 and 654 of the record frames, such that the movement of the change over lever 644 to one of its extreme positions causes one of the springs 658 to be compressed and thus, when the spring catch 653 is raised, the lever 644 is returned to its central or neutral position by the expansion of the compressed spring. The spring catch 652 is adapted to be raised by pressing a pivotal lever 659, suitably mounted on the guide plate 651. One such pivotal lever only is shown in the drawings, but one for each of the two extreme positions of the change over lever 644 is provided.

The shift rod 657 carries forked arms 660 and 661 engaging collars rigid with slidable gear wheels 662 and 663 adapted to couple the driving rollers of the record frames with driving gear wheels 664.

The gear wheels 662 and 663 are slid into engagement with the driving gear wheels 664 by means of springs 665 and 666 when the latter are released by the movement of the forked arms 660 and 661 with the shift rod 657, and in this way it is possible to move the change over lever 644 rapidly from one of its three positions to another, even if the teeth of its associated gear wheels are not in a suitable position to immediately intermesh.

The springs 665 and 666 cause these gear teeth to intermesh when the rotation of the driving gear wheels enables the said teeth to assume an appropriate relative position. In this way the movement of the change over lever 644 is facilitated and the teeth of its associated gear wheels are not damaged during the said movement.

The pivotal shaft 669 (Figure 52) supporting the controlling hand lever 643 of the clutch associated with the bridge driving shaft, is positioned adjacent the lower end of the change over lever 644, and carries the catch member 667 adapted to be moved into the path of the change over lever when the said clutch uncouples the bridge from its driving means.

The operative position of the catch member 667, that is to say the position assumed thereby when the said clutch uncouples the bridge from its driving means, is shown in dotted lines and in this position the said catch member prevents the change over lever 644 from being moved. When, however, the hand lever 643 is operated to recouple the bridge and its driving means, the catch member 667 is moved out of the path of the change over lever 644 and is caused to reassume its normal position as shown.

The shift rod 657 also causes the actuation of the switch previously referred to for completing the electrical circuit of either record frame as desired, one form of such switch being illustrated in Figure 53.

Referring to this latter figure, a member 670 rigidly supported by the shift rod 657 (Fig. 51) is provided with a plurality of projections or tongues 671 connected to a lead of an electrical circuit by means of suitable wires, and these tongues are adapted to engage with either contacts 672 or 673, according to the position of the change over lever 644, and thereby complete the electrical circuit of either record frame, as desired. The construction and disposition of this switch is such that the tongues 671 do not make contact with either of the contacts 672 or 673 when the change over lever 644 is in its central or neutral position, so that the electrical circuits of both record frames are open when the said lever is in this position.

The speed of the driving gear wheels 664 is controlled by the variable gearing 382 Fig. 51 adapted to be set manually as previously stated.

The shift rod 657 also carries the pins 641 associated with the hand lever 603 as and for the purpose hereinbefore described.

The manner in which a perforated record band controls the machine during the production of a piece of work will now be considered.

The perforations constituting the record of the work to be produced are arranged longitudinally in the record band so that successive perforations pass under the feeler member to be actuated.

These perforations are grouped or disposed so that the various motions of the machine are operated in the correct sequence and at the correct times in relation to the travel of the operating instrument or pen.

It will be understood that the driving rollers of the record frames are mechanically coupled to the operating instrument, that is to say the latter and the said rollers are driven from the same shaft so that the travel of the instrument is always in the desired proportion to the travel of the record band.

Although such a mechanical coupling is preferable it should be clearly understood that, if desired, the record frame may be mechanically independent of the other component parts of the machine, and merely connected thereto by suitable means, such as a wire or wires, for the transmission of electrical impulses. In this way it will be possible to separate the record frame from the rest of the machine by a considerable distance.

As the perforations are disposed in lines, as it were, along the record, each line of perforations cooperating with a separate feeler member, it will be seen that if each feeler is utilized to control a different motion of the machine, then the desired operations of each of these motions may be recorded on the record band in separate lines of perforations, such lines being positioned as close together as is conveniently possible.

Such a plurality of lines of perforated recordings would, however, involve the utilization of a wide record band.

To obviate the necessity for such wide record bands a single line of perforations may be adapted to control the actuation of all the various motions of the machine, and this enables a large number of lines of perforations each constituting a different design, to be incorporated in the width of a single record band. For instance, records corresponding to all of the letters of the alphabet may be recorded on a record band of moderate and practicable width.

It will be understood, however, that the method of utilizing a separate line of perforations for each motion of the machine may be conveniently utilized, if desired, when for instance one design record only is required.

Between the limits of a single line of perforations only to control all of the various motions of the machine and one line of perforations for each particular motion, any number of such lines may be used as will be fully described hereinafter.

Considering now the control of the various motions by means of a single line of perforations, as the latter pass under the feeler member a magnet is caused to be intermittently energized and this magnet is adapted to control a device termed a selector for selecting the particular electrical circuit to be established. One terminal end of each of the electrical circuits controlling the various motions of the machine is connected to the selector so that when the aforesaid magnet is energized a contact member is stepped to establish the selected circuit. The particular terminal end with which the moving contact member is in contact when the intermittent energization of the magnet ceases, is the circuit selected, and after this circuit has received an impulse, the contact member returns to its normal position under the action of a spring. The perforations in the line may be considered as being disposed in groups, the number of perforations in a group determining the particular terminal end to be left in contact with the moving contact member.

The selecting magnet may move the contact member in any suitable manner, such as by rotating a wheel or oscillating a bar, and the contact member is adapted to be moved from one terminal to the next at each impulse or step of the magnet so that the number of the terminal finally reached corresponds with the number of perforations comprising a particular group.

One form of such a selector is illustrated in Figures 54 and 55, the magnets being omitted from Figure 55 for clearness.

Rotatably mounted upon a suitable shaft is a light drum 674 upon the surface of which are mounted rounded pegs 675, the number of which may correspond with the number of selections it is desired to make, or with the number of pairs of contact springs 676 which in turn may also correspond with the desired number of selections. When a peg 675 passes under a pair of contact springs 676 the lower of such springs is raised by the peg into contact with the upper spring thus establishing an electrical path at that point, although this path does not always complete an electrical circuit, as will be described.

677 is a ratchet wheel rigidly attached to the drum and adapted to be stepped by a magnet 678 through its armature and a pivotal pawl 684, in the usual manner, so that each time the magnet 678 is energized the ratchet wheel 677 is moved one step. 678 is the selecting magnet hereinbefore referred to and the contact springs 676 are the terminal ends associated therewith, the pegs 675 representing the aforesaid moving contact. At each step of the wheel 677 a different peg 675 is brought under a different pair of contact springs 676 and the said pegs are so arranged that when the number of steps imparted to the wheel 677 corresponds to the number of such pegs, then each pair of the contact springs 676 will have been operated once. Hence any pair of the said springs, each pair being hereafter referred to as a spring set, can be caused to make an electrical path according to the number of impulses sent out to the magnet 678.

As the wheel 677 is rigidly attached to the drum 674 by means of a bossed portion, a gap is left between their adjacent surfaces, and within this gap is mounted a light spiral spring 678a anchored to a standard 679 and having its inner end attached to the said bossed portion. When the drum is stepped round therefore, the spring 678a is wound and upon an impulse being transmitted to a release magnet 680, the latter attracts a check pawl 681 so as to free the ratchet wheel 677 and enable the spring 678a to return the drum 674 to its normal position, further movement thereof being prevented by a stop 683 (Figure 55).

A peg 675 may, if desired, be adapted to close one of the spring sets when the drum is in normal position. The pawl 684 is pivotally supported by the armature of the magnet 678 and is adapted to clear the ratchet wheel 677 when the said pawl is in its upper position, by an extension thereof abutting against a stop 697, so as to enable the return movement of the drum to be effected without being obstructed by the said pawl. The electrical circuits of the various devices adapted to be controlled by the record are each connected to a spring set as at 686, 687, 688 and so on, so that according to the number of perforations in a group in the record so the number of impulses imparted to the stepping magnet 678 will vary and in this way any of the required operations in the machine is carried out. But, as previously stated, the mere establishment of an electrical path by the closure of a spring set does not complete an electrical circuit, as in such a case each of the circuits would be established in turn as the drum 674 was stepped round and again when it was returning to its normal position, and the selection of any particular circuit only for energization could not be effected.

Hence, when the drum 674 is stepped into a position to close the spring set of the selected electrical circuit, it is necessary to actuate a supplementary contact to enable the said circuit to be completed. This contact which is termed the operating contact is suitably arranged in an electrical path common to all the electrical circuits so that only one such operating contact is required to complete any of these circuits. After the selected circuit has been established, a release magnet 680 (Figure 54) is adapted to receive an impulse so that the selector is returned to a normal position, as described, but the operating contact must be broken prior to such an impulse being imparted to the release magnet so that the various circuits are not energized in turn as the pegs 675 again pass under the spring sets 676 in returning to a normal position. According to this sequence of operations, the drum 674 is stepped round to the position required by magnet 678, the operating contact makes and breaks the selected electrical circuit, an impulse is transmitted to the release magnet 680, and the selector is returned to a normal position.

Such a sequence of operations may be achieved in different ways according to the type of perforations provided in the record band. For instance, considering one group of perforations, representing one particular operation to be carried out, all of the perforations in this group, and therefore all of those in the record, may be equal sized small circular perforations; or the last perforation in the group may be circular while the remaining perforations therein are elongated; or again the last perforation of the group may be elongated while the others are circular; or still further; instead of separate perforations, one long perforation may take the place of a group, the selecting in this case depending upon the length of the particular perforation.

Any of these systems of perforations may be used with very slight constructional difference in the associated mechanism.

In these various cases when an operating signal, made by the operating contact, is given the selector is returned to a normal position, by, in the first case, the cessation of the group of perforations; in the second and third cases by means of the last perforation in a group differing from the others therein; and in the final example, again by the cessation, or the passage of the end, of the elongated perforation.

Considering the first example wherein all the perforations are equal sized round holes, these perforations may be caused to energize a magnet 698 (Figure 56) simultaneously with the magnet 678, that is to say both of these magnets receive the same impulse. When the magnet 698 receives its first impulse, however, and attracts its armature 699, the latter cannot immediately return to its normal position in the usual way upon the cessation of the impulse, in consequence of a pawl 700, attached to the armature, engaging the teeth of a slowly revolving wheel 701. This wheel 701 is adapted to retard the return of the armature 699 so that the next and each subsequent impulse caused by the group of perforations energize the magnet 698 in turn before its armature has had time to be returned to a normal position by the spring 702. In this way only the first perforation of each group has any real effect, the armature 699 being maintained in a lowered position during the passage of the remaining perforations, however many, until the whole group has passed, when the magnet 698 no longer receives impulses, and the armature thereof is allowed to return to a normal position. The armature 699 is provided with an extension terminating in a catch 703 engaging with pins 704 and 705 supported by a wheel 706. This wheel 706 is impelled round by friction but is only capable of movement when the movement of the pins carried thereby is unobstructed by the catch 703, and these pins are repeated in pairs at suitable intervals around the face of the wheel 706 as shown, the catch 703 and the pins 704 and 705 forming a species of escapement mechanism. Hence, when the armature 699 and catch 703 are depressed a pin 704 is released but movement of the wheel 706 is again checked by a lower pin 705 for such period as the armature 699 is held down. Upon the return of the armature 699 the wheel 706 is allowed to revolve until it is checked by the upper pin of the next pair, and these partial rotational movements of the wheel 706 are termed the first release and second release respectively. During the first release, that is to say, upon the magnet 698 receiving its first impulse, the catch 703 clears the pin 704 and the wheel 706 rotates until the catch 703 meets the pin 705. The armature is now held down in the aforesaid manner for a period corresponding to the passage of the group of perforations, the wheel 706 remaining checked by the pin 705, but during this period the selector is being stepped round by the same perforations, as previously described. At the completion of the group of perforations, the selector has now selected the circuit required, the armature of magnet 698 returns to a normal position to allow the second release of the wheel 706. The ensuing partial rotation of the wheel 706 sends out two impulses intermittently, each to a different circuit, by means of spring sets 707 and 708 adapted to be operated by projections on the wheel 706 and on a wheel 709 attached thereto (Figure 57). The first of these impulses is the operating signal previously referred to, which completes the selected circuit so as to operate the particular device selected for operation. The second impulse, given out by wheel 709 the projections of which are shown in dotted lines in Figure 56 is sent to the selector release magnet 680 (Figure 54) so as to allow the selector to return to a normal position, and this second impulse, for the reasons previously set forth, does not take place until the completion of the first impulse. The whole of the selecting apparatus has now re-assumed a normal position and is ready for another group of impulses. In this way all the motions of the machine can be controlled by a single row of equal sized perforations and for this purpose the circuit operating the direction control unit is preferably connected to the first spring set on the selector, so as to require one perforation only to produce the necessary impulse therefor. The magnet 698 (Figure 56) may be of the type known as slow-to-release, instead of being mechanically retarded by the wheel 701, such a type of magnet having a large amount of copper incorporated in its magnetic circuit, cannot respond to rapid impulses, and therefore remains energized during a train of impulses, as has been described.

Considering the third case, wherein the perforations in a group are circular with the exception of the last perforation which is elongated, such a group of perforations may operate similar apparatus to that shown in Figure 56, except that the teeth of the retarding wheel 701 face the other way and it revolves in the opposite direction, thus preventing the armature 699 from being attracted by rapid impulses, such attraction only being allowed by an impulse of comparatively long duration, such as is given by the final elongated perforation. The operating and release impulses would be given by a similar friction turned wheel to that described but freed in this case by attraction of the armature instead of its release, and the selector would be operated as before. In the case of a group consisting of one perforation only, such as would be required to select the first spring set in the selector, which spring set may operate the direction control unit as previously stated, this perforation would of course be the elongated one. The magnet 698 could in this case be of the slow-to-make type.

Considering now the final case wherein single elongated perforations of differing length are utilized, the selector, instead of being stepped round would be carried round by a friction drive in a similar manner to the wheel 706 (Figure 56). The selector drum would be provided with pins as on wheel 706, except they would be arranged singly and not in pairs as for escapement action, and thus upon the magnet 678 (Figure 54) being energized by a continuous perforation the drum 674 would be free to revolve. When, however, the drum 674 had revolved sufficiently to bring the required spring set into action the perforation would cease, the magnet 678 would be released, and the drum 674 checked from further rotation, and, hence, the particular spring set to be selected would depend upon the length of the perforation. The apparatus in Figure 56 would, in this case, be as shown with the exception that the retard wheel 701 and pawl 700 would not be required, the armature of the magnet 698 being held down for the length of the perforation and only released upon its cessation, when the selector would be in the required position, and the two impulses sent out as before. It could be arranged that for selecting the first spring set in this case the perforation could be a single circular perforation; for the second, a perforation double length and so on.

Considering now the second case, the pins on wheel 706 (Figure 56) would be arranged so that the two aforesaid impulses are given out on the first release, the second release serving only to re-engage the upper pin 704 with the catch 703. In this case the pins 705 would be positioned slightly in front of the next succeeding pin 704 although still on a lower level, and the electrical circuits of the spring sets 707 and 708 are only completed through an additional spring set 710 adapted to be operated by the armature 699. Hence the primary elongated perforations in a group cause the armature 699 to be held down and thereby break the contact 710 while the wheel 706 is revolving and operating spring sets 707 and 708 and as the latter cannot send out impulses while the circuit is broken at 710 the selector is not returned nor an operating signal given. The final short perforation, however, causes the release of the armature 699 so as to make the contact 710 before the spring sets 707 and 708 have been operated and thus, when the latter operate they send out impulses as before. In this way the short perforation at the end of a group controls the operating signal and the return of the selector. A single perforation constituting a group in this case would of course be a short one.

Most of the actions or operations required during the production of a piece of work, such as the raising and lowering of the pen or marking instrument, the movement of the clutch for drawing small curves and so on need only occasional manipulation, but the direction control unit, on the other hand, is in constant operation, as when drawing curves, or changing direction at a corner. Moreover, the impulses to the direction control unit must be sent out as rapidly as possible, in order to negotiate corners rapidly and to generally speed up the machine and it is preferable, therefore, that the direction control unit be operated by a line of perforations provided in the record band for this purpose only. The impulses may then follow each other in very close sequence and no time is lost in waiting for the selector to select and then return to normal again, for each impulse. This allows, for various reasons, the control of the operating signal to be effected in a simpler manner. Or again the operating signal may also be controlled by a separate line of perforations and a separate feeler member, thereby making a total of three separate lines of perforations. The manipulation of the pen or operating instrument to maintain it in a position facing its direction of travel may be effected by coupling it up, by means of sliding and rotating shafts, directly to the direction control unit so that it partakes of the rotation thereof, as has been explained, or, alternatively, the perforations controlling the direction control unit may also energize a stepping magnet on the carriage to step the instrument round, thereby eliminating the coupling shafts. But with such controls for the instrument the rotation thereof will only conform to the rotation of the direction control unit.

To achieve an independent rotation of the instrument for purposes hereinbefore explained, therefore, a further line of perforations may be used for the sole purpose of rotating the said instrument, thus making a total of four lines of perforations. This total still allows the characters in a whole alphabet to be recorded side by side and at the same time maintain a width of record band within practicable limits.

According to the construction being particularly described, however, three lines of perforations only are used; one for rotating the direction control unit, one for independently rotating the pen; and one for stepping the selector and giving the operating signal by the simplified means previously referred to and to be described hereinafter.

The dimensions of the record bands are therefore such that large numbers of the said bands may be stored in a comparatively small space.

Describing more particularly the method of control in the machine being described, four feeler members are utilized, two of which co-operate with the same line of perforations, the relative positions of these latter feeler members being shown in Figure 58, wherein the feeler member 711, for example, may operate the direction control unit, the member 712 may rotate the pen as hereinbefore described, the member 713 may operate the selector while the member 714 controls the operating signal and returns the selector to a normal position.

These feeler members, previously described, are mounted in the feeler cage 583 (Figure 47) which cage is adapted to be moved along its supporting bars 595 and 596 by means of a handle 583a.

In a machine in which the records used are predominantly alphabets, an engraved or otherwise marked member 715 may be conveniently attached to the record frames in a suitable position above the feeler cage upon which member is marked the letters of the alphabet, arranged in the order, side by side, in which these letters are usually recorded on the record bands. This order may be the usual sequence of the alphabet and such a marked member 715 is shown in Figure 47. A pointer may be attached to the feeler cage as shown, and the arrangement of the machine may be such that when the feeler cage is moved so that its pointer coincides with a particular letter on the member 715, then the machine will produce that letter and it is therefore a very easy matter to choose any letter for production. Bars or rails may be provided for locking the cage in position so that it cannot move during production of the desired piece of work. Two such notched bars 716 and 717 are shown in Figure 47 and suitable catches on the feeler cage are adapted to engage in the said notches. The catches and bars are arranged so that when the feeler frame is raised the catches are free of the notches or slots so that the cage may be moved for the production of another letter, but when the frame is lowered by moving lever 603 as hereinbefore described, the catches on the cage are caused to engage with the slots and thus effectively lock the cage so that the latter cannot therefore be moved while the feeler members are in contact with the record band.

The manner of controlling the direction control unit, by sending out electrical impulses, has previously been described and the feeler member 711 is the contact 182 shown in Figure 12.

The manner of stepping round the pen has also been described, and the magnet 397 (Figure 27) mounted on the carriage is controlled by the feeler member 712.

Describing now the mode of operation of the feeler member 714 which controls the operating signal and returns the selector to normal, the provision of a separate feeler member for this purpose instead of causing feeler 713 to operate both the selector and operating signal is equivalent to providing a separate line of perforations for this purpose and allows the same simplification of action.

Referring to Figure 59 wherein 718 represents a group of perforations moving in the direction of the arrow for selecting the third spring set on the selector, the passing of these perforations under the feeler member 713 will turn the selector three steps. The first of these holes on reaching feeler member 714 will energize the magnet 698 (Figure 56) and so allow two consecutive impulses to be sent out for completing the required circuit and returning selector to a normal position in the manner described, the retard wheel 701, the pawl 700 and the spring set 710 not being required. The pins indicated by 705, however, should be positioned adjacent to the next succeeding pin 704 as has been previously described so that the impulses are sent out immediately pin 704 is released, that is to say immediately the magnet 698 is energized. If the other two perforations in the group 718 (Figure 59) pass under feeler 714 while the wheel 706 (Figure 56) is revolving, the action is not interfered with by the additional impulses imparted to the magnet 698. If further perforations pass under the feeler member 714 after wheel 706 has reached its next check pin, as may happen with a long group of perforations, this again does not interfere with the action as although the wheel 706 will be again released and operate spring sets 707 and 708 the selector will now be in a normal position and such operations will have no effect.

Describing now by way of example the precise manner in which the selector may control the various operations required, this control may be effected through the medium of simple step switches of the make and break type, such as those illustrated in Figure 12, operated or stepped by electro-magnets, one such switch being supplied for each required action.

As previously indicated, one of the operations required is that the complementary motions be stopped independently of the other mechanism, and this is achieved by the movement of clutch 328, Figure 18, operated by the magnet 331 and a return spring 331a. This magnet 331 is controlled by a simple step by step switch as shown in Figure 12 so that circuit to the said magnet is alternately made and broken at each step of the switch and while this magnet 331 is energized the clutch 328 is held in one position whereas when the said magnet is de-energized the clutch is held in the other position by the spring 331a. The circuit to such a step switch is completed through one of the spring-sets, for instance, that indicated by 687, on the selector and spring-set 708 (Figures 55 and 56). When spring-set 687 is selected by the record, therefore, an impulse is sent out to the aforesaid step switch and the magnet 331, Figure 18, termed the stop-and-start magnet, is energized so that the complementary motions are set in movement. If the spring-set 687 is again selected and another impulse sent out in the usual manner, the step switch is again actuated so as to break the circuit to the stop-and-start magnet and the clutch 328 is operated by the spring 331a to stop the complementary motions. Hence by alternate selections of spring-set 687 the complementary motions are either driven or stopped.

This is the general principle according to which all of the operations controlled by the selector are manipulated and the various step switches required for this purpose are housed in the casing 102, Figure 2. Pointers are provided on the control panel shown in Figure 3 for indicating the position of the various clutches and other apparatus in order that the machine may be suitably set by hand prior to commencing work.

Another such operation is the changing of direction of rotation of the direction control unit. This has previously been described and the circuit therefor is illustrated in Figure 12. The step switch in this case is magnet 172 and the wheel 169, the operating contact 184 being the spring-set 688 for example on the selector and the circuit of this spring-set is again completed through the spring-set 708, Figure 56.

Another similar action is the changing of direction of rotation of the pen. This is carried out in a similar way to that shown in Figure 12, the step switch in this case also requiring two contacts similar to those indicated by 180 and 181. One of these contacts is connected to the magnet stepping the pen in one direction while the other contact is connected to step the pen in the opposite direction as has been described. The electrical circuit associated with these contacts may be connected up to spring set 689 requiring three perforations for its selections. Hence in this case when a group of three perforations pass under the feeler members the direction of rotation of the pen is changed.

Another action is the lifting and dropping of the pen, and this is controlled in a similar manner to the stop-and-start magnet and in this case a magnet is adapted to be energized to hold the pen in contact with the working surface, or to be de-energized to allow the pen to rise out of contact with the said surface. This action may be controlled by the spring set 690 which requires four perforations for its operation.

A further action is the operating of the clutch to engage a lower gear for small curves, as hereinbefore described and this action is identical with that in connection with the stop-and-start magnet and may be controlled by the spring set 691.

Another action which may be incorporated is the ringing of a bell for purposes set out hereinafter and this action does not require a step switch as only a short signal is required from the bell and, hence, the duration of the operating contact would be sufficient and may directly energize the bell.

It is seen therefore that any number of actions may be introduced, each having a separate position on the selector, and in this way any additional actions which may from time to time appear necessary may be incorporated.

A further function of the selector is to control automatically the spacing between the letters composing a word which spacing varies according to the conformation of adjacent letters. For instance, V following A would be differently spaced therefrom than would B, and furthermore some letters are well indented one with another, such as T following L, the limbs in this case overlapping, and again with E following L still further difference in spacing is necessary to cause the finished word to appear regular.

The action of the selector for controlling this variation in spacing will now be described, by way of example.

Such automatic spacing may also be used in all cases where special spacing distances have to be applied or may be applied between designs or forms which together form a composite whole.

Describing the action by considering the variable spacing in connection with alphabets and letterpress announcements, at the commencement of the record of each letter are a series of sets of perforations, each set representing a certain distance of travel of the pen. Taking a given letter as an example such as A, each set of the said perforations at the commencement of the record of letter A will represent the distance by which this letter should follow one other letter of the alphabet. That is to say, one set of the said perforations will represent the distance after the letter B, another set will represent the distance after the letter C, and still another the distance from D and so on. It is the function of the automatic spacing device to select the appropriate set of the said perforations according to the preceding letter, and for this purpose any letter, when completed, must leave its mark, as it were, on the spacing apparatus so that the next succeeding letter will be produced at a distance corresponding to that mark.

It will be clear from the previous description that these sets of perforations should be stop-and-start recordings for starting and stopping the complementary motions. Each set of these perforations will therefore comprise one start and one stop indication and if this stop-and-start action is normally controlled by the first position of the selector, that is to say by spring set 687, then each of the aforesaid sets will comprise two perforations only and the distance between these perforations will represent proportionally the distance over which the pen is controlled by that set.

Thus Figure 60 illustrates, diagrammatically, the possible appearance of a series of sets of such perforations at the commencement of a record of for instance, letter A, separate sets being indicated by the arrows, and the letters from which A is to be spaced indicate the particular arrow representing their spacing distance from the letter A, although it will be understood that these distances may follow each other in any kind of order and not necessarily in the sequence of the alphabet as shown.

Thus if A is to follow C the distance marked C would be selected; or if A is to follow D, the distance D would be selected, and so on, all those distances not selected being rendered inoperative.

It is not necessary, however, to provide a separate distance for every letter in the alphabet, as the distance by which a given letter such as A follows any other letter is governed by the shape of the right hand side of that preceding letter, and it will be clear that in an alphabet of a given style many letters have similar righthand sides, for instance, I. H. N. M. The letter A would therefore be spaced the same distance from each of these letters so that one spacing distance would suffice for them all. Other letters such as O, D, Q, or W, V and so on, may also be grouped in a similar manner. It may be seen that the letters of an alphabet of a given style may be so divided into such groups that a relatively small number of spacing distances will suffice, and each such group is hereinafter termed a class.

Considering now the automatic spacing mechanism as shown diagrammatically in Figure 61, this merely consists of a simple step-by-step switch of a similar type to that previously described in connection with the control of the other actions. Two contact wheels, 719 and 720 are connected to the same shaft so that they rotate together and are each provided with a projection indicated by 721 and 722 respectively for making electrical contact. These projections may be located in alignment and the wheels 719 and 720 are adapted to be stepped by the same magnet 723. Wipers 724 and 725 are provided to convey electric current to the said wheels.

The wheels 719 and 720 are shown in their normal position and this is indicated by 725. The first step beyond the normal position is indicated by 726; while the last two steps of the said wheels before reaching normal position after a revolution are indicated by 727 and 728. The wheels 719 and 720 are adapted to be stepped in the direction of the arrow, and are together referred to hereinafter as the space wheel.

Considering now the switch in its normal position as shown, an electrical connection is made through a wiper 729 and wheel 719, and this connection is in the circuit of the selector release magnet 680, Figure 54, so that this magnet may be normally operated when required in the manner previously described. After the first step of the space wheel, however, the contact with wiper 729 is broken and this breaks the circuit of the selector release magnet at this point so that the latter cannot be operated to return the selector to a normal position.

The manner in which a letter leaves its particular mark, as previously stated, will now be considered.

At the terminating end of the record of every letter a group of perforations is provided for the purpose of selecting the space wheel, in the same manner as the other operations are selected. The space wheel is therefore stepped round and contact with 729 is broken to prevent the selector being returned to a normal position as usual. Additional perforations are provided which continue to step round the space wheel and the number of steps so caused depends upon the particular class, as previously defined, to which the letter belongs. Hence at the completion of any letter the space wheel is left in a position which corresponds to the class of that letter, and this is its mark.

After the first step of the space wheel, the selector not being returned, it will be clear that single perforations only are now required to turn the space wheel, as the circuit from the record to the space wheel magnet 723 remains completed through the selector.

Therefore the stop-and-start perforations at the commencement of the next record, instead of having their normal effect continue only to step the space wheel.

When the space wheel has reached point 727, two steps from a normal position, the wheel 720 makes contact with a wiper 730, which completes the electrical circuit through the magnet operating the stop-and-start clutch so that this is energized and the complementary motions put in movement causing the pen to move into the position for commencing the next letter. The distance the pen moves will depend upon the position of the next perforation on the record, as shown in Figure 60, and when such perforation appears the space wheel is moved another step breaking the contact with 730 so that the stop-and-start magnet is de-energized and the pen stopped. The distance the latter has travelled is the selected distance and represents the correct spacing between the letter about to be drawn and the letter drawn. It will be clear that the particular two perforations which moved the pen in the manner described will depend upon the number of prior perforations required to turn the space wheel to the position 727, and this again depends upon the number of steps the space wheel was turned by the previous letter. Had the previous letter turned the space wheel a different number of steps, a different number of subsequent steps would have been required before it reached point 727, or contact 730, and so in this way a different pair of perforations would have caused the operation of the pen, which would have consequently moved a different distance. It will be seen, therefore, that a letter, by leaving the space wheel in a position which differs according to the style of the right hand side of that letter, may cause to be selected a suitable spacing distance between it and the next succeeding letter.

It will be observed, however, that there may be still other perforations of spacing distances on the record, to be traversed after the selected pair have operated, and these must be rendered inoperative. After the step which broke the circuit at 730 to the stop-and-start magnet the space wheel is still one step from normal i. e. at a point 728. At this position the wheel 719 re-establishes the circuit through the wiper 729, which has a double tongue corresponding to both positions 725 and 728 and which, as described, is connected to the selector release magnet 680, Figure 54. At this position of the space wheel, therefore, the selector returns to a normal position, so that the remaining spacing or stop-and-start signals on the record, if any, instead of stepping the space wheel as before can now normally operate the selector for selecting and operating the stop-and start switch. Connection to this switch, however, is only made through the space wheel 720 and contacts 731 and the latter is located to engage the space wheel in its normal position which position has not yet been re-assumed. Hence, the remaining spacing signals fail to function and are by this means rendered inoperative, but after all the spacing perforations have passed, a group of perforations for again selecting the space wheel now appear on the record and these turn the said wheel one more step, bringing it to a normal position. In the normal position of the space wheel, connection to the selector release magnet is maintained by means of the other tongue on the contact 729, and contact to the stop-and-start switch is re-established through wheel 720 and the contact 731, so that this stop-and-start switch may again operate normally when required and all is again at normal. The record of the letter proper now appears and the production of this letter proceeded with at the correct distance from the preceding letter.

An example will be considered in which it is assumed the space wheel has twenty teeth, requiring twenty steps to complete one revolution thereof and it will also be assumed that the letter D has been drawn and upon its completion the record thereof, turns the space wheel through thirteen steps. Therefore in all cases after the letter D has been drawn the space wheel will always be turned through thirteen steps and left in that position, and this position of the space wheel will be peculiar to the letter D or to other letters in the same class, that is to say, letters considered as having a similar right hand side. Hence such a position of the space wheel will correspond to a letter with a curved right hand side and that letter only. If the next letter to be drawn is letter A, one of the spacing distances at the commencement of that letter will be that for placing it at a suitable distance from the letter D, as indicated in Figure 60. Referring to this figure, and taking into consideration the previous explanation, the first four perforations, represented by B and C will turn the space wheel four more steps, and as this wheel has already been turned through thirteen steps, it will assume its seventeenth position. Position eighteen i. e. two from normal, corresponds to position 727 in Figure 61, at which position contact is made between the wheel 720 and the stop-and-start magnet. The fifth perforation on the letter A record (Figure 60) is the first of those marked D and this is the perforation therefore that will turn the space wheel to its eighteenth position, and make contact with the stop-and-start magnet to set the pen in motion. The sixth perforation, or the last of those marked D, will again turn the space wheel one step and this will break the contact 730 so as to stop the pen again.

The distance between the two perforations marked D represents the distance that letter A should be spaced from letter D.

Had the previous letter been E instead of D, this would have turned the space wheel only eleven steps, and thus two more perforations on the record A, making seven perforations of this record in all, would have had to be used before the space wheel reached the contact 730, the seventh perforation being the first of the E pair, so that in this case it would have been the E pair of perforations which moved the pen, and this would have given a distance suitable for spacing A from E. The same principle is employed for all other letters.

Reverting to the previous example, after the D pair of perforations have moved the pen the space wheel will be left with the projections in the position 728, but at this position the selector is returned to a normal position so that the remaining perforations E, F, and so on do not turn the space wheel but normally operate the selector, which operation however, is rendered ineffective owing to the contact 731 (Figure 61) still being broken, as described. The remaining spacing perforations, therefore, have no effect and after their cessation the space wheel is again selected and turned one step so as to reassume its position.

As in this case the letter D always turns the space wheel through thirteen steps it will be seen that the spacing distance for spacing any letter from letter D will always occupy the same relative position on every record to that shown in Figure 60, but this distance, however, will not be the same on the various records. For instance, if Figure 60 represented the commencement of the record of letter E the distance marked D, would be different from that shown, although it would be in the same relative position, as the letter E requires to be spaced differently from the letter D than does the letter A.

In this way the record of each letter may have the individual spacing distance it requires from every other letter and so the inter-letter spacing in letterpress announcements may be produced automatically to practically the same degree of accuracy as may be effected in hand work, the spacing distances being worked out beforehand and before recording by appearance only, exactly as in hand work.

It will be understod that the examples described and illustrated are given by way of example only and do not necessarily represent actual cases, for instance, the distances shown in Figure 60 may be incorrect for spacing the letters indicated, and the space wheel may have a different number of teeth.

According to the system of spacing above described, as the selector is locked in one position, it cannot be utilized during spacing for selecting and putting into operation any other motions of the machine, such as lifting and dropping the pen.

For some styles of lettering, however, such as that known as script writing, it becomes necessary not only to select a distance of travel, in a straight line for the pen in order to dispose it in the required position for commencing the next letter, but to actually draw a selected shape for suitably joining up consecutive forms.

For instance, in Figure 62, the letter o is shown following letters l and o in a style of writing wherein the letters have to be suitably spaced and joined, differences in the shape of the portion of line used to join these consecutive letters being shown at the points 732—733 and 734—735 and these lines are extracted and shown below for clearness. Hence if o follows l then shape 732—733 must be automatically selected but if o follows o then shape 734—735 must be selected. These shapes require not only operation of the direction control unit but the selector must be free to select the pen switch, to lower and raise the pen to stop and start the complementary motions and any other actions which may be called for to produce the necessary shape for joining purposes.

A spacing mechanism for allowing such actions will now be described. Suitable shapes are now recorded at the commencement of each record, in place of merely recording spacing distances, and the required shape is selected in very much the same manner as was a spacing distance, by arranging that a completed letter shall leave its mark by stepping a suitable mechanism a certain number of steps. The spacing mechanism in this case differs from that previously described only inasmuch as to leave the selector free to operate instead of being locked, the remainder of the mechanism being in principle the same.

In this case the spacing wheel, which always rotates in the same direction, is supplanted by a device or wheel adapted to operate in a similar manner to the selector that is to say, it is stepped against the action of a spring and is allowed to re-assume its normal position by the operation of a release magnet.

Referring to Figure 63, 736 is a wheel, similar to the switch wheels previously described, which wheel is stepped by a magnet 737 against the action of a spring 738, and at the required time a release magnet 739 is energized attracting a pawl 740 and so allowing the spring 738 to return the wheel 736 to a normal position. The wheel 736 has two projections 741 and 742 adapted to make contact with a wiper 743 and in this way establish an electrical circuit through wiper 744, wheel 736, contact 741 or 742, and the wiper 743, and in the normal position of the wheel, the projection 741 makes contact with wiper 743. The wheel 736 can be rotated until projection 742 re-establishes contact with wiper 743, but the said wheel can be rotated one step beyond this position so as to break the contact with wiper 743 before meeting a stop, and in this way any subsequent impulses to magnet 737 have no effect. This spacing apparatus is controlled by two positions on the selector, one of which selects the magnet 737 for stepping the wheel 736, and the other position selects magnet 739 for releasing the said wheel. The wiper 743 is in the electrical circuit for supplying electric current to the various pieces of apparatus utilized for drawing the joining-up portions as shown in Figure 62, so that unless either one or the other of the projections 741 or 742 is in contact with the wiper 743 the said portions cannot be drawn.

Considering now the action of this spacing means, at the end of the record of each letter are groups of perforations for moving the selector to select the magnet 737 for stepping the wheel 736, but in this case the circuit to the selector release magnet will not be broken, so that after each group of perforations have selected the apparatus shown in Figure 63 and stepped the wheel 736 one step, the selector will return to normal. Each step of the wheel 736 therefore, requires a group of a perforation instead of a single perforation as with the space wheel previously described, and the selector returns to normal each time.

At the end of the production of any letter the wheel 736 is caused to be turned through a number of steps and left in a position according to the form or class of the letter produced in the manner previously described, and from the first step of the said wheel the contact at 743 is broken.

Recorded at the commencement of the record of each letter are the various spacing shapes, previously referred to, but these would normally have have no effect owing to the contact at 743 being broken. At the end of the recording of each of the said shapes, however, perforations are introduced which select the magnet 737 and step the wheel 736 one step, and this occurs after each particular shape until the projection 742 is brought into contact with 743. This eventually re-establishes the electrical circuit so that the recording of the next consecutive shape acts normally on the machine and is in this way produced. At the end of its production the usual selection of magnet 737 is made and the wheel 736 turned through another step and thereby breaking the contact 743 again so that any subsequent recordings can have no effect except to continue to endeavor to rotate the wheel 736, but such rotation cannot be effected as the wheel 736 has reached its limit of travel and abuts against a suitable stop.

Following the final recording of the various shapes is a group of perforations for selecting the release magnet 739 which releases the wheel 736 and upon its return to a normal position, contact is re-established at 743, the cooperating elements of the machine are now in a normal position ready for the production of the letter proper.

Either of the aforesaid spacing methods may equally well be utilized and both may be incorporated in the same machine and used either separately or together as may be desired, or according to circumstances.

It should be mentioned that the pen is always left by the record in a suitable position over a completed letter from which to commence its travel towards the starting point of the next letter, and negative movement is therefore not required.

Considering the spacing of ordinary styles of lettering, as in the first method described, while this gives correct relative spacing it is of a fixed quantity varying only in proportion to the size of the letters but it may happen that in order to spread out the letters to fill a given space or for other such reasons, a larger amount of space than that provided for is required between consecutive letters.

For this purpose means are provided whereby a given additional amount of space may be added to that normally provided, the same amount being added between each letter, although the actual amount may be varied.

It will also be found necessary in cases where several words ocupy the same base line, to ensure that these words are equally spaced, visually, from one another.

Means whereby this additional action may be rendered automatic, subsequent to a predetermined setting of the machine, will now be described with reference to the drawings, which show by way of example, one method of construction for such an automatic action.

Referring to Figure 18, 746 is a bevel wheel in mesh with and driven by the bevel pinions 747 and 748. These pinions are arranged to turn in opposite directions and according to which is operating so the wheel 746 turns but always in the same direction. The wheel 746 is attached to and drives a shaft supported by a housing 747a, and the pinions 747 and 748 are turned by the complementary motions, that is to say one wheel pinion is turned by one motion whereas the other pinion is turned by the other motion, so that the apparatus being described may be operated when either of the motions is in action.

For instance, if the work, such as a line of lettering is being produced on a base line in the direction M—N (Figures 1 and 2), one complementary motion only will operate during spacing, and in this case the motion positively driving the bridge, but if the work is being produced on a base line in the direction Y—W then the other motion, in this case the drive of the carriage, only will operate during spacing. It is essential that the mechanism about to be described will operate in whatever direction M—N or Y—W the base line of the lettering is positioned, hence the reason for the pinions 747 and 748. These pinions are turned by friction with wheels 749 and 750 respectively, the friction drives being generally indicated by 751 and 752.

These friction devices may be of any suitable form and in the present construction have the form of discs gripping the wheels 749 and 750 by means of the springs shown in the drawings. In this way, although the wheel 746 may be prevented from rotating, which is its normal condition, the wheels 749 and 750 may continue to revolve. The bevel pinions 747 and 748 are not driven directly from the friction drives but through the medium of pawls 753 and 754 attached to the aforesaid discs and adapted to drive ratchet wheels 755 and 756, the latter being rigidly attached to the bevel pinions 747 and 748. This is shown more clearly in Figure 22.

Thus if the wheel 750 is rotating, the wheel 749 stationary, and wheel 746 is freed, then the pawl 754 gripped to the wheel 750 by the friction discs turns the bevel pinion 748 through the ratchet wheel 756 attached thereto. The wheel 747, being in the gear train, is also rotated, but the ratchet wheel 755 attached thereto merely clicks idly under the pawl 753 so that rotational force is not conveyed to the wheel 749. Were it not for the ratchet wheels and pawls the pinion 747 would tend to turn the friction drive 751, and as the pinion 748 is only turned by friction, the frictional force would balance and the wheel 746 would not rotate even if released. The reverse action is similar when the wheel 749 is operating.

Referring now to Figures 64 and 65 which are detail views of the device generally denoted by 757, Figure 18, the shaft 758 is the shaft driven by the bevel wheel 746 (Figure 18) and this shaft carries a disc 759 upon which are fixed cam members 760, 761 and 762. Another cam member 763 is carried by a ring 764 which latter is carried by and may be turned about a dial 765. The dial 765 and ring 764 are mounted on the shaft 758 above the disc 759 and the said ring may be turned by hand independently of the dial so that its reading edge may be set to any figure on the dial and fixed in that position by a milled screw 766. The cam member 763 being fixed to the ring, the relative positions of cam members 763 and 760 is changed whenever the ring is differently set. These cam members 763 and 760 operate a contact spring 767 coupled in circuit with the stop-and-start apparatus so that by operating the spring 767 the pen may be set in motion or stopped. Cam member 760 will send out one impulse starting the carriage or pen in motion while cam member 763 will send out another impulse to stop the said motion. In this way, by adjusting the relative positions of the two aforesaid cam members the pen can be made to travel any suitable distance. This distance is indicated on the dial 765, so that by setting the ring 764 for a given distance by the indications on the dial 765 the pen will travel that distance when the bevel wheel 746 and the disc 759 are allowed to rotate. It is preferable for the additional spacing device to be coupled in the general gear train of the machine at a point affected by all of the various change gears so that the pen always travels the distance read on the dial irrespective of the setting of the change gears.

The disc 759 is freed for rotation by sending an impulse to magnet 768 adapted to attract its armature so as to release a catch 769, attached thereto, from engagement with the cam member 761.

Such an impulse is sent out by the projection 721 on the space-wheel 719 (Figure 61) wiping the contact 770 located in the position corresponding to the first step of the said spacewheel.

Assuming now that some extra spacing is required between a group of letters and that the amount of this extra space has been determined and registered on dial 765 by adjusting the ring 764 so as to set the cam members 760 and 763 in their correct relative positions, the action of the spacing device is as follows:

Upon the completion of each of the letters, when the space-wheel is being set in the manner previously described, the projection 721 (Figure 61) passes the contact 770 thus sending an impulse to release magnet 768 (Figure 64) and setting disc 759 in motion. This disc carries round the cam members 760 and 762 which in turn move the spring 767 and thereby send out impulses to the stop-and-start magnet as described, so as to cause the pen to move the distance registered on the dial 765. This operation is carried out simultaneously with the setting of the space-wheel and is completed before the next consecutive letter is commenced.

At the commencement of the next letter the spacing as determined by the record, and as previously described, is carried out and so the two increments of pen movement are added together and the operation is repeated for every letter produced.

The disc 759 termed the additional-spacewheel cannot complete more than one revolution as the impulse to the magnet 768 is more or less fleeting, occurring while the space-wheel proper is moving, as described, so that the catch 769 is released and runs on the periphery of the disc until re-engaged by the notch in which it normally rests, as shown, so that in this way further rotation of the disc is prevented, and the additional spacing is rendered purely automatic.

Switches 771 and 772 are provided for manually controlling the additional space mechanism. The additional-space-wheel is arranged to be released always after the production of each letter, whether or not additional spacing is required, for reasons to be set out hereinafter, but if no additional spacing movement is required, then the switch 771 is caused to break the electrical circuit to the spring 767 so that the stop-and-start mechanism does not operate. 772 is a press switch by means of which an impulse may be sent to magnet 768 and the additional-space-wheel released, by hand, at any such time as may be required for instance between two words. By setting the dial for the distance required between the several words composing a line, the mechanism above described may be set into operation at the end of each word by pressing the key 772, to give the same distance between each word, so that the line of words will appear balanced. These switches are shown in general position at N' (Figure 3).

It should be noted, however, that the rules for spacing apply between the final and first letters of adjacent words, for obtaining visual balance, as in all other cases, so that the spacing between words, obtained as above, is added to the spacing normally provided between those two adjacent letters.

The spacing between words, therefore, is similar to the spacing between closer letters, and merely entails the utilization of the additional space mechanism as in the case where additional spacing is required between any two letters. Hence, the spacing between the different words retains visual equality, as in hand work.

Referring again to Figure 9, 773 is a clutch, which may have teeth as shown, operated by magnet 774 normally held energized so that the clutch 773 is held over to the left in engagement with the main driving pulley 100, which pulley is connected to the prime mover by belt 101. This clutch 773 transmits motion to the whole of the mechanism, including the record frames and if the magnet 774 is de-energized, the clutch 773 is pulled back by the action of a spring 775 so that the teeth of the said clutch engage with teeth connected to the framework of the machine and the whole mechanism is instantaneously stopped. Friction devices 776 and 777 may be incorporated in the body of the clutch 773 to reduce shock.

The principal object of this clutch is to instantaneously stop the mechanism in the event of the electric current supply failing, in which case the magnet 774 is de-energized. It is clear that without some such provision, should the current fail, the magnets controlling the various parts of the machine would become de-energized, and the travel of the records would continue under the momentum of the prime mover so that the whole machine would require re-adjustment before continuing the work. The magnet 774 is arranged to operate only when the current has reached its maximum value, so that the slightest drop in the value thereof causes the said magnet to be de-energized and it is therefore the first to be put out of action and the last to operate if the electrical circuit is broken and re-made. In this way the whole mechanism is stopped before any of the individual controlling magnets are released and the latter are again energized before the mechanism is started and at any breakdown of the current, therefore, the machine is automatically stopped and re-started without supervision, and the work is continued unspoiled.

Reverting now to Figures 64 and 65, the cam piece 762, by engaging a spring-set 778 is also arranged to control the main clutch above referred to. The main clutch magnet 774 (Figures 9 and 10) is directly operated by a step by step switch wheel of the type shown in Figure 12, and this switch is adapted to make or break the circuit to the said magnet in order that the main clutch may also be operated by hand by depressing one of the keys N (Figure 3). The cam member 762, Figure 64, by operating the spring-set 778, can also step this control switch, so that the latter breaks the circuit to the main clutch magnet and stops the machine and this action occurs once at the completion of each revolution of the additional space wheel 759. Hence should it happen that the machine is unattended at the completion of a piece of work, such as a letter, the disc 759 is released by the space wheel as previously described, and at the completion of its revolution, so as to leave ample time for the setting of the space wheel to take place, the spring-set 778 is moved, the main clutch magnet released and the whole machine stopped until the operator sets it in action again. In this way, tearing of the record band through over-running and the subsequent dropping of the feelers, making false contacts, and putting the machine generally out of adjustment, is avoided in the absence of the operator.

In the event of a rapid change over from one record frame to the other as previously described, by moving the change over lever 644, Figure 51, and thereby moving the change over switch Figure 53, from one set of contacts to another, releases a small relay which prevents the machine being stopped in the above manner, so that should the next letter be proceeded with before the additional space wheel has completed its revolution, the latter will not in that case operate the main clutch, and in this way the possibility of the machine stopping after the next letter has been commenced is obviated. By these means nearly all contingencies are provided for.

It should be noted that all the actions on the machine such as turning the pen, lifting and dropping the pen, turning the direction control unit and so on, besides being automatically controlled are also adapted to be manually controlled by means of the keys N, Figure 3. It has also been previously stated that the record may control the ringing of a bell at various times, and the object of such a bell will now be described.

Some styles of lettering or designs are capable of being subjected to various minor modifications, for instance, the serifs on the portion of a letter, as shown in Figure 64a, may be very easily produced in the form shown in Figure 65a with the assistance of a simple hand manipulation and in such a way that the action of the machine is still semi-automatic and therefore foolproof. The style of lettering illustrated in Figure 65a could of course be separately recorded but the manipulation about to be described allows a record of the style of lettering shown in Figure 64a to suffice for the production of both of the aforesaid styles.

Before commencing the work, assuming the style shown in Figure 65a is required, the additional space wheel is set so that when it operates it moves the pen, as previously described, over a distance equivalent to the lengths indicated by 779.

Considering now the record for the style as shown in Figure 64a, when the point 780 is reached, the pen is facing in the direction indicated by 781, and the direction control unit must now, and while the complementary motions are stationary, be rotated to set the direction of the pen to that indicated by 782 for traversing the pen along the top line. Normally such a manipulation would be effected by an unbroken series of perforations, but in this instance, when the direction control unit has been turned as far as the direction indicated by 783, a gap occurs in the series of perforations referred to, and the series would not recommence until a certain amount of the record had passed.

This non-perforated portion of the record, dividing the series of perforations, can be arranged to select and ring the bell above referred to in order to warn the operator, who then presses the key for setting the additional space mechanism in action. This would cause the pen to travel in the direction 783 for a distance equal to 779 and the gap in the series would be of sufficient length to allow a suitable period for this to be effected, and thus the line 779 would be drawn.

The completion of the said series of perforations now appears and sets the direction to 782 and allows the machine to proceed normally.

Such a manipulation is repeated for every serif so as to accurately alter them to the same degree. The bell and keys may be utilized for changing the form of the work in various other ways than that illustrated.

It will be clear, that by connecting the additional space mechanism, instead of the bell, to the selector, so that it is automatically set in motion instead of the bell being rung, the whole action may then be rendered entirely automatic so that no assistance is required from the operator except to set a switch prior to the commencement of work. This switch would make or break the electrical circuit coupling the additional space wheel release magnet to the selector, so that, before commencing the work, the operator having decided which type of serif is required, places this switch either in the on or off position so that the additional space wheel is or is not operated according to the type of serif required.

Either type of serif could then be automatically produced from the same record.

This, however, would confine these variations to the use of the additional space mechanism only, but by incorporating the bell so that it is rung at appropriate times the operator may operate any other or several other actions for producing variations. In another development these may also be rendered automatic by increasing the range of the selector or by the prior operation of a hand selector switch which may connect up any action to the selector for automatic operation.

Another of the said keys is arranged to re-set the selector and the space wheel in a normal position.

Before commencing a piece of work it is desirable to ensure that the selector is not left at a position other than normal, as may happen if the space wheel has been set but automatic spacing is not required, when, for instance, moving down from a completed line of lettering to begin the next, in which case both the space wheel and the selector are out of a normal position. By depressing the key referred to, the space wheel is stepped so that it reassumes a normal position and the selector is released, the aforementioned bell ringing to indicate that such reinstatements have been effected, the circuit to the bell being completed via the normal position of the selector through spring-set 686 Figure 55 as shown in that figure. Thus before commencing work the key referred to is held depressed until the bell rings to indicate that the work may be started.

By so connecting the wiring the said key may be caused to set every piece of apparatus in a normal position upon its depression, if so desired.

It is not necessary for the record and controlling apparatus herein described to be limited to the control of one machine only, and any number of similar machines may be brought simultaneously under the control of the one record by connecting the electrical controlling wires thereto and by suitable shafts. These secondary machines to be termed hereinafter secondary frames need consist principally of the rails D (Figures 1 and 2) the bridge B, the carriage O and the operating instrument Z.

The addition of one or two such secondary frames to a master machine may considerably increase the rate and variety of output of the latter, by allowing the production of several examples of the same piece of work to be proceeded with simultaneously and by providing each of the secondary frames with a set of change speed gears for changing the proportion of its work, the variety is still further increased.

For example, assuming one master and two secondary machines are producing a letterpress announcement, such as a poster, the three machines may be set to simultaneously draw three posters of exactly the same type or by providing a different type of pen in each machine the posters may be produced simultaneously with different outlines. Such an arrangement of machines has an important application in the production of colored posters, where two or three outlines of different kinds but to the same proportion, are required for arranging two or three color printings in the well known manner. Usually, as produced by hand, these have to be executed separately and one outline has to be printed before the next is commenced and so on. The secondary frames, by reason of their positive action and mechanical accuracy enable the whole of these outlines to be produced at the same time.

Or again, it frequently happens that a poster with a given announcement is required to be produced in different proportions to enable it to fit different sized hoardings. By so adjusting the change speed gears on the several connected machines a set of such posters to quite different proportions, and if necessary different outlines, by using different pens, may be produced simultaneously.

Posters with similar announcements may also be produced simultaneously in different styles by causing the letters in one style to be produced in an upright position, while those in another style are produced with a slope, or again, in one of the styles the letters may be arranged on a sloping base line. The aforesaid variations may be obtained by the means previously referred to, and by combining and making use of all the variations offered by different pens, proportions, slopes, spacing and so on, several copies of the same announcement having various effects may be produced simultaneously.

It also sometimes happens that a design, with its forms and letters drawn facing in the usual way, after having been approved for printing, is required to be re-drawn in a reversed position, and perhaps, on a printing stone, for the purposes of printing.

At the time of producing a design for approval, the reversed copy may be also produced simultaneously on a suitable printing surface, so that upon approval the work may be printed off at once without delay. Such examples elucidate some of the useful features of secondary frames controlled from a master machine, and it will be understood that work for printing purposes may be produced upon any of the well known printing surfaces, such as lithographic stone, zinc plates, transfer paper and so on.

As an example of one method of connecting secondary frames to a master machine, reference is made to Figures 6, 7, 47 and 48.

In Figure 6, 218 are the wheels driving the master machine from the middle wheel 82 of the differential epicyclic drive as previously described, while 784 are wheels similarly driven which transmit this motion to the secondary frames through shafts 785. These shafts 785 are carried through and terminate at one end of the machine in the bevel gears 786 and 787, Figures 47 and 48, and the motion is transmitted along the side of the machine to the secondary frames by shafts 788.

Other methods of coupling the various frames may be used, for example, each of the secondary frames may have its own epicyclic drive and direction control unit, in which case wires only are required for coupling up purposes and the secondary frames may be disposed anywhere relative to the master machine, even in a different building.

The nature of the electrical controlling signals also enables these to be transmitted over any distance by wire or wireless telegraphy.

Instead of the machine being controlled by a band it may be similarly controlled by records consisting of rotating wheels bearing predetermined projections operating with spring-sets so as to send out impulses according to the arrangement of the said projections and the speed of the wheels. Such wheels may be termed pattern wheels and may be used instead of record bands for producing regular or geometrical designs, such as borders and the like. These wheels may be numerous and interchangeable and may be rotated at different speeds in relation to each other by suitable gearing and the arrangement of their projections may vary in any way required. By these variations the sequence of the impulses sent out and consequently the sequence of the operations carried out may be varied and changed to any degree, each change producing a different design, and any particular setting of the machine during the production of a design being noted for subsequent reproductions of that design.

The apparatus supporting such pattern wheels may be incorporated as an integral part of the machine or may be quite separate therefrom and coupled thereto when required, by plugging the electric leads of the apparatus into a jack provided for that purpose on the machine, and driving the apparatus in any suitable way, so as to rotate it at a regular rate irrespective of the rate that the machine itself is being driven, although a suitable proportion may be arranged between these drives. It will be understood, however, that all the designs so produced may also be produced by using record band and operating the machine in the manner previously described, the apparatus referred to, however, is utilized in some cases owing to its simplicity.

Other pieces of apparatus may be designed and incorporated in, or connected to, the machine from time to time for still further varying its work and productivity, for example, different types of instrument carriages may be used, carrying, for instance, more than one pen, or carrying different instruments. Or if desired, two or more carriages may operate at the same time on the same bridge and so on, the peculiar flexibility and method of control of the machine allowing such variation and addition to its mechanism, each such change increasing the scope and variety of its work.

The machine also, with suitable modifications to the mechanism but retaining the same controlling principle, may be adapted to produce types of work other than that given by way of example herein. For instance, a rotary cutting tool may be employed in the place of the pen, to produce carved or engraved work, or an engraver of a similar type as that used in hand work, may be applied to produce the type of engraving at present effected by hand, the flexible control of the machine allowing for the necessary manipulations. Or again patterns for fancy embroidery work may be carried out, and the principle of the machine may be used in all cases where the guiding of an instrument is called for.

The machine, according to another development, may cause an instrument to be traversed in three directions at right or other convenient angles to each other so that it may be controlled to move over a solid object instead of being confined to a plane surface. For instance, an independent set of cams, operated and controlled by an independent line of perforations in the record, may be caused to control another variable gear device which traverses the instrument in the third direction.

Or again, in the machine as used for operating over a plane surface, the two variable gear devices, as hereinbefore described as being controlled by a single line of perforations, may each be controlled by a separate line of perforations, so that each motion may be controlled quite independently. By this means the number of angles of travel of the instrument is extensively increased without any increase in the number of epicyclic groups, as the speed of each motion is controlled quite separately from that of the other, and any combination of speeds may be employed instead of having a certain number of fixed combinations. By this means also the number of sides or steps used to form a curve may be varied by the record itself, instead of by the set of cams used, as described, so that any curve may have the number of sides needed and no more, and in this way all curves may be very rapidly produced without requiring the slowing down of the motion of the instrument. The number of cams and epicyclic groups could therefore be reduced to a very low minimum on account of their producing a greater number of angles than formerly and so allowing corners in the designs being produced to be more rapidly negotiated.

In extending this principle to the three dimensions referred to, each of the movements in the three dimensions over a solid object may be controlled by a separate line of perforations. The machine may also be constructed so that the movements given out are imparted to the working surface or to the work being performed while the instrument remains stationary. Or likewise the work may partake of one complementary movement while the instrument is actuated by the other complementary movement. With some types of work these methods may be more convenient.

The apparatus for rapidly determining the setting of the machine and also for selecting the record required to produce the work to the desired scale or proportions will now be described.

One constructional form of this apparatus comprises a pivotally mounted suitably marked disc or cylinder, which markings are capable of being read off against a fixed reading edge, and a moving pointer or index whereby the disc or cylinder is rotated.

Referring now to Figure 66, 788 is a manually operated slide, adapted to be reciprocated on a supporting rail 789a carried by brackets 790 and 790a. Upon the slide 788 grips 791 are provided by means of which a chain or band 792, carried beneath the rail 789 may be gripped and moved. The slide 788 also carries a pointer 789 and the chain 792 traverses sprocket wheels supported in the brackets 790 and 790a, the sprocket wheel supported by the latter being attached to a shaft 793. The shaft 793 is also supported in a bearing 794 and carries a worm 795 meshing with a toothed worm wheel 796. Attached to the worm wheel 796 is a cylinder 797, but if desired a disc may be substituted for this cylinder.

It is seen then that by moving the slide 788 and at the same time gripping the chain or band 792 by means of the grips 791 the cylinder 797 is caused to rotate and its amount of rotation is directly dependent upon the distance traversed by the slide 788. Thus, by suitably marking the cylinder the distance moved by the slide may be read off either absolutely or in one or more proportions.

It should be noted, however, that if the chain 792 is not gripped, then the slide may be moved without turning the cylinder, and hence, if the said chain is only gripped during the movement of the slide in the direction of the arrow and released during the movement thereof in the opposite direction, then the cylinder is only rotated by such forward movements, and these forward movements become totalled on the cylinder. For any number and length of such movements therefore the total may be at once read off on the cylinder and if the chain 792 is gripped for a backward movement of the slide 788 the amount of that movement becomes subtracted from the said total.

For convenience in reading, a reading edge, such as that shown at 798 may be used and the member provided with this edge may be conveniently pivoted upon a vertical shaft 799, carried by a foot 800 and is maintained in frictional contact with the cylinder by means of a spring 801.

A knurled screw plate 802 is attached to the top of the cylinder 797 for the purpose of rotating the latter back to zero and this is effected by first lifting the cylinder until the worm wheel 796 is disengaged from the worm 795. To facilitate such a disengagement the worm wheel 796 is made with straight teeth.

The cylinder 797 is scribed or marked with circles on its peripheral surface, as indicated in the drawings, one circle being used for each of the previously described gear changes in the reproducing machine. These circles are marked off to read lengths in the usual way of scales, but corresponding positions of the circles as read against the reading edge are arranged to read lengths bearing the same proportions to each other as the relative proportions of the gears represented thereby. The change gears in the reproducing machine are conveniently numbered in a regular series, such as, for example, 1 to 12, or according to the number of such gears used, and thus if gear number 12 bears the proportion of ½ to 1 to gear number 1, then the gear circle on the aforesaid cylinder representing the gear number 12 will at all points read only half the amount of corresponding points of the gear circle representing the gear 1.

A developed view of such markings is shown, by way of example, in Figure 67, wherein the numbers of the various gears are indicated on the left. Referring now to this figure, it will be seen that the lower gear and intermediate gears all read in the proportions they bear to gear No. 1. For instance, gear No. 3 bears the proportion of seven-eighths to gear No. 1, and hence, its circle reads seventh-eighths in the position corresponding to where gear circle Number 1 reads one.

Referring back to Figure 66, 803 is a table capable of being moved under the pointer 789, in a direction at right angles to the direction of movement of the latter, and this table may be moved in any convenient way, for instance, by means of a knob 804 adapted to slide the table on rails 805 supported by brackets 806 provided at both ends of each rail.

The table 803 is adapted to carry cards marked in a manner to be described, and clamped on the table by means of clips 807.

Assume now that a perforated record, having the effect of causing the machine to produce a simple horizontal straight line is being utilized, and assume also that the cylinder (Figure 66) is graduated as shown in Figure 67, the column showing the gear numbers being contained on the aforesaid reading edge. A card is now prepared on which is marked a straight line of a length which represents directly, or by proportion, according to the ratio of the worm drive 795—796 (Figure 66) and other factors, the length of the line which will be produced by the machine from the aforesaid record when one given gear is engaged, preferably say gear No. 1. That is to say, if the machine is caused to be actuated by the said record, gear No. 1 being used, a straight line of a certain length will be produced, and the line on the card represents this length for that gear. If the card is now placed on the table 803 with the line in the direction of movement of the slide 788, and the latter while gripping the chain 792 is moved forward over the whole length of the line, so as to rotate the cylinder, the cylinder will read the actual length of the line produced by the machine, opposite the circle of gear No. 1.

Thus, if the aforesaid record and the gear number 1 caused the machine to draw a line 5 inches long, the reading edge associated with the cylinder will indicate 5 inches on gear line No. 1, and the position of the other gear lines in relation to the reading edge will indicate the length of line produced from that record when any of the gears are used. For example, referring to Figure 67, a line four and three-eighths inches long would be produced if gear No. 3 was used, and again a line three and three-quarters inches long would be produced if gear No. 6 was used, and so on.

Conversely, which will be the more general case, assume that the line was required to be drawn a given length in order to be contained in a given space, and it was required to find the necessary gear for such a production. If, as an example, the line is required to be three and one-eighth inches long, then the slide 788 and the pointer 789 will be moved over the line on the card as before explained and will, of course, revolve the cylinder to 5 inches on gear No. 1. A glance down the reading edge against the other gear circles will show which gear will produce the line to three and one-eighth, and it will be seen from Figure 67 that gear No. 9 will do this. Hence, gear No. 9 will be engaged before commencing work.

Figure 68 illustrates a portion of a card as it may appear for use in the case of records of alphabets. The lines below the letters down to the thickened cross line represent, as above described, the width those letters would be produced by a given and known gear, for example gear No. 1. Each card may contain a whole alphabet or the whole of the forms recorded upon one record. By adding together these widths the total lateral room that will be occupied by any word or any group of letters, as drawn with gear number one, can be readily determined, and it is a function of the apparatus shown in Figure 66 to effect the addition of these amounts. If the card shown in Figure 68 is mounted upon the table 803, and the pointer 789 is moved over the lines corresponding to the letters of any given word, the table being moved to bring each line in turn under the pointer and the chain 792 being gripped while the pointer is moving over the lines, as described, then the total width of any word as it will be produced by any gear may be rapidly read off the cylinder. Hence, the gear adapted to produce that word in any required space is quickly located and the machine may be set accordingly.

The small cross lines indicated in Figures 68, are for the purpose of adding the spacing distances between the letters. In this way, the total width of a word, such as cage, for example, consists of the total of the widths of the letters plus the spacing distances between them, and as this spacing varies considerably in the manner previously described, the aforesaid cross lines are for indicating the amount of spacing which the machine will automatically render.

In describing the automatic spacing it was stated that letters with similar right hand sides could be conveniently grouped together and these groups may be numbered in any suitable and convenient way, the numerals superposed above the letters in Figure 68 indicating the number of the group to which that particular letter belongs. The small numbers against the cross lines previously referred to are the same group numbers arranged against the spacing distance appropriate to that or those groups.

As an example, in considering the totalling of the width of the word cage, the pointer 789 gripping the chain 792 is first moved over the line under the letter C, from its top extremity to the thickened cross line, and so turning the cylinder 797 so as to indicate the width of said letter. The next letter in the word is A and the space between A and C has now to be added. The numeral arranged above A indicates that this letter is classified in group or class 5. Before moving the pointer from the line of the letter C and while still gripping the chain, the said pointer is moved to the cross line marked 5 and this will give the correct spacing distance between the letters C and A. It will be observed, however, that a backward movement of the pointer 789 is required in this case to move from the thickened cross line to space line marked 5, and the distance of this movement will be deducted from the amount already given, and thereby indicates that the letter A is indented to a certain extent under the letter C, such an indentation being correct for those two letters; i.e. the lower left hand leg of the letter A should recede under the letter C as shown in Figure 69 and in this way the correct spacing distance between the letters C and A is accounted for. The table 803 Figure 66 is now moved to bring the line of letter A under the pointer 789 which is now returned along the rail 805 to the commencement of the line of letter A without gripping the chain 792 and the cylinder 797 thus remains stationary. When the pointer 789 is positioned adjacent to the commencement of the line of letter A, the chain is gripped and the pointer is moved over this line until the thickened cross line is reached so as to add the width of the letter A to that indicated on the cylinder. The next letter is G and this is seen to be classified in group 3. The pointer is therefore continued along the line of letter A still gripping the chain, as far as the cross line marked 3 which is shown as suitable for group 4 letters also, and this adds the spacing distance between the letters A and G to the total. The letters G and E are proceeded with in the same way and the figures now recorded on the cylinder are the total widths, including the spacing, in which the word cage will be drawn by the various gears, so that the suitable gear may be selected.

Various modifications of this calculating apparatus are possible, for example, the rotation of the cylinder may wind a spring so that when a suitable release is pressed subsequently to the completion of an addition the cylinder may be automatically and rapidly returned to a normal or zero position under the action of this spring. The cards may also be slotted instead of being merely marked with a line and may be made of metal, the slot giving positive limitations to the movement of a pointer inserted therein.

Figure 70 illustrates a manner in which the markings may be developed in a machine utilizing more than one record and more than one set of steps to cover the full range of sizes of the designs to be produced.

Referring now to Figure 70, it will be assumed that a finely graduated cone is used, consisting of 12 gears, which ultimately reduced to one-half size, and that a fixed gear change of one-half is to be used in conjunction with the gear cone, for the purpose of reduction to one-quarter. The next stage of reduction is in this case obtained by using these gears over again in conjunction with another record having a different number of steps recorded to produce a circle, and still further stages of reduction may be obtained by utilizing various records of such a character.

Such a combination of gears and records would cover a very large range of sizes and upon totalling a line of lettering by means of the calculator apparatus described the reading edge would show at a glance the precise record to use, the correct number of steps and the exact gear in order to produce that line of lettering to the length required, a rapid setting of the machine prior to the commencement of work being thus assured.

The markings on the cylinder and reading edge may be modified and adapted in any way to suit requirements and the gears used and the developed cylinder illustrated in Figure 70 is only partially marked out. In place of the cylinder a disc supported on either a vertical or horizontal axis may be employed.

Or again, the chart embodying the gear proportions, instead of being marked out on a disc or cylinder and being incorporated in the calculating apparatus, may be marked out on a plane surface, which may be provided with a suitable movable reading edge, and may be separate from the totalling device. The disc or cylinder in the apparatus described need then only contain one line of readings which may be transferred to a corresponding reading line on the separate chart, and from there the proportions may be read off and the gear determined as before.

What is claimed is:

1. A record-controlled scribing machine comprising an operating instrument, a work support, driving members disposed at an angle to one another and forming components of an uninterrupted drive for producing relative movement between said instrument and said support, means for automatically adjusting the relative speeds of said driving members, a mechanical record of predetermined form for controlling said means, and transmission means for maintaining the continuity of said drive without the aid of said record during said relative movement.

2. A record-controlled scribing machine comprising an operating instrument, a work support, driving members disposed at an angle to one another and forming components of an uninterrupted drive for producing relative movement between said instrument and said support, variable gearing operatively connected with said members for adjusting the relative speeds thereof, means for automatically varying the speed ratio of said gearing, and a mechanical record of predetermined form for controlling said means.

3. A record-controlled scribing machine comprising a work support, a movable bridge arranged thereon, a movable carriage arranged on said bridge, an operating instrument supported in said carriage, means including a rotatable workshaft for imparting an uninterrupted to and fro movement to said carriage upon said bridge, means including another workshaft for imparting an uninterrupted to and fro movement to said bridge upon said work support, a separate variable gear operatively connected with each workshaft for adjusting the speed thereof, means interposed between said gears for automatically varying the relative speed ratio thereof, and a mechanical record of predetermined form for controlling said means.

4. A record-controlled scribing machine comprising an operating instrument, a work support, rotatable workshafts disposed at an angle to one another and forming components of an uninterrupted drive for producing relative movement between said instrument and said support, a separate train of epicyclic gear groups operatively connected with each workshaft for adjusting the speed thereof, means for automatically varying the relative speed ratio of said trains of gearing, and a mechanical record of predetermined form for controlling said means.

5. In a machine as claimed in claim 4, means associated with each epicyclic gear group for modifying its action upon its respective shaft.

6. In a machine as claimed in claim 4, a separate centre shaft supporting each train of epicyclic groups, each such group comprising a controlling wheel loose on its supporting shaft, planet pinions carried by said controlling wheel, a wheel keyed on said shaft, and a one-way clutch connection between the latter wheel and said controlling wheel, a central pair of loose pinions gearing the planets of each epicyclic group with those of the next, and means for temporarily arresting the movements of the controlling wheels for the purpose set forth.

7. In a machine as claimed in claim 4, a separate shaft supporting each train of epicyclic groups, a pinion loosely mounted on each such shaft so as to operatively engage one end of the gearing train supported thereby, a separate differential gear having a rigid connection with each such pinion and a separate balance wheel associated with each differential for transmitting the final drives given out by the gearing trains.

8. In a machine as claimed in claim 4, a separate shaft supporting each train of epicyclic gearing, and a common driving shaft operatively connected with said separate shafts.

9. The combination with a machine as specified in claim 4, of automatically operated detents for modifying the action of the epicyclic groups for the purpose described.

10. In a machine as claimed in claim 4, a separate centre shaft supporting each train of epicyclic groups, each such group comprising a ratchet toothed controlling wheel loose on its supporting shaft, planet pinions carried by said controlling wheel, a wheel keyed on said shaft, and a one-way clutch connection between the latter wheel and the controlling wheel, a central pair of loose pinions gearing the planets of each epicyclic group with those of the next, a detent associated with each controlling wheel, and cam means for controlling the engagement of the detents with their associated controlling wheels.

11. A record-controlled scribing machine comprising an operating instrument, a work support, a pair of rotatable workshafts disposed at an angle to one another and forming components of an uninterrupted drive for producing relative movement between said instrument and said support, trains of epicyclic gear groups operatively connected with said workshafts, a mechanical record of predetermined form, and means controlled by the latter for automatically adjusting the relative speeds of the workshafts through the agency of said trains of epicyclic groups, each of which groups incorporates a ratchet toothed controlling wheel, a detent associated with each such wheel, a plurality of cams associated with each detent, and selective means whereby any one such cam may be caused to engage with its associated detent for the purpose described.

12. A record-controlled scribing machine comprising an operating instrument, a work support, a pair of rotatable workshafts disposed at an angle to one another and forming components of an uninterrupted drive for producing movement of said instrument over said support, two trains of epicyclic gear groups operatively connected respectively with said workshafts, a mechanical record of predetermined form, means controlled by the latter for automatically adjusting the relative speeds of the workshafts through the agency of said trains of epicyclic groups, each of which groups incorporates a ratchet toothed controlling wheel, a separate detent associated with each such wheel, a cam shaft common to both epicyclic trains, groups of cams disposed on said shaft, each group corresponding with an epicyclic group of each train, and means whereby each detent may be actuated by any one of the corresponding group of said cams so as to engage the controlling wheel of the associated epicyclic group for the purpose described.

13. A machine as claimed in claim 12, in which said trains of epicyclic groups and said cam shaft are arranged in parallel, the latter being disposed between said trains, said cams have the form of discs each bearing a series of peripheral cam surfaces, and means are provided for moving said cam shaft round in either direction for the purpose described.

14. A machine as claimed in claim 12, having said trains of epicyclic groups and said cam shaft arranged in parallel, the latter being disposed between said trains, said cams have in the form of discs each bearing a series of peripheral cam surfaces, means controlled by said mechanical record for moving said cam shaft around in either direction, and means for longitudinally adjusting said cam shaft to selectively position a cam of each group for the purpose described.

15. A machine as claimed in claim 12, having said trains of epicyclic groups and said cam shaft arranged in parallel, the latter being disposed symmetrically between said trains, a pair of spindles arranged parallel to said cam shaft, said detents being mounted on said spindles so as to engage said cams with one end and said controlling wheels with the other end, and driving means for rotating said cam shaft in either direction for the purpose described.

16. A machine as claimed in claim 12, having said trains of epicyclic groups and said cam shaft arranged in parallel, the latter being disposed symmetrically between said trains, a pair of spindles arranged parallel to said cam shaft, said detents being mounted on said spindles so as to engage said cams with one end and said controlling wheels with the other end, driving means for rotating said cam shaft in either direction, and releasing means whereby said detents may be simultaneously thrown out of operation when desired.

17. A machine as claimed in claim 12, having said trains of epicyclic groups and said cam shaft arranged in parallel, the latter being disposed symmetrically between said trains, a pair of spindles arranged parallel to said cam shaft, said detents being mounted on said spindles so as to engage said cams with one end and said controlling wheels with the other end, driving means for rotating said cam shaft in either direction, and releasing means for simultaneously rotating said spindles in relatively opposite directions to withdraw the detents carried thereby out of action.

18. A machine as claimed in claim 12, having said trains of epicyclic groups and said cam shaft arranged in parallel, the latter being disposed symmetrically between said trains, a pair of spindles arranged parallel to said cam shaft, said detents being mounted on said spindles so as to engage said cams with one end and said controlling wheels with the other end, driving means for rotating said cam shaft in either direction, releasing means whereby said detents may be simultaneously thrown out of operation when desired, and protective means for preventing the longitudinal adjustment of said cam shaft until all the detents have been withdrawn from action.

19. A record-controlled scribing machine comprising in combination, an operating instrument, a work support, a pair of rotatable workshafts disposed at an angle to one another and forming components of an uninterrupted drive for producing relative movement between said operating instrument and said work support, two parallel trains of epicyclic gear groups operatively connected respectively with said workshafts, a mechanical record of predetermined form, means controlled by the latter for automatically adjusting the relative speeds of the workshafts through the agency of said trains of epicyclic groups, each of which groups incorporates a ratchet toothed controlling wheel, a cam shaft common to both epicyclic trains disposed symmetrically therebetween and parallel thereto, groups of cams disposed on said cam shaft, a pair of spindles arranged parallel to said cam shaft, a detent corresponding to each cam group disposed on said spindles, means whereby said detents may be actuated by said cams to engage said controlling wheels and means incorporating controlling electro-magnetic devices for imparting stepwise rotation to said cam shaft in either direction.

20. A machine as claimed in claim 19, having a pair of said electro-magnetic devices incorporated in said means for imparting stepwise rotation to said cam shaft, and means controlled by the mechanical record for automatically selecting the particular electro-magnetic device required for energization.

21. A machine as claimed in claim 19, in which the means for imparting stepwise rotation in either direction to said cam shaft incorporate in addition to a pair of said electro-magnetic devices, a two-way friction clutch, and means whereby its action may be selectively controlled by either of said magnetic devices.

22. A machine as claimed in claim 19, in which the means for imparting stepwise rotation in either direction to said cam shaft comprise frictional transmission members and duplex escapement mechanism under the control of said electromagnetic devices for the purpose described.

23. A machine as claimed in claim 19 in which the means for imparting stepwise rotation in either direction to said cam shaft incorporate, in addition to a pair of said electro-magnetic devices, frictional transmission means, duplex escapement mechanism under the control of the electromagnetic devices, and electrical means controlled by said mechanical record for selectively energizing said devices for the purpose described.

24. A machine as claimed in claim 19, in which the means for imparting stepwise rotation to said cam shaft incorporate, in addition to two said electro-magnetic devices each comprising a pair of magnets having a common centrally pivoted armature, frictional transmission means, duplex escapement mechanism under the control of the electro-magnetic devices, and electrical means controlled by said mechanical record for producing alternate energization of each magnet of a pair for the purpose set forth.

25. A machine as claimed in claim 19, in which the means for imparting stepwise rotation to said cam shaft incorporate, in addition to said electromagnetic devices, frictional transmission members, escapement devices under the control of the electro-magnetic devices, a selective electric circuit under the control of said mechanical record, and electrical means associated with said circuit for determining the direction of rotation of the cam shaft.

26. A machine as claimed in claim 19, in which the means for imparting stepwise rotation to said cam shaft incorporate, in addition to a pair of said electro-magnetic devices, separate electric circuits for controlling said devices, frictional transmission means, duplex escapement devices under the control of the electro-magnetic devices, a selective electric circuit under the control of the mechanical record, and electrical means associated with said circuit for alternatively establishing either of said circuits for the purpose described.

27. In a machine as claimed in claim 3, means whereby the speed of each workshaft can be varied, comprising in combination a record-controlled variable speed epicyclic assembly, and manually adjustable variable speed mechanism whereby the speed given out by said epicyclic assembly may be still further varied.

28. In a machine as claimed in claim 3, means whereby the speed of each workshaft can be varied comprising in combination a record controlled epicyclic assembly, independently adjustable manually operated change speed gears and an intermediate finely graduated gear changing device.

29. In a machine as claimed in claim 2, supplementary gearing under the control of the mechanical record for temporarily varying the speed of the uninterrupted drive.

30. A machine as claimed in claim 1, in which the operating instrument has the form of a rotatably adjustable broad marking instrument operatively associated with means independently controlled by said record for effecting the adjustment of said instrument in a stepwise manner.

31. A machine as claimed in claim 12, having the cam shaft extended and fitted with cam devices, and clutches under the control of said cam devices for reversing the direction of rotation of said workshafts.

32. In a machine as claimed in claim 3, means for reversing the rotation of the workshafts, and controlling means associated with such reversing means for automatically actuating the latter prior to the actual moment at which the reversal becomes effective.

33. A machine as claimed in claim 12, having the cam shaft extended and fitted with a pair of reverse cam discs for each workshaft, and means whereby the operating sequence of the cam discs depends upon the direction of movement imparted to the operating instrument.

34. In a machine as claimed in claim 12, cam discs associated with an extension of the cam shaft, electro-magnets associated with said cam discs, clutches for reversing the rotation of the workshafts, and wipers comprising pairs of spring tongues which co-operate with said cam discs to control the electric circuit of said electro-magnets for actuating said clutches.

35. In a machine as claimed in claim 1, clutch mechanism associated with the driving members and comprising a pair of free wheel clutch devices, balls associated therewith, spring means whereby said balls are pressed into engaging contact with either of said devices, and a centre actuating element provided with fingers whereby said balls may be forced back from their engaging position.

36. In a machine as claimed in claim 1, clutch mechanism associated with the driving members and comprising a pair of free wheel clutch devices, balls associated therewith, spring means whereby said balls are pressed into engaging contact with either of said devices, a centre actuating element provided with fingers whereby said balls may be forced back from their engaging position, and a weighted slidable member which is carried by said centre element and has a movement in excess thereof for the purpose described.

37. In a machine as claimed in claim 3, taut wires connected to the workshafts for moving the carriage supporting the operating instrument over the bridge and for moving the latter over the work support.

38. In a machine as claimed in claim 3, a common prime mover for driving both workshafts, and transmission means operatively connected with said prime mover for driving said workshafts and said mechanical record in parallel.

39. A machine as claimed in claim 1 and in which the mechanical record comprises a plurality of moving bands and means for switching them into action for alternative use.

40. In a machine as claimed in claim 4, a separate shaft supporting each train of epicyclic groups, a pinion loosely mounted on such shaft so as to operatively engage one end of the gearing train supported thereby, a differential gear having a rigid connection with said pinion, a balance wheel associated with said differential for transmitting the final drive given out by the gearing train, a gear wheel in engagement with said balance wheel, a shaft supporting said gear wheel, a cone of graduated gear wheels carried by the shaft supporting said gear wheel, a manually adjustable jockey wheel associated with the cone, and means for adjusting said jockey wheel to engage any desired cone wheel for the purpose described.

41. A machine as claimed in claim 1, in which the mechanical record has the form of a band having a single row of perforations therein.

42. In a machine as claimed in claim 1, selective electrical circuits under the control of the mechanical record, a circuit selector in the form of a rotatable drum having peripheral projections corresponding to said circuits, electrically controlled means including feeler members co-operating with said record to impart stepwise rotation to said selector, and spring-sets operatively associated with said projections so as to be in turn engaged and actuated thereby for the purpose described.

43. A record-controlled scribing machine, comprising an operating instrument, a work support, driving members disposed at an angle to one another and forming components of an uninterrupted drive for producing relative movement between said instrument and said support, a mechanical record in the form of a perforated band for automatically adjusting the speeds of said driven members in relation to one another, selective electrical circuits under the control of said record, a circuit selector in the form of a rotatable drum having peripheral projections corresponding to said circuits, a toothed wheel rigid with said drum, electrically controlled means including a feeler member co-operating with the perforations in said band to impart stepwise rotation to said selector in one direction through the agency of said wheel, and spring-sets arranged in said electrical circuits and operatively associated with said projections so that each such projection engages and actuates a separate spring set as and for the purpose described.

44. A machine as claimed in claim 43, in which the electrically controlled means for imparting stepwise rotation to said selector comprise, in addition to said feeler member, an electro-magnet electrically connected thereto, an operating pawl carried by the armature of said magnet, and a spiral spring for returning said selector to a normal position.

45. In a machine as claimed in claim 43, an electro-magnet electrically connected to said feeler member, an operating pawl carried by the armature of said magnet for imparting stepwise rotation to said selector by engaging said toothed wheel, and electrically controlled means comprising a check pawl associated with an actuating spring for preventing the return movement of said selector after stepwise rotation has been imparted thereto.

46. In a machine as claimed in claim 43, an operating pawl for imparting stepwise rotation to said selector by engaging said toothed wheel, an electro-magnet electrically connected to said feeler member and having an armature carrying said pawl, a check pawl operatively engaging said wheel, means including an electromagnet having an armature carrying said check pawl for controlling the movement of the latter to prevent the return movement of said selector after stepwise rotation thereof has been effected, and spring means for returning said selector to a normal position when said check pawl is disengaged from said wheel.

47. In a machine as claimed in claim 43, means associated therewith whereby the engagement of a said projection with its particular associated spring-set may or may not as required, complete a said electrical circuit for the purpose described.

48. In a machine as claimed in claim 43, an electrical contact common to said electrical circuits, and means associated with said selector for actuating said contact simultaneously with the engagement of a said projection with its particular spring-set for the purpose set forth.

49. In a machine as claimed in claim 43, the combination with the selector of a frictionally driven impulse wheel having peripheral projections, electrical contacts arranged to be engaged and actuated by such projections, pins on the face of said impulse wheel, and a catch member associated with said pins to control the rotation of the wheel.

50. In a machine as claimed in claim 43, the combination with the selector of a frictionally driven impulse wheel having peripheral projections, electrical contacts arranged to be engaged and actuated by such projections, pins on the face of said impulse wheel, a catch member co-operating with said pins to control the rotation of said impulse wheel, an electro-magnet having an oscillatable armature carrying said catch member, and means for energizing such electro-magnet as and for the purpose described.

51. In a machine as claimed in claim 43, the combination with the selector of an operating electro-magnet controlling the stepwise rotation thereof, a frictionally driven impulse wheel having peripheral projections, electrical contacts arranged to be engaged and actuated by such projections, pins on the face of said impulse wheel, a catch member co-operating with said pins to control the rotation of the impulse wheel, an electro-magnet having as oscillatable armature rigidly supporting said catch member, means for intermittently energizing such magnet simultaneously with said operating electro-magnet, and means whereby said armature upon being attracted by its magnet is maintained in the attracted position during the subsequent transmission of rapid electrical impulses to its magnet.

52. In a machine as claimed in claim 43, the combination with the selector of an operating electro-magnet controlling the stepwise rotation thereof, a frictionally driven impulse wheel having peripheral projections, electrical contacts arranged to be engaged and actuated by such projections, a catch member for controlling the rotation of said impulse wheel, an electro-magnet having an oscillatable armature rigidly supporting said catch member, means for intermittently energizing such magnet simultaneously with said operating electro-magnet, means whereby said armature upon being attracted by its magnet is maintained in the attracted position during the subsequent transmission of rapid electrical impulses to its magnet, and pins so arranged on the face of said impulse wheel that they are alternately engaged by said catch member when its supporting armature is attracted and released by the associated electro-magnet.

53. In a machine as claimed in claim 43, an electrically controlled operating pawl for imparting stepwise rotation to said selector by engaging said toothed wheel, a check pawl operatively engaging said toothed wheel to prevent return movement of said selector after stepwise rotation thereof has been effected, an electro-magnet operatively associated with said check-pawl, spring means whereby said selector is automatically returned to a normal position when said electro-magnet is energized, and means whereby an electrical impulse is automatically transmitted to said check-pawl subsequently to a said electrical circuit being selected by said selector.

54. In a machine as claimed in claim 1, a broad marking instrument constituting the operating instrument, a moving perforated band constituting the mechanical record, and means independently controlled from a single row of perforations in such band for rotatably adjusting said instrument.

55. In a machine as claimed in claim 1, a rotatably adjustable broad marking instrument constituting the operating instrument, a moving perforated band constituting the mechanical record, means including a controlling electro-magnet having an oscillatable armature for imparting stepwise rotation to said instrument in either direction, and means whereby the energization of said magnet is controlled from a single row of perforations in said band.

56. In a machine as claimed in claim 1, a rotatably adjustable broad marking instrument constituting the operating instrument, ratchet wheels associated therewith, a pair of pawls associated with said ratchet wheels so as to step the instrument round in either direction, a record-controlled electro-magnet having an oscillatable armature, and means whereby the oscillatory movement of said armature produced by the energization of said magnet causes either of said pawls to engage a said ratchet wheel and step said instrument in the required direction.

57. The combination with the machine as claimed in claim 1, of a pair of ratchet wheels associated with said instrument, a pair of relatively inversely directed pawls associated with each of said ratchet wheels, an axially slidable shaft carrying said pawls and a record-controlled electro-magnet having an armature rigid with a link member pivotally connected to said shaft for the purpose set forth.

58. In a machine as claimed in claim 1, a pair of ratchet wheels associated with said instrument, a pair of relatively inversely directed pawls associated respectively with said ratchet wheels so as to step said instrument round in either direction, an axially slidable shaft carrying said pawls, a record controlled electro-magnet having an oscillatable armature operatively associated with said shaft so as to impart sliding movement thereto, and means for alternatively causing each pawl to engage its associated ratchet wheel upon sliding of said shaft.

59. In a machine as claimed in claim 1, a pair of ratchet wheels associated with said instrument, a pair of relatively inversely directed pawls associated respectively with said ratchet wheels so as to step said instrument round in either direction, an axially slidable shaft carrying said pawls, a record-controlled electro-magnet having an oscillatable armature operatively associated with said shaft so as to impart sliding movement thereto, means for alternatively causing each pawl to engage its associated ratchet wheel upon sliding of said shaft, and means for adjusting the amplitude of movement of said pawls so as to vary the amount of stepwise rotation imparted thereby to said instrument.

60. In a machine as claimed in claim 1, a pair of ratchet wheels associated with said operating instrument, a pair of relatively inversely directed pawls associated respectively with said ratchet wheels so as to step said instrument round in either direction, an axially slidable shaft carrying said pawls, a record-controlled electro-magnet having an oscillatable armature operatively associated with said shaft so as to impart sliding movement thereto, means for alternatively causing each pawl to engage its associated ratchet wheel upon sliding of said shaft, and manually adjustable stops for limiting the axial movement of said shaft in order to adjust the amplitude of movement of said pawls as required.

61. In a machine as claimed in claim 1, a pair of ratchet wheels associated with said operating instrument, a pair of relatively inversely directed pawls associated respectively with said ratchet wheels so as to step said instrument round in either direction, an axially slidable shaft carrying said pawls, a record-controlled electro-magnet having an oscillatable armature operatively associated with said shaft so as to impart sliding movement thereto, means for alternatively causing each pawl to engage its associated ratchet wheel, manually adjustable stops for limiting the axial movement of said shaft in order to adjust the amplitude of movement of said pawls, and electrical circuit means whereby the machine is rendered inoperative when said stops have not been adjusted in accordance with the correct setting of the machine.

62. A record-controlled scribing machine comprising a marking instrument in the form of a tubular marking fluid container supporting a rotatable pen blade so that the latter is capable of a sliding movement in relation thereto, a work support, driving members disposed at an angle to one another and forming components of an uninterrupted drive for producing relative movement between said instrument and said support, a mechanical record of predetermined form for automatically adjusting the speeds of said members in relation to one another, and means independently controlled by said record for rotatably adjusting said pen blade in a stepwise manner.

63. In a machine as claimed in claim 62, means whereby the flow of marking fluid from said container to the marking edge of said pen blade is positively prevented by the latter when it is in a raised position in relation to the work support.

64. A marking instrument for the machine specified in claim 62, in which said pen blade comprises an upper and a lower part detachably connected together, said lower part which embodies a marking edge being provided with a shank, whilst said upper part is provided with a bore for receiving and holding said shank.

65. A record-controlled scribing machine comprising an operating instrument, a work support, driving members disposed at an angle to one another, and forming components of an uninterrupted drive for producing relative movement between said instrument and said support, means whereby said driving members are relatively adjusted to impart direction to said movement through the agency of a continuously moving record band, a pair of said record bands for alternative use, gears associated with each such band, a common prime mover for driving said gears, a slidable shaft operatively associated with said gears, and a pivotal hand lever co-operating with said shaft to simultaneously engage the gears for driving one record band with said prime mover and to render the gears for driving the other record band inoperative.

66. In a machine as claimed in claim 65, means for simultaneously varying the gear ratio through which the record bands are driven.

67. In a machine as claimed in claim 65, means for automatically locking said hand lever in either of its extreme positions for the purpose described.

68. A record-controlled scribing machine comprising in combination an operating instrument, a work support, driving members disposed at an angle to one another and forming components of an uninterrupted drive for producing relative movement between said instrument and said support, a pair of mechanical records having the form of perforated bands for alternative use in controlling the machine, selective electrical circuits under the alternative control of said records, a circuit selector associated with said circuits, electrical contacts controlled by said selector and arranged in said circuits, feeler members engaging said records and also arranged in said circuits, a separate cage housing the respective feeler members associated with each record, transverse shafts slidably supporting the cages and connected at their ends to form a frame, and another frame pivotally supporting the latter for receiving the corresponding record band.

69. In a machine as claimed in claim 68, springs associated with each cage supporting frame, and means for lifting each frame by turning it about its pivotal support against the action of said springs to enable the associated record band to be positioned on the rollers or withdrawn from the record supporting frame.

70. In a machine as claimed in claim 68, a pivotal hand lever for lifting each cage supporting frame, and means for preventing the premature actuation of such hand lever as and for the purpose set forth.

71. In a machine as claimed in claim 68, adjustable gears for driving said record bands, a pivotal hand lever for lifting each cage supporting frame by causing it to be turned about its pivotal support, and means for preventing the premature actuation of such hand lever comprising pins carried by a slidable shaft controlling the position of said gears.

72. In a machine as claimed in claim 68, adjustable gears for driving said record bands, a pivotal hand lever for lifting each cage supporting frame by causing it to be turned about its pivotal support, means for preventing the premature actuation of such hand lever comprising pins carried by a slidable shaft controlling the position of said gears, a switch associated with said slidable shaft, and means whereby the movement of the slidable shaft to disengage the gears driving a record band actuates said switch to disestablish the electrical circuits to the feeler members of that particular band whilst the contrariwise movement of said shaft to engage such gears causes such electrical circuits to be established through the agency of said switch.

73. In a machine as claimed in claim 68, a hand lever controlling the position of each cage supporting frame, a roller for receiving each record band, a take-up spool therefor, a disc rigid with said roller and having an operating handle, a pawl normally holding said disc against rotation in one direction by engaging its peripheral surface, and means whereby said pawl is released from such engagement by the actuation of said hand lever for the purpose described.

74. In a machine as claimed in claim 68, a driving roller for each record band, a gripping roller for pressing said band against said driving roller, a pivotal hand lever, and means controlled by said lever whereby said gripping roller and said feeler members are simultaneously lifted out of engagement with said band.

75. In a machine as claimed in claim 68, a driving roller for each record band, a gripping roller for pressing said band against said driving roller, a pivotal hand lever associated therewith, and spring means whereby said gripping roller and said feeler members can be maintained in operative and inoperative positions pending the actuation of said lever.

76. In a machine as claimed in claim 68, a roller for receiving each record band, a take-up spool therefor, driving means including a prime mover for delivering said band from said roller to said spool, and friction gears whereby motion can be transmitted at will to said roller from said prime mover for the purpose of re-winding said band thereon.

77. In a machine as claimed in claim 68, a roller for receiving each record band, a take-up spool therefor, driving means including a prime mover for delivering said band from said roller to said spool, friction gearing whereby motion can be transmitted to said roller from said prime mover for the purpose of re-winding said band thereon, and means whereby the gear ratio between said roller and said prime mover varies automatically during the transmission of such motion for the purpose described.

78. In a machine as claimed in claim 68, a roller for receiving each record band, a take-up spool therefor, driving means including a prime mover for delivering said band from said roller to said spool, friction gearing whereby motion can be transmitted to said roller from said prime mover for the purpose of re-winding said band thereon, means whereby the gear ratio between said roller and said prime mover varies automatically during the transmission of such motion so as to maintain a constant speed of said band during the re-winding procedure, and means for automatically disengaging the friction gearing when said roller is completely re-wound.

79. In a machine as claimed in claim 68, a roller for receiving each record band, a take-up spool therefor, driving means including a prime mover for delivering said band from said roller to said spool, friction gearing whereby motion can be transmitted to said roller from said prime mover for the purpose of re-winding said band thereon, means whereby the gear ratio between said roller and said prime mover varies automatically during the transmission of such motion so as to maintain a constant speed of said band during the re-winding procedure, means for automatically disengaging the friction gearing when said roller is completing re-wound, a controlling hand lever and means associated with said hand lever whereby said prime mover is prevented from being coupled to said roller when the corresponding feeler members are in an operative position.

80. In a machine as claimed in claim 68, a roller for receiving each record band, a take-up spool therefor, driving means including a prime mover for delivering said band from said roller to said spool, friction gearing whereby motion can be transmitted to said roller from said prime mover for the purpose of re-winding said band thereon, means whereby the gear ratio between said roller and said prime mover varies automatically during the transmission of such motion so as to maintain a constant speed of said band during the re-winding procedure, means for automatically disengaging the friction gearing when said roller is completely re-wound, a controlling hand lever, means associated with said hand lever whereby said prime mover is prevented from being coupled to said roller when the corresponding feeler members are in an operative position, and means associated with said take-up spool for maintaining said band taut during the re-winding thereof.

81. In the machine specified in claim 3, a manually operated clutch whereby the instrument carriage may be uncoupled from its driving means for the purpose described.

82. In a machine as specified in claim 3, a manually operated clutch whereby the instrument carriage may be uncoupled from its driving means, and means whereby the operation of the machine is prevented until said clutch is positioned to couple said carriage to said driving means.

83. The combination of the machine claimed in claim 1, with a subsidiary scribing machine operatively connected thereto.

84. The combination of a machine as claimed in claim 3, with a subsidiary scribing machine and transmission means operatively connected with the latter and with said variable gears.

85. In a machine as claimed in claim 3, means whereby either of the complementary motions produced by the means embodying the workshafts may be caused to superimpose a proportion of its movement upon the other complementary motion so as to cause a slope to be imparted to the work being produced.

86. A record-controlled scribing machine comprising a work support, an instrument supported thereover for producing designs thereon, means for lowering said instrument into operative contact with said support and for raising it out of contact therewith, driving means for imparting uninterrupted movement to said instrument over said support, a clutch for starting and stopping said instrument, a moving record band having rows of perforations therein for automatically controlling the movements of said instrument during the production of designs, additional perforations at the beginning and end of said band, and means controlled by such additional perforations for actuating said clutch after a design has been produced so as to cause said instrument to traverse a predetermined spacing distance between the completion of such design and the commencement of the next.

87. A record-controlled scribing machine comprising a work support, an instrument supported thereover for producing designs thereon, means for lowering said instrument into operative contact with said support and for raising it out of contact therewith, driving members disposed at an angle to one another and forming components of a drive for imparting uninterrupted movement to said instrument over said support, variable gearing operatively connected with said members, a clutch for starting and stopping said instrument, selective electrical circuits for controlling the movements of said instrument, a moving record band having rows of perforations therein for automatically controlling said circuits during the production of designs, a circuit selector associated with said circuits and controlled by said perforations, means for actuating said clutch arranged in a said circuit, a rotatable switch wheel associated with such circuit, additional perforations at the beginning and end of said band, and means controlled by such additional perforations for actuating said clutch through the agency of said switch wheel after a design has been produced so as to cause said instrument to traverse a predetermined spacing distance between the completion of such design and the commencement of the next.

88. In a machine as claimed in claim 86, means controlled by said additional perforations for retaining said instrument in operative contact with said support during the spacing movement of said instrument as and for the purpose set forth.

89. In combination with the machine claimed in claim 86, manually adjustable means for actuating said clutch so as to increase the spacing travel of the instrument determined by the additional perforations.

90. The combination with the machine as claimed in claim 87, of manually adjustable means for increasing the spacing travel of the instrument determined by the additional perforations, which means comprise another rotatable switch wheel operatively connected with said driving members and arranged in the controlling electric circuit of the clutch actuating means.

91. In combination with a machine as claimed in claim 87, manually adjustable means for increasing the spacing travel of the instrument determined by the additional perforations, which means comprise another rotatable switch wheel arranged in the controlling electric circuit of the clutch actuating means and friction gears operatively connecting such switch wheel with the means for imparting movement to said instrument.

92. In combination with a machine as claimed in claim 86, manually operable means for actuating said clutch so as to increase between consecutive groups of designs the spacing travel of the instrument determined by the additional recordings.

93. In a machine as claimed in claim 1, a continuously moving band having rows of perforations therein constituting the mechanical record and electrical means whereby the elements of the machine are selected and operatively controlled by such perforations and a main clutch member for instantaneously stopping the machine in the event of the electric current supply failing.

94. In a machine as claimed in claim 1, a continuously moving band having rows of perforations therein constituting the mechanical record, and electrical means whereby the elements of the machine are selected and operatively controlled by such perforations, a main clutch member for instantaneously stopping the machine, an electromagnet for maintaining said clutch in an inoperative position, and a spring for actuating said clutch when said magnet is de-energized as a result of the electric current supply failing.

95. In a machine as claimed in claim 1, a continuously moving band having rows of perforations therein constituting the mechanical record, electrical means whereby the elements of the machine are selected and operatively controlled by such perforations, a main clutch member for instantaneously stopping the machine in the event of the electric current supply failing, and means for automatically actuating said clutch at the completion of a piece of work.

96. In combination with a machine as claimed in claim 2, mechanism operatively connected to said driving members, a rotary switch wheel connected to said mechanism, means for manually adjusting said switch wheel to enable said instrument to traverse an additional predetermined spacing distance between the production of consecutive designs prior to the normal spacing movement of said instrument being effected, and means for utilizing said mechanism and switch wheel for varying as required, the shape of the design being produced.

97. In combination with a machine as claimed in claim 2, mechanism operatively connected to said driving members, a rotary switch wheel connected to said mechanism, means for manually adjusting said switch wheel to enable said instrument to traverse an additional predetermined spacing distance between the production of consecutive designs prior to the normal spacing movement of said instrument being effected, and means for bringing said switch wheel and mechanism into action so as to automatically vary proportionately the form of each of a series of designs.

98. In a machine as claimed in claim 1, a movable bridge arranged on said work support, a movable carriage arranged on said bridge and supporting said instrument, taut wires for imparting the movement of said driving members to said bridge and carriage respectively, and trip devices for preventing said instrument from travelling beyond the edges of said work support.

99. In a machine as claimed in claim 1, a movable bridge arranged on said work support, a movable carriage arranged on said bridge and supporting said instrument, taut wires for imparting the movement of said driving members to said bridge and carriage respectively, and means for automatically releasing said carriage and said bridge from their operating wires upon their limit of travel being reached and for subsequently re-coupling them automatically with their associated wires by the continued operation of the machine.

100. In a machine as claimed in claim 1, a movable bridge arranged on said work support, a movable carriage arranged on said bridge and supporting said instrument, taut wires for imparting the movement of said driving members to said bridge and carriage respectively, means for automatically releasing said carriage and said bridge from their operating wires upon their limit of travel being reached and for subsequently re-coupling them automatically with their associated wires by the continued operation of the machine, and means for automatically lifting said instrument out of contact with said work support when said bridge and carriage reach such a limit of travel.

101. A record-controlled scribing machine comprising in combination a marking instrument in the form of a rotatable tubular marking fluid container supporting a pen blade having a broad marking edge, which pen blade is rotatably rigid with said container but is capable of sliding movement in relation thereto, a work support, driving members disposed at an angle to one another and forming components of an uninterrupted drive for producing relative movement between said instrument and said support, a mechanical record of predetermined form for automatically adjusting the speeds of said members in relation to one another, and means independently controlled by said record for automatically adjusting said pen blade by rotating said container about one of the ends of said marking edge so as to facilitate the negotiation of sharp corners in the designs being produced as set forth.

102. A machine as claimed in claim 68, in which the feeler members are pivotally supported in said cage and are associated with contact members for the purpose described.

103. In a machine as claimed in claim 68, feeler members of L-shaped formation pivotally supported in said cage, and pivotal contact members associated therewith as and for the purpose set forth.

104. In a machine as claimed in claim 3, an inspection panel covering the means for imparting movement to the carriage and bridge, and manually adjustable mechanism for setting said means in any predetermined position, which mechanism includes indicating pointers arranged outside the inspection panel as and for the purpose described.

WALTER WILKINS.
EDGAR JOSEPH VANDY.